United States Patent
Reto

(10) Patent No.: US 7,603,683 B2
(45) Date of Patent: Oct. 13, 2009

(54) METHOD OF AND CLIENT DEVICE FOR INTERACTIVE TELEVISION COMMUNICATION

(75) Inventor: Wettach Reto, Tokyo (JP)

(73) Assignee: Sony Corporation (JP)

( * ) Notice: Subject to any disclaimer, the term of this patent is extended or adjusted under 35 U.S.C. 154(b) by 1117 days.

(21) Appl. No.: 10/051,673

(22) Filed: Jan. 17, 2002

(65) Prior Publication Data

US 2002/0144273 A1 Oct. 3, 2002

(30) Foreign Application Priority Data

| Jan. 19, 2001 | (JP) | ............................ P2001-012337 |
| Mar. 9, 2001 | (JP) | ............................ P2001-067138 |

(51) Int. Cl.
H04N 7/025 (2006.01)

(52) U.S. Cl. ............................ 725/34; 725/44; 725/109; 725/110; 715/733; 715/751; 709/204; 709/217

(58) Field of Classification Search ................... 725/13, 725/16, 32–36, 109–113, 120, 136, 39–45; 715/716–718, 733, 751–753, 839; 709/204–206, 709/217–223

See application file for complete search history.

(56) References Cited

U.S. PATENT DOCUMENTS

| 5,559,549 | A | | 9/1996 | Hendricks et al. |
| 5,610,653 | A | * | 3/1997 | Abecassis ................... 348/170 |
| 5,694,163 | A | | 12/1997 | Harrison |
| 5,774,664 | A | | 6/1998 | Hidary et al. |
| 5,793,365 | A | | 8/1998 | Tang et al. |
| 5,828,839 | A | * | 10/1998 | Moncreiff ................... 709/204 |
| 5,861,906 | A | | 1/1999 | Dunn et al. |
| 5,877,765 | A | * | 3/1999 | Dickman et al. ............ 715/738 |
| 5,880,731 | A | * | 3/1999 | Liles et al. ................... 715/758 |
| 5,915,243 | A | * | 6/1999 | Smolen ....................... 705/14 |
| 5,936,661 | A | | 8/1999 | Trew |
| 5,971,849 | A | * | 10/1999 | Falciglia ...................... 463/16 |
| 6,081,830 | A | * | 6/2000 | Schindler .................... 709/204 |
| 6,345,290 | B2 | * | 2/2002 | Okada et al. ................ 709/204 |
| 6,393,461 | B1 | * | 5/2002 | Okada et al. ................ 709/204 |
| 6,425,011 | B1 | * | 7/2002 | Otani et al. ................. 709/225 |
| 6,434,604 | B1 | * | 8/2002 | Harada et al. ............... 709/207 |
| 6,519,771 | B1 | * | 2/2003 | Zenith ......................... 725/32 |
| 6,530,083 | B1 | * | 3/2003 | Liebenow .................... 725/46 |
| 6,564,244 | B1 | * | 5/2003 | Ito et al. ..................... 709/204 |
| 6,618,057 | B1 | * | 9/2003 | Kim ........................... 715/719 |
| 6,677,968 | B1 | * | 1/2004 | Appelman .................. 715/853 |
| 6,701,525 | B1 | * | 3/2004 | Neervoort et al. ............. 725/38 |

(Continued)

Primary Examiner—Annan Q Shang
(74) Attorney, Agent, or Firm—Lerner, David, Littenberg, Krumholz & Mentlik, LLP

(57) ABSTRACT

An interactive television system includes a plurality of client devices connected to a server through a network. The client devices display broadcast contents based on received broadcast data. Icon buttons are displayed superimposed on the displayed broadcast contents. Each icon button represents a different icon. When one of the displayed icon buttons is selected at one of the client devices, then the client device sends a request to the server, asking to execute, at another client device, an icon represented by the selected icon button. When the server receives the request over the network, the server sends icon identification data that corresponds to the icon over the network to the other client device. The other client device executes the icon based on the received icon identification data.

66 Claims, 38 Drawing Sheets

U.S. PATENT DOCUMENTS

| | | | |
|---|---|---|---|
| 6,721,954 B1 * | 4/2004 | Nickum | 725/46 |
| 6,754,904 B1 * | 6/2004 | Cooper et al. | 725/32 |
| 6,781,608 B1 * | 8/2004 | Crawford | 715/758 |
| 6,917,373 B2 * | 7/2005 | Vong et al. | 715/840 |
| 7,143,356 B1 * | 11/2006 | Shafrir et al. | 715/751 |
| 7,454,709 B1 * | 11/2008 | Appelman | 715/733 |
| 2001/0013050 A1 * | 8/2001 | Shah | 709/202 |
| 2001/0051982 A1 * | 12/2001 | Graziani | 709/204 |
| 2003/0156134 A1 * | 8/2003 | Kim | 345/753 |
| 2005/0262542 A1 * | 11/2005 | DeWeese et al. | 725/106 |

* cited by examiner

METHOD OF AND CLIENT DEVICE FOR INTERACTIVE TELEVISION COMMUNICATION

CROSS-REFERENCE TO RELATED APPLICATIONS

The present application claims priority from Japanese patent application Nos. P2001-012337 filed Jan. 19, 2001 and P2001-067138 filed Mar. 9, 2001, the disclosures of which are hereby incorporated by reference herein.

BACKGROUND OF THE INVENTION

The present invention relates to a method of and client device for interactive television communication.

A large number of interactive television systems and protocols have been developed in recent years. Some systems include set-top-boxes provided with local storage for storing television content. "Trick play" modes, such as "pause", "play", "rewind" and "fast forward," can be executed during real-time television broadcasts by randomly accessing the stored television content. "Video-on-Demand" systems offer the same type of trick play modes for videos. However, the server stores the video contents, and sends the content to the user in accordance with the trick play modes.

In some systems, interaction during a television broadcast is possible using a keyboard. Interactions available with this type of system include playing along with game shows, participating in polls, and "chat" with other people via the Internet. U.S. Pat. No. 5,936,661 describes an interactive television game system that enables a viewer to compete with contestants in a studio audience. U.S. Pat. No. 5,828,839 describes a chat application wherein chat rooms are synchronized with television channels, so that users can chat with other people who are watching the same television content.

Sales of pay content produces a large source of income for interactive television businesses. Users can obtain access to pay content by subscribing to a channel. Alternatively, the user can pay for content on a pay-per-view basis. Pay-per-view content is broadcast on a channel repeatedly, and the user pays for permission to watch the channel for a block of time that encompasses one of the broadcasts.

Video-on-demand is a more technically advanced type of interactive television that enables users to access content for a fee. In this case, a video server streams content to a user's set-top box upon receiving a user's request and payment.

Although trick play modes have enhanced the personal television watching experience, one cannot share these modes with others.

Also, the interactive television systems that require a keyboard are inconvenient for the normal television watching situation. That is, normally people watch television in the living room while sitting on a chair or couch. There is no place to set the keyboard. This situation is particularly disadvantageous for the chat applications, because the television screen is quite far away, so that text is not easy to read. Also, if a user attempts to comment on a specific section of broadcast television content using chat, the relevant section will be long since past by the time the user types down and sends his comment to the chat list. This is particularly the case in a fast paced program such as a sports event. It is very difficult to enjoy the same brisk interaction as when two or more people watch a television program together.

The results of interactive television shows or polls are always based on the totality of participants. In a poll, for example, you will only see what all other users of this poll thought, in the form of percentages of the totality of participants.

Providers of pay content rely on conventional methods for urging people to purchase the content they offer, such as advertisements or word of mouth. However, advertisements can only be directed to large target audiences, and so lack persuasiveness of a recommendation from a friend. Word of mouth is very persuasive, but once a potential user receives a recommendation from a friend, the potential user has to get to and turn on the television or computer. Also, troublesome operations are required to actually access the content. Because accessing the pay content is so troublesome, in addition to costing money, the potential user may just decide not to watch the pay content despite the strong recommendation from a friend.

SUMMARY OF THE INVENTION

It is an objective of the present invention to overcome the above-described problems and to provide an interactive television system that can be initiated using only simple operations, and that enables users of the system to share the interactive television watching experience with a more intimate group of other viewers, without major text reading requirements.

In order to achieve the above-described objectives, a client device according to one aspect of the present invention includes a connection interface operable to connect to a server through a network; a receiver operable to receive content data for displaying content; a data storage unit operable to store icon identification data sets that each corresponds to a different icon; a display unit operable to display the content based on the content data, and to display icon buttons that represent the icons; a selection unit enabling a first user to select a desired one of the icon buttons; and a transmitter operable to transmit a request to the server, the request including the icon identification data set that corresponds to the icon represented by the selected icon button, and a command that the server transmit the icon identification data set to another client device connected to the server. The display unit can display the icon buttons superimposed on the content. With this configuration, the first user will not overlook the icon buttons.

With this configuration, users of different client devices can communicate with each other and share the interactive television watching experience by merely selecting a displayed icon button, for example, using a remote control unit. Since icons are used instead of text, there are no major text reading requirements.

A data storage unit can be provided for storing icon display and audio data for executing the icons that correspond to the icon identification data sets. With this configuration, there is no need to transmit the icon display and audio data from the server over the network, which saves transmission time.

A data receiver can be provided operable to receive icon display and audio data from the server. With this configuration, icon display and audio data for executing a variety of different icons can be provided from the server.

A data receiver can be provided operable to connect to the Internet and to receive icon display and audio data over the Internet. With this configuration, the client device has access to a great variety of icon display and audio data.

It is desirable that the display unit display a buddy list superimposed over the content, the buddy list indicating on-line status of other client devices connected to the server. With this configuration, the user of the client device can easily know the on-line status of other client devices.

It is desirable that the display unit switch from display of the buddy list to display of a visual clue that is smaller than the buddy list, the visual clue indicating on-line status of the other client devices connected to the server. With this configuration, the first user can use the visual clue to obtain the most relevant information of the buddy list, but without the buddy list obstructing the view of the content.

It is desirable that the command indicate a group of the client devices to which the server is to transmit the icon identification data. With this configuration, the client device can communicate with a group of client devices using icons. The icon identification data set could correspond to an icon that represents a comment on the content and that offers the users of the group of client devices possible responses to the comment, or could correspond to an icon representing a question and possible answers. In either case, it is desirable to provide a response receiver operable to receive the responses or answers from the group of client devices, the display unit then displaying a result of the responses or answers. Since results are only from a group of the client devices, intimacy of the interactive television watching experience is increased.

It is desirable that a configuration be provided to enable users to invite each other to watch the same content. When the display unit displays selected content, this can be done by having the icon identification data set correspond to an icon that invites a user of the another client device to watch the selected content. Alternatively, the selected icon button can represent an invitation icon for inviting the user of the another client device to watch the selected content together. With these configurations, users can invite each other to watch television together.

When the content is broadcast content, then a user can invite anyone with a client device that includes a broadcast receiver to watch the same content together.

When the content is pay content, the invitation of a friend provides a very strong recommendation to purchase the pay content, which is beneficial to providers of the pay content. In this case, it is desirable that when the first user selects the desired icon button using the selection unit, the display unit displays an interface that provides the first user an option of paying fees for the pay content for the user of the another client device, because this offers users the option of paying for others. The pay content could be pay per view or video on demand.

It is desirable that the command transmitted by the transmitter also command the server to transmit an invitation to devices other than client devices because this allows users to send invitations to more different people.

It is desirable to provide a chat unit operable to communicate with other client devices in a chat group and to control the display unit to display the content and chat text based on data from the other client devices in the chat group. In this case, the command transmitted by the transmitter commands the server to transmit the icon identification data set to the other client devices in the chat group. With this configuration, a member of a chat group can easily invite all other members of the chat group to watch the same content together.

It is desirable that the icon identification data set correspond to an icon that represents a comment on the content and that offers the user of the another client device possible responses to the comment. With this configuration, users can easily exchange comments with each other.

It is desirable that the icon identification data set correspond to an icon representing a social interaction having only a single possible positive response. With this configuration, users can easily interact with each other.

According to another aspect of the present invention, interactive television communication is achieved between a plurality of client devices connected to a server through a network by receiving over the network from the client devices information on a television viewing status of the client devices; preparing a buddy list of client devices for one of the client devices, the buddy list including the information on the television viewing status of the client devices in the buddy list; sending the information on the television viewing status of the client devices in the buddy list over the network to the one client device; receiving a request over the network from the one client device to execute a desired icon at a particular client device in the buddy list; and sending icon identification data corresponding to the desired icon over the network to the particular client device in the buddy list.

With this method, a user can easily send icons to client devices, and easily know what type of icon to send to which client device on the buddy list to share the interactive television watching experience. Since icons are used instead of text, there are no major text reading requirements.

It is desirable that a configuration be provided to enable users to invite each other to watch the same content. When the one client device displays selected content, this can be done by having the icon identification data correspond to an icon that invites a user of the particular client device in the buddy list to watch the selected content together. This enables users to invite each other to watch television together.

When the content is broadcast content, then a user can invite anyone with a client device that includes a broadcast receiver to watch the same content together.

When the content is pay content, the invitation of a friend provides a very strong recommendation to purchase the pay content, which is beneficial to providers of the pay content. In this case, it is desirable that fees for the pay content for the particular client device be charged to the one client device when the request indicates that a user of the one client device has agreed to pay the fees for the pay content for the particular client device, because this offers users the option of paying for others. The pay content could be pay per view or video on demand.

It is desirable that the server search for an online device having a user who is the same as the user of the particular client device when the particular client device is not online, and that the server send to the online device an invitation to watch the selected content, because this allows users to make sure friends receive invitations in a timely manner.

It is desirable to exchange chat text between client devices in a chat group, wherein the icon identification data is transmitted from the one client device to the other client devices in the chat group. With this method, a member of a chat group can easily invite all other members of the chat group to watch the same content together.

It is desirable to further receive an agreement to watch the selected content from the particular client device in the buddy list; and to communicate with the one client device and the particular client device in the buddy list to synchronize display of the selected content at the one client device and the particular client device in the buddy list. Since the display of the content is synchronized, the intimacy of the interactive television watching experience is increased.

It is desirable that the information on the television viewing status include information indicating which of the client devices in the buddy list are displaying the same television programs. This enables a user to easily decide what type of icon to send to which client devices.

It is desirable to further receive from the particular client device in the buddy list a response indicating execution of the desired icon. If the icon identification data represents an icon having a comment about television content, then the response can represent either agreement or disagreement with the comment. If the icon identification data represents an icon having a question and possible answers, then the response can represent one of the possible answers. With this method, communication between users of different client devices is easy.

The intimacy of the interactive television watching experience is increased if the icon identification data represents an expression or information about a television program. If the icon identification data represents advertisement information, then advertisers are more likely to be interested in providing icons.

A command can be sent with the icon identification data, the command instructing the particular client device in the buddy list to execute an icon corresponding to the icon identification data using icon display and audio data stored locally in the particular client device in the buddy list. With this method, the icon display and audio data need not be sent from the server, thereby reducing transmission time.

The icon identification data can include icon display and audio data for executing the desired icon in the particular client device in the buddy list. With this method, the client device need not store the icon display and audio data.

The request from the one client device can include a request to execute the desired icon at a group of client devices watching the same television content. This increases the intimacy of the interactive television watching experience. Since each client device has a different buddy list, it is desirable that the group include client devices not in the buddy list of the one client device.

According to another aspect of the present invention, interactive television communication is achieved between a plurality of client devices connected to a server through a network by receiving content data at a first one of the client devices; displaying content based on the content data received at the first one of the client devices; displaying icon buttons each representing a different icon; selecting one of the icon buttons representing a desired icon; sending a request from the first one of the client devices to the server, the request instructing that the desired icon be executed at another one of the client devices; receiving the request at the server over the network; sending icon identification data corresponding to the desired icon over the network to the another one of the client devices; receiving the icon identification data at the another one of the client devices; and executing the desired icon at the another one of the client devices based on the icon identification data. It is desirable that the icon buttons be displayed superimposed on the content, so that the user will not overlook the icon buttons.

With this configuration, users of different client devices can communicate with each other and share the interactive television watching experience by merely selecting a displayed icon button, for example by using a remote control unit. Since icons are used instead of text, there are no major text reading requirements.

It is desirable to store in the client devices icon display and audio data for executing icons, the icon identification data indicating the icon display and audio data for executing the desired icon. With this method, the icon display and audio data need not be sent from the server to the client devices, reducing transmission time.

It is desirable that the step of sending icon identification data include sending icon display and audio data for executing the desired icon at the another one of the client devices. With this method, storage requirements at the client devices can be reduced.

It is desirable to connect either the client devices or the server to the Internet and to receive, over the Internet, icon display and audio data for executing icons. With this method, a great variety of icon display and audio data can be accessed.

It is desirable that, when the first one of the client devices displays selected content, the icon identification data correspond to an icon that invites a user of the another one of the client devices to watch the selected content together. With this method, the intimacy of the interactive television watching experience is increased.

When the content is broadcast content, then a user can invite anyone with a client device that includes a broadcast receiver to watch the same content together.

When the content is pay content, the invitation of a friend provides a very strong recommendation to purchase the pay content, which is beneficial to providers of the pay content. In this case, it is desirable that the server charge fees for the pay content for the another one of the client devices to the first one of the client devices when the request indicates that a user of the first one of the client devices has agreed to pay the fees for the pay content for the another one of the client devices, because this offers users the option of paying for others. The pay content could be pay per view or video on demand. It is desirable that the another one of the client devices execute a confirmation icon that informs the user that the content is pay content which requires payment of a charge. This ensures that users understand they will be charged for the content. It is desirable that the confirmation icon enable the user of the another one of the client devices to agree to pay for the pay content with a single operation. This feature, and the invitation from a friend, greatly increases the probability that the user will purchase the content.

It is desirable that the server discount fees charged to the first one of the client devices for the pay content, or provide incentive points to the first one of the client devices, when the user of the another one of the client devices has agreed to pay for the pay content. This provides users with incentive to invite friends to watch pay content together.

It is desirable that the another one of the client devices send agreement-to-pay information to the server when the user of the another one of the client devices has agreed to pay for the pay content. This insures that the server knows which client devices should receive the pay content.

It is desirable that the server send further icon identification data to the another one of the client devices when the user of the another one of the client devices has not agreed to pay for the pay content. In this case, the further icon identification data identifies an icon at the another one of the client devices for urging the user of the another one of the client devices to pay for the pay content. This provides slight social pressure on the user of the another one of the client devices to purchase the pay content.

It is desirable that the command transmitted by the transmitter also commands the server to transmit an invitation to devices other than client devices because this allows users to send invitations to more different people.

BRIEF DESCRIPTION OF THE DRAWINGS

The above and other objects, features and advantages of the invention will become more apparent from reading the following description of a preferred embodiment taken in connection with the accompanying drawings in which.

DETAILED DESCRIPTION

An interactive television system according to an embodiment of the present invention will be described while referring to the attached drawings.

Figure 1:
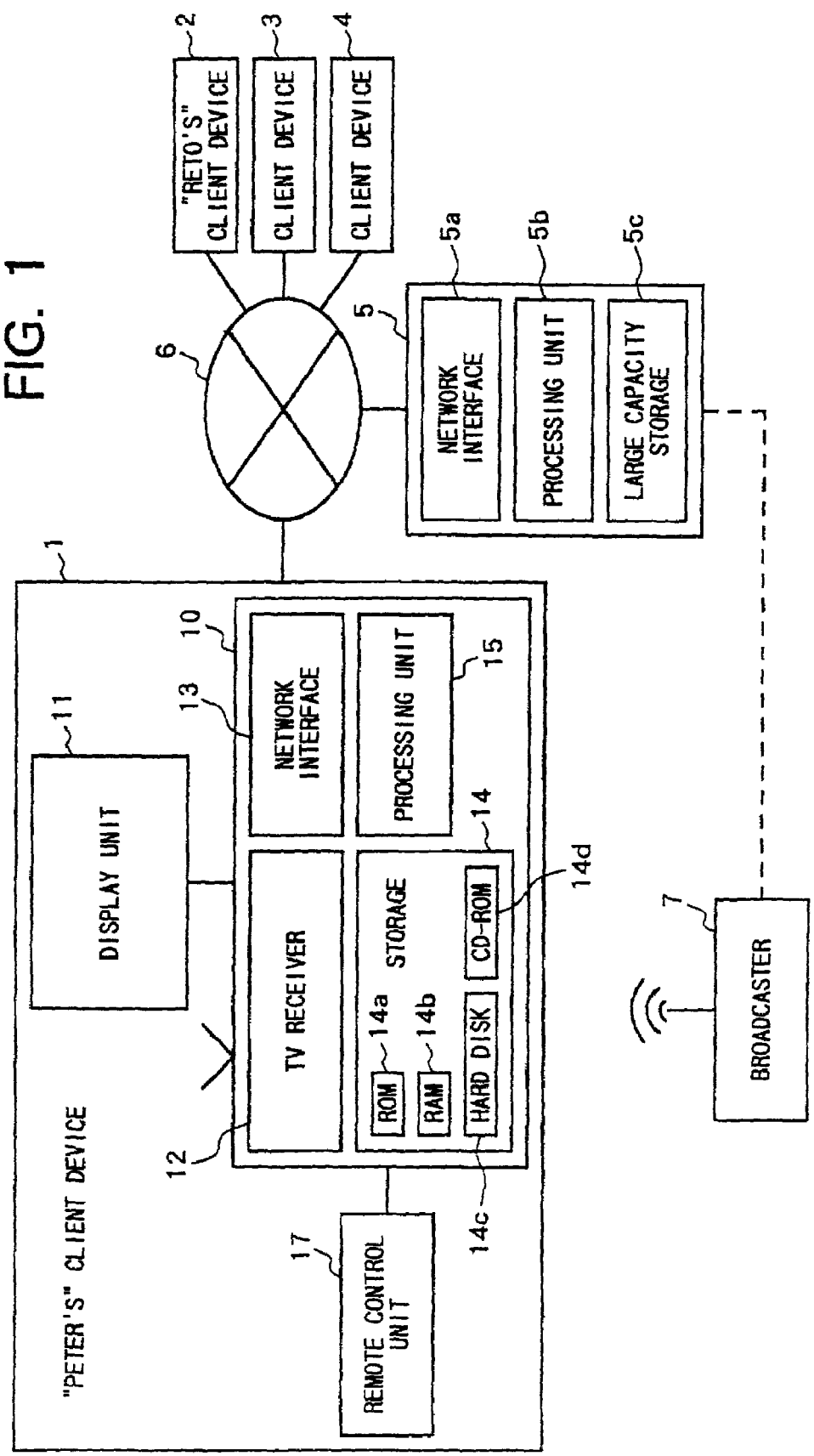
FIG. 1 is a block diagram showing components of an interactive television system according to an embodiment of the present invention.

FIG. 1 shows an interactive television system according to the embodiment. The system includes a plurality of client devices 1, 2, 3, 4, ... connected to a server 5 through a network 6. Each client device includes a TV sharing function. One of the features of the TV sharing function is the ability of the client devices to send icons to each other through the server 5. The "icons" according to the present invention include pictures, short video streams, sounds, animations, or a combination of all of these displayed superimposed on the television signal (video and audio overlay).

There are four classes of icons in the present embodiment: one-way icons, customizable one-way icons, limited interactive icons, and small group interaction icons.

The one-way icons include animation. An example is the falling hearts shown in FIG. 9, which are displayed over the television content falling from the top to the bottom of the screen.

Figure 18:
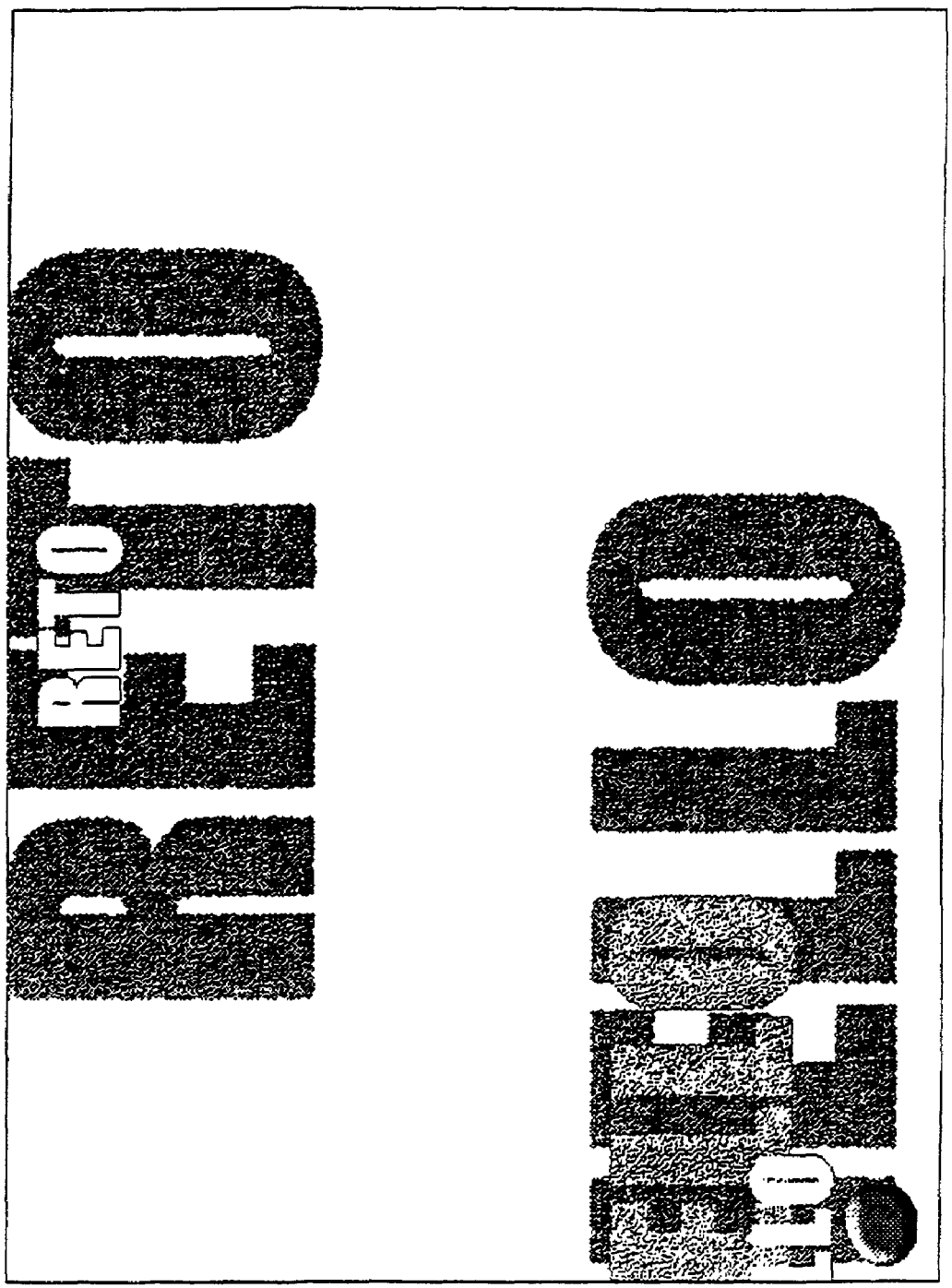
FIG. 18 is a schematic view showing the execution of a customizable one-way icon.

Customizable one-way icons include animation which can be customized by the sender and are followed by display of an icon reception interface. An example of a customizable one-way icon with text written by the sender is shown in FIG. 18.

Limited interactive icons mimic social actions with limited interactivity, such as a hand shake. When someone offers a handshake, the other party has one positive action available: to answer the handshake. The only alternative is to not react at all. The limited interactive icons are similar in that the sender sends an invitation for a limited interaction that the receiver can either react to using a single positive response, or not react to at all. An example of a limited interactive icon is the "toast" shown in FIGS. 14 and 15.

Small group interaction icons are games and polls performed only by members of a particular group of client devices that are watching the same television content in synchronized manner, in what is referred to as "my group" (to be described later). Small group interaction icons increase the intimacy of watching television together in the TV sharing environment, as compared to interactive television games and polls performed in the conventional manner, such as described in U.S. Pat. No. 5,936,661, incorporated herein by reference, where the games and polls are performed with the entire television viewing audience. An example of a small group interaction icon is the poll shown in FIGS. 29 and 30.

As shown in FIG. 1, the client device 1 includes a main body 10, a display unit 11, and a remote control 17. The main body 10 houses a TV receiver 12, a network interface 13, and storage 14. The TV receiver 12 receives television content in a signal broadcast from a broadcaster 7, and displays the television content on the display 11. The storage 14 includes read only memory (ROM) 14a, random access memory (RAM) 14b, a hard disk 14c, and a CD-ROM 14d. The ROM 14a stores application data used by the processing unit 15 for executing the TV sharing function. The ROM 14a also stores a client device identification number for uniquely identifying the client device 1 to the server 5, and individual identification numbers for uniquely identifying different individuals who might use the same client device. The RAM 14b is used for temporarily storing a variety of data required for executing the TV sharing function. The hard disk 14c stores a variety of information data and application data used by the processing unit 15 during control operations. For example, the hard disk 14c stores interface data for displaying a variety of interfaces such as a buddy list 52 shown in FIG. 5, plural sets of icon display and audio data, one set for executing each icon, and icon identification data stored in association with the icon display and audio data sets. The icon identification data is for identifying each different icon to the client devices and the server 5. The hard disk 14c also stores local, non-volatile information. The hard disk 14c can store the client device identification information and individual identification information instead of or in addition to the ROM 14a. The RAM 14b and the hard disk 14c are used to store data of a real time television broadcast for executing trick play modes, such as pause, play, rewind, and fast forward on the television program.

The icon display and audio data stored locally in the hard disk 14c could come from a variety of sources, such as a CD-ROM or the Internet. An icon designer could provide icons. The television content owner and the broadcaster could provide icons and invitation icons related to the subject television content, and receive detailed log files of icon usage from the server 5 in exchange. An advertiser could provide icons related to brand-name merchandise or services, and receive detailed log files of icon usage from the server 5 in exchange.

Figure 2:
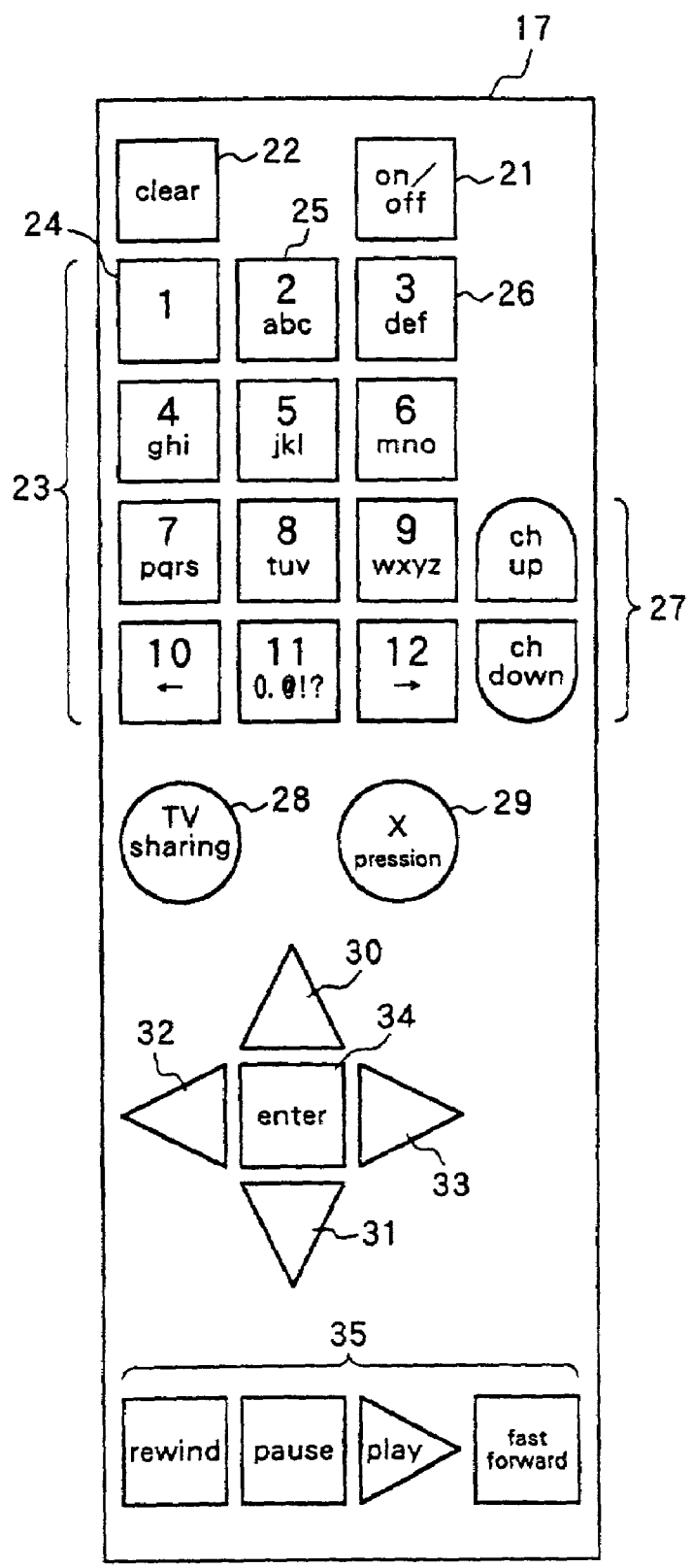
FIG. 2 is a schematic view showing a remote control unit of the client devices of the system in FIG. 1.

As shown in FIG. 2, the remote control unit 17 of the client device 1 includes an on/off button 21, a clear button 22, alphanumeric key pad 23, channel up and down buttons 27, a TV sharing button 28, an "X-pression" button 29, up and down buttons 30, 31, left and right buttons 32, 33, an enter button 34, and trick play buttons 35.

The TV sharing button 28 includes the design of the TV sharing icon to indicate its function. The TV sharing button 28 serves as an on/off switch for the TV sharing application. That is, by pressing the TV sharing button 28, the user can stop the display of icons or terminate the TV sharing application at any stage while the TV sharing application is being run. This is important to give the user the guarantee to be in charge, that is, if ever the user no longer wishes to view icons or wants to stop using the TV sharing function, he just has to click on the TV sharing button.

The alphanumeric key pad 23 includes a "1" key 24, a "2" key 25, and a "3" key 26, colored yellow, red, and green, respectively. As will be described later, particular buttons displayed in the various interfaces are color coded similarly, to indicate that one of the displayed buttons can be selected by pressing the similarly colored button 24, 25, or 26 of the remote control unit 17.

The up, down, left, and right buttons 30 to 33 are for changing the displayed button of an interface that is the target of operations. The enter button 34 is for confirming selection of the target displayed button, that is, when the enter button 34 is pressed, the action corresponding to the target button is confirmed and initiated.

The trick play buttons 35 relate to trick play modes such as play, rewind, pause, and fast forward.

All of the other client devices 2, 3, and on have substantially the same configuration as the client device 1, so their description will omitted to avoid redundancy of explanation.

The server 5 includes a network interface 5a, a processing unit 5b, and storage 5c. The storage 5c stores data representing the online status of the client devices 1 and on, a buddy list of each client device, patterns of how clients use icons, and a repository of icons. The storage 5c also stores information related to user administration and network management. The storage 5c also stores application software data executed by the processing unit 5b for implementing an icon suggestion engine, micro-payment of icons, a small-group interaction engine, data-mining of icon usage patterns, providing more icons, and a communication platform for communicating with the client devices to perform exchange of icons between the client devices.

Next, an explanation will be provided for operations of the system according to the embodiment. In this explanation, it is assumed that the user of the client device 1 is named "Peter" and the user of the client device 2 is named "Reto." Peter is watching television and uses the TV sharing function of the client device 1, with Reto responding accordingly from the client device 2.

Figure 33:
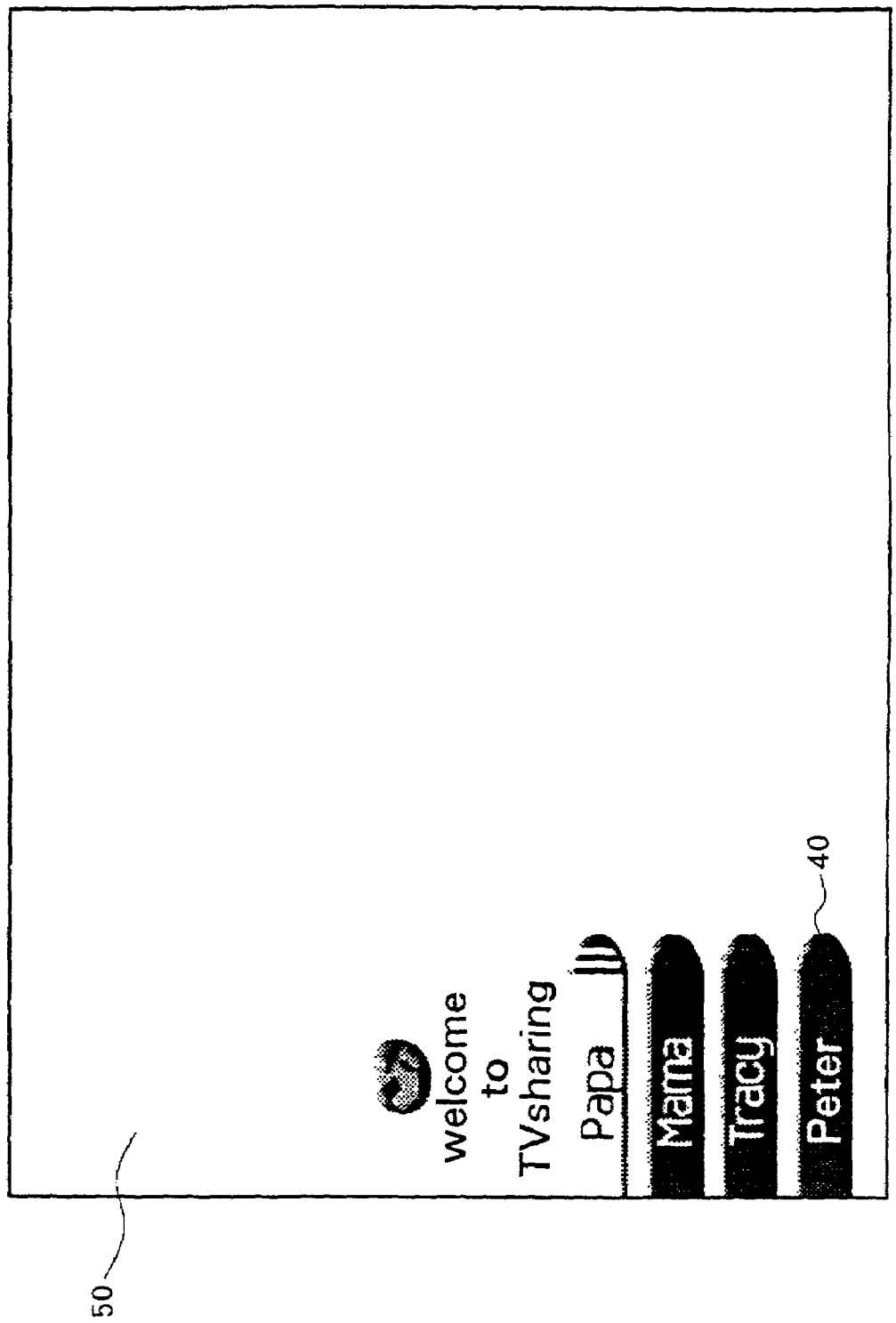
FIG. 33 is a schematic view showing the display of an individual identification interface.

As shown in FIG. 33, when the power of the client device 1 is turned on, an individual identification interface is displayed. This interface allows different users of the same client device to have their own buddy list. Each of the plates corresponds to one of the individual identification numbers stored in the ROM 14a. In this example, the "Peter" plate 40 is selected using the up and down buttons 30, 31 and the enter button 34.

When one of the plates is selected, then a password interface (not shown) is displayed. Passwords are stored in association with the name plates of the individual identification numbers. The user must enter a password to access the TV sharing function for the selected name plate. This password requirement is to protect the privacy of individuals (so no one can see their buddy lists or icons they receive from others) and to protect children from watching undesirable television content.

Figure 3:
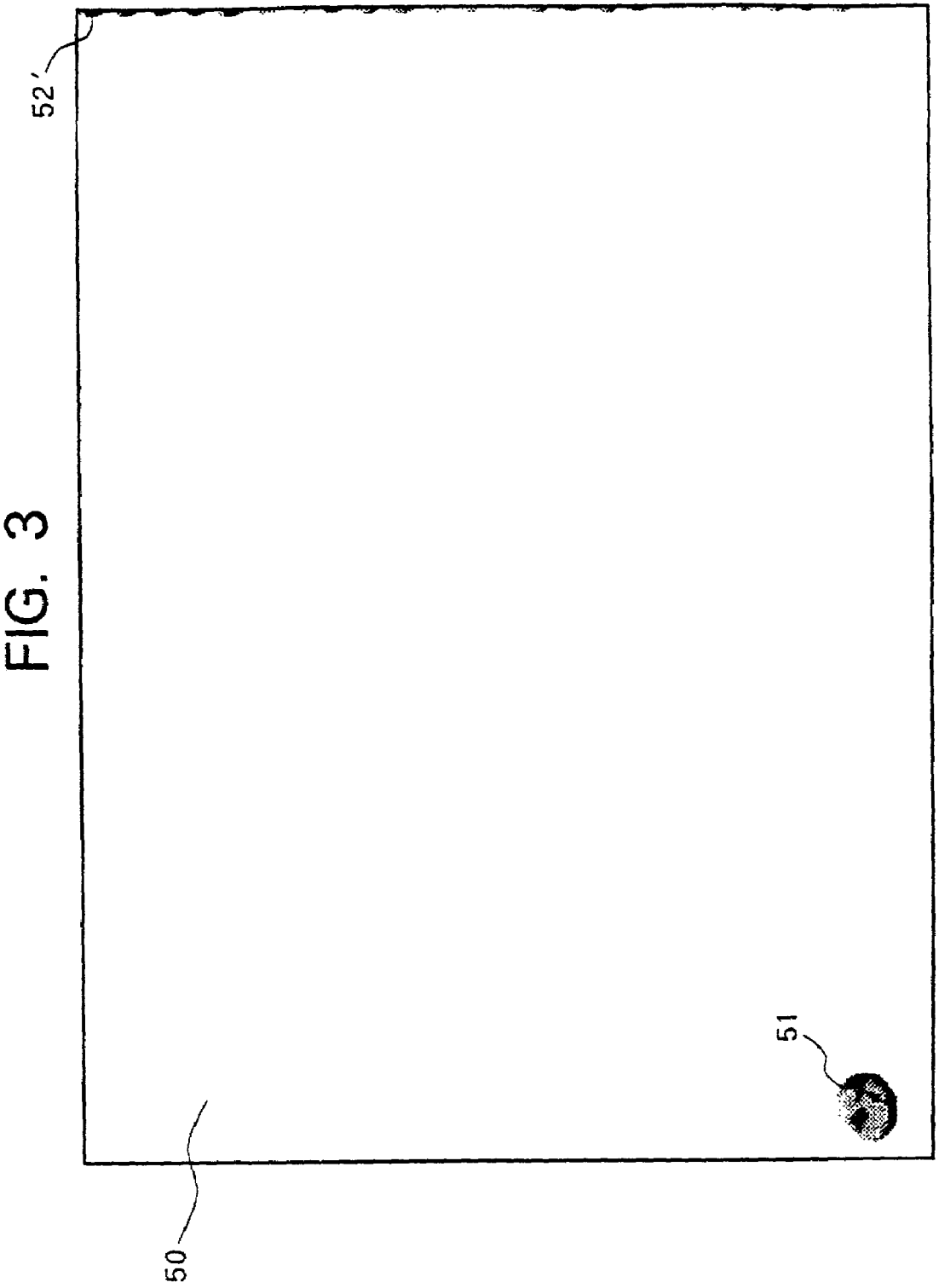
FIG. 3 is a schematic view showing the display of a visual clue screen on one of the client devices of the system.

When a correct password is entered, then a television program 50 received by the TV receiver 12 is displayed on the display unit 11. Also, the client device 1 logs onto the server 5, and sends the individual identification number corresponding to the selected plate to the server 5. The server 5 sends information about the on-line status of client devices in the buddy list of the selected individual of the client device 1. The processing unit 15 uses the information on the buddy list from the server 5 to control the display unit 11 to display a TV sharing icon 51 and a visual clue 52' superimposed on the television program 50 as shown in FIG. 3.

Presence of the TV sharing icon 51 on the screen indicates to the user that the TV sharing application is running. When the client device 1 receives an icon from another client device during the sleep mode, then the TV sharing icon 50 starts to blink to indicate to the user that an icon has been received.

Figure 5:
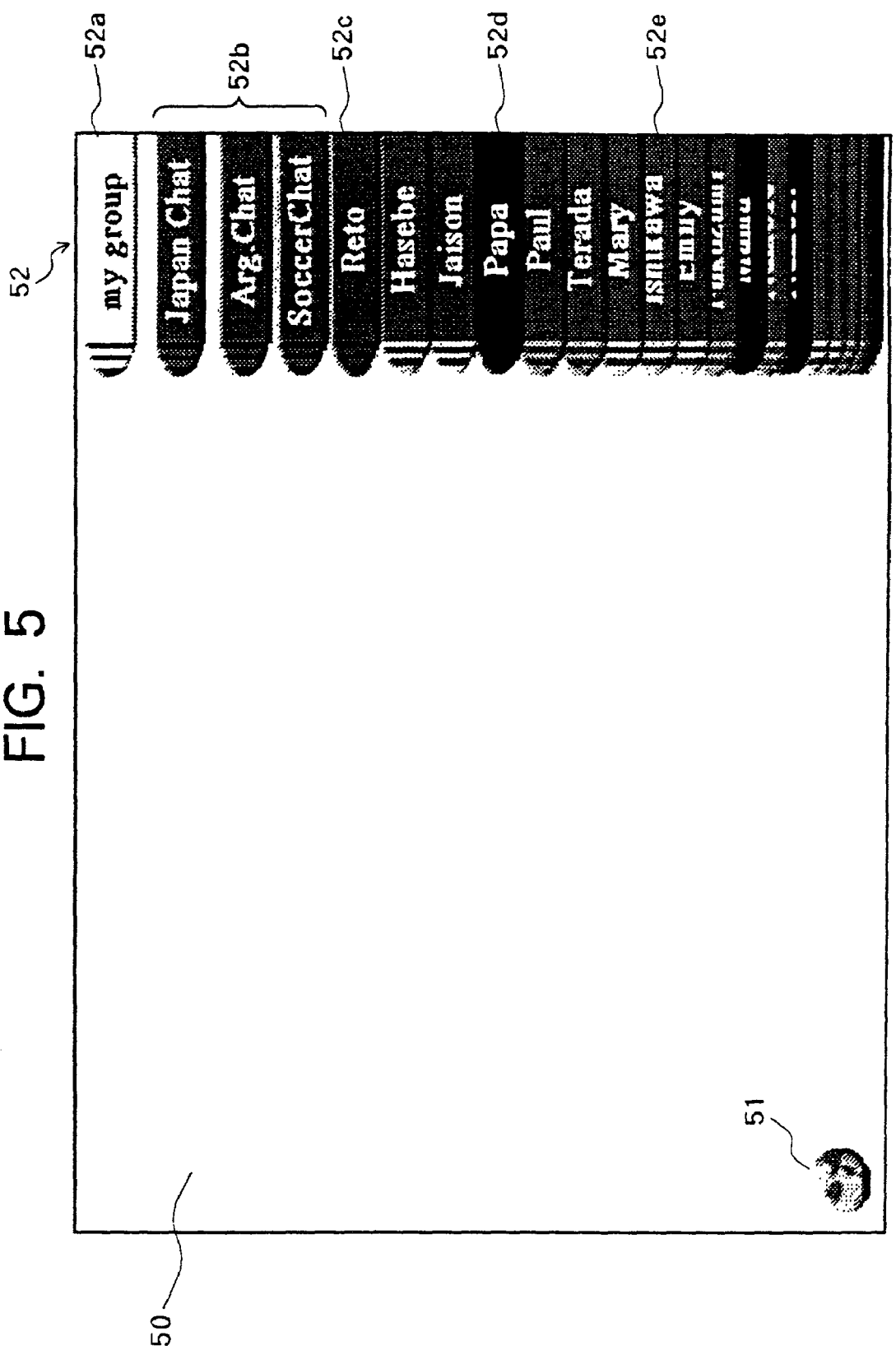
FIG. 5 is a schematic view showing the display of a buddy list on the client device.

The visual clue 52' represents the "noses" of plates of the buddy list 52 shown in FIG. 5. The noses are displayed in colors according to the information from the server 5 about the on-line status of the group of client devices as shown in Table 1.

TABLE 1

| Nose Color | Buddy's Status |
| --- | --- |
| Black | Not watching television or not showing his status |
| Red | Watching television, but not the same channel |
| Green | Watching the same channel |
| Yellow | Watching the same channel, but time shifted |

As will be described later, the plates of the buddy list 52 are always in the same order. Therefore, by memorizing the location of member plates in the buddy list, the user of the client device 1 can use the visual clue 52' to assess the on-line status of members of the buddy list without starting up the TV sharing application.

Figure 4:
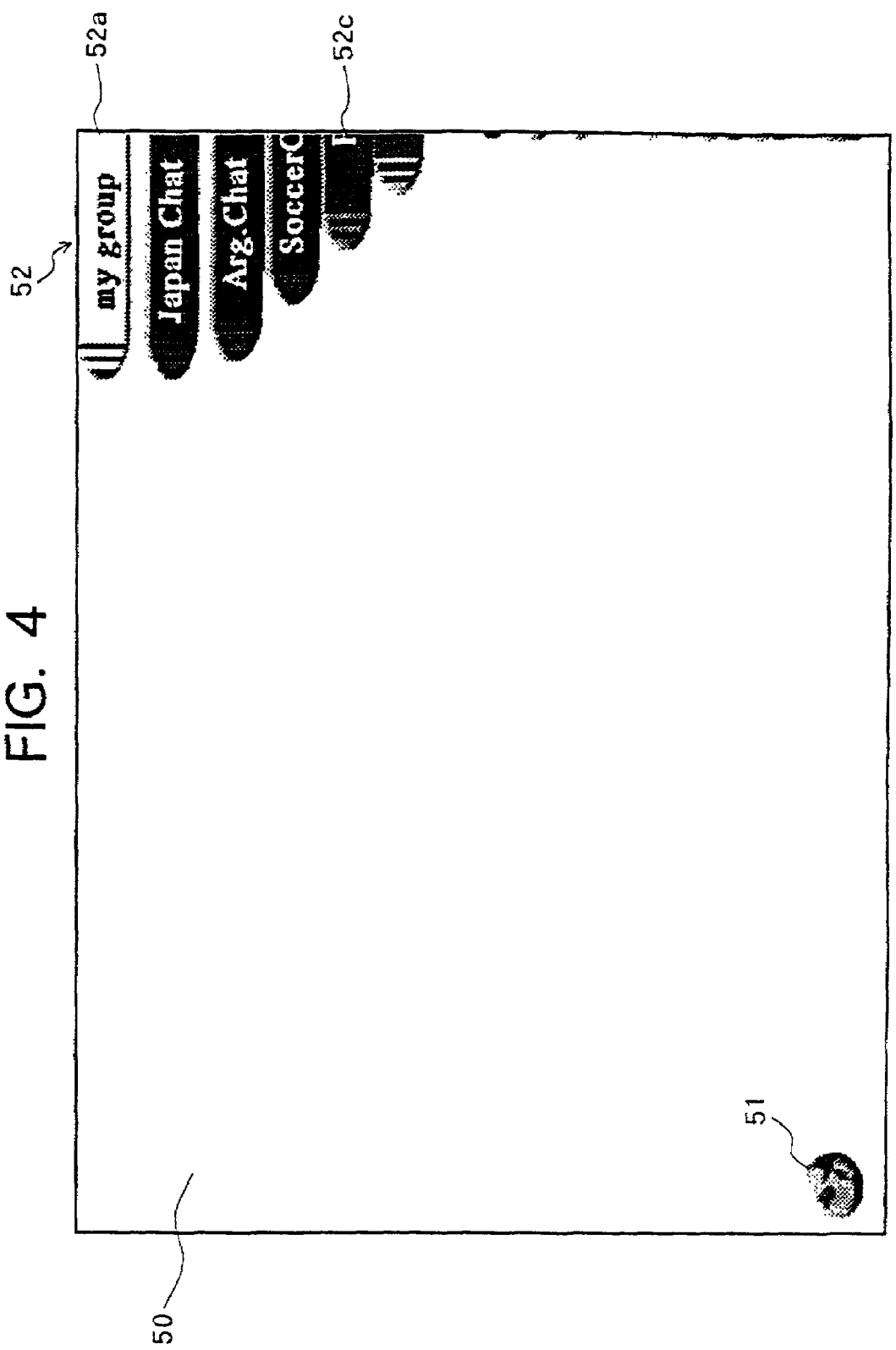
FIG. 4 is a schematic view showing the display of a slide out animation on the client device.

When the user presses the TV sharing button 28 while the "visual clue" screen is being displayed, then a slide out animation routine is started to slide the plates of the buddy list 52 one at a time fully onto the screen as shown in FIG. 4, until the buddy list screen shown in FIG. 5 is displayed. In this example, the buddy list corresponding to the "Peter" plate" is displayed based on information about Peter's buddy list from the server 5. It should be noted that the user can return the display 11 to the "visual clue" screen of FIG. 3 at any point in the TV sharing application by again pressing the TV sharing button 28. In this way, the TV sharing button 28 serves as an on/off switch that gives the user complete control over whether he watches icons or watches using the TV sharing function.

The buddy list 52 includes a "my group" plate 52a, "chat" plates 52b, buddy plates such as "Reto" plate 52c, a "Papa" plate 52d and an "Ishikawa" plate 52e, and a tool plate (not shown). The "body" of each plate is also color coded. The target plate of the list is displayed in yellow color to indicate that it is the target of operations when the enter button 34 is pressed. In the example of FIG. 5, the "my group" plate 52a is set as the default target plate, and so is displayed yellow. Plates of client devices that are on-line are displayed in dark green. Plates of client devices that are off line, or in a privacy mode where it does not advise its on-line status to the server 5, are displayed in black, like the "Papa" plate 52d.

Figure 6:
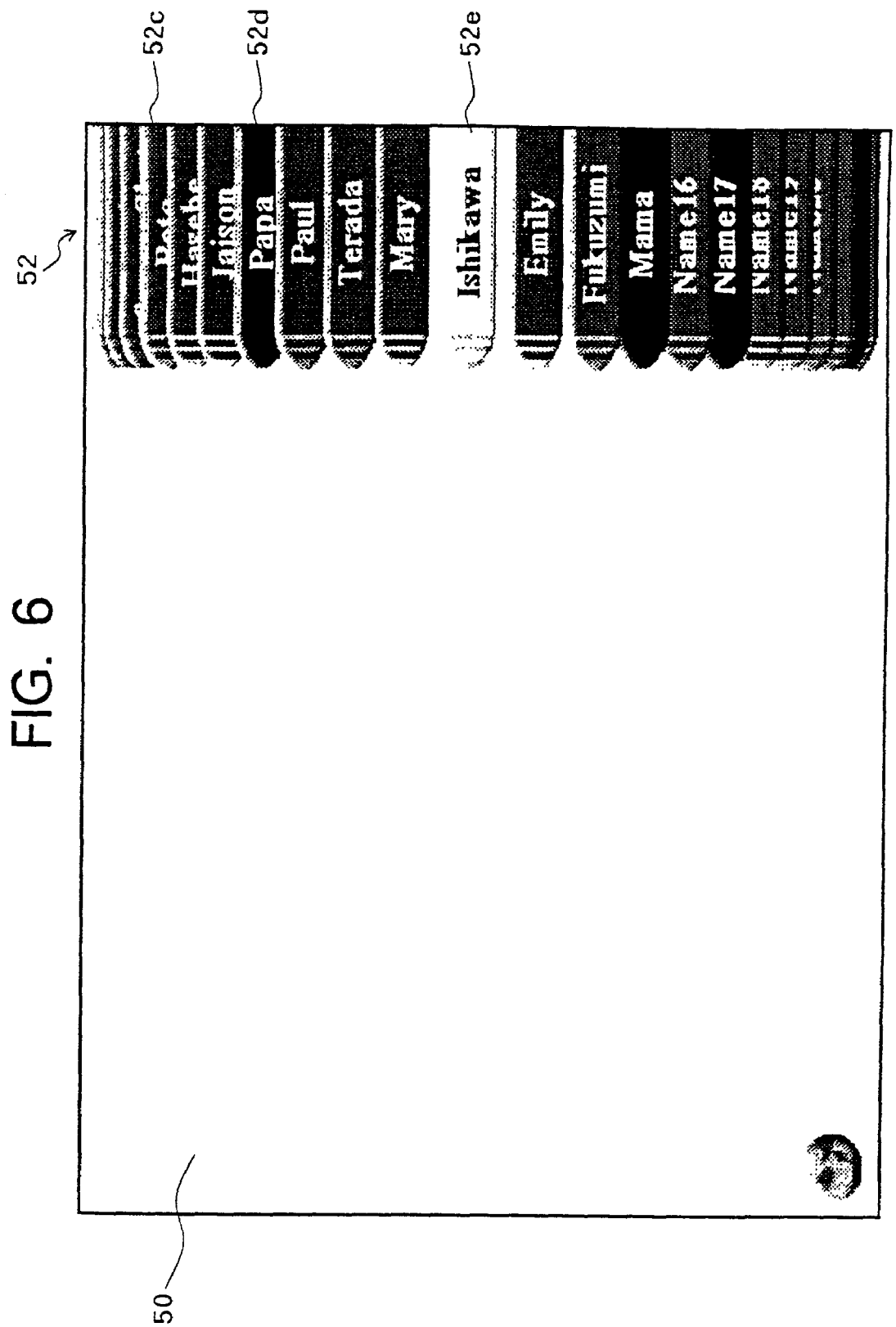
FIG. 6 is a schematic view showing the display of a target change operation of the buddy list.

A plate of the buddy list 52 can be selected by pressing the up or down button 30, 31 on the remote control unit 17, and then confirming the selection by pressing the entry button 34. Each time the target plate is changed, the display of the buddy list is changed by rearranging the stacked condition of the plates of the buddy list to fully display plates around the target plate. For example, when the target plate is changed from the "my group" plate 52a to the "Ishikawa" plate 52e, the buddy list screen will change from as shown in FIG. 5 to as shown in FIG. 6. With this configuration, there is no need for a scroll bar.

The "my group" plate 52a indicates other client devices of the buddy list that are sharing the television watching experience with the user of the client device 1 in a "my group" mode to be described below. In the example of FIG. 5, "my group" has no members, and so the nose of the "my group" plate is displayed black.

The "chat" plates 52b relate to groups of client devices that communicate about a specific channel using the TV sharing function. Selecting one of the chat plates executes a chat application similar to that described in U.S. Pat. No. 5,828, 839, incorporated herein by reference.

Figure 8:
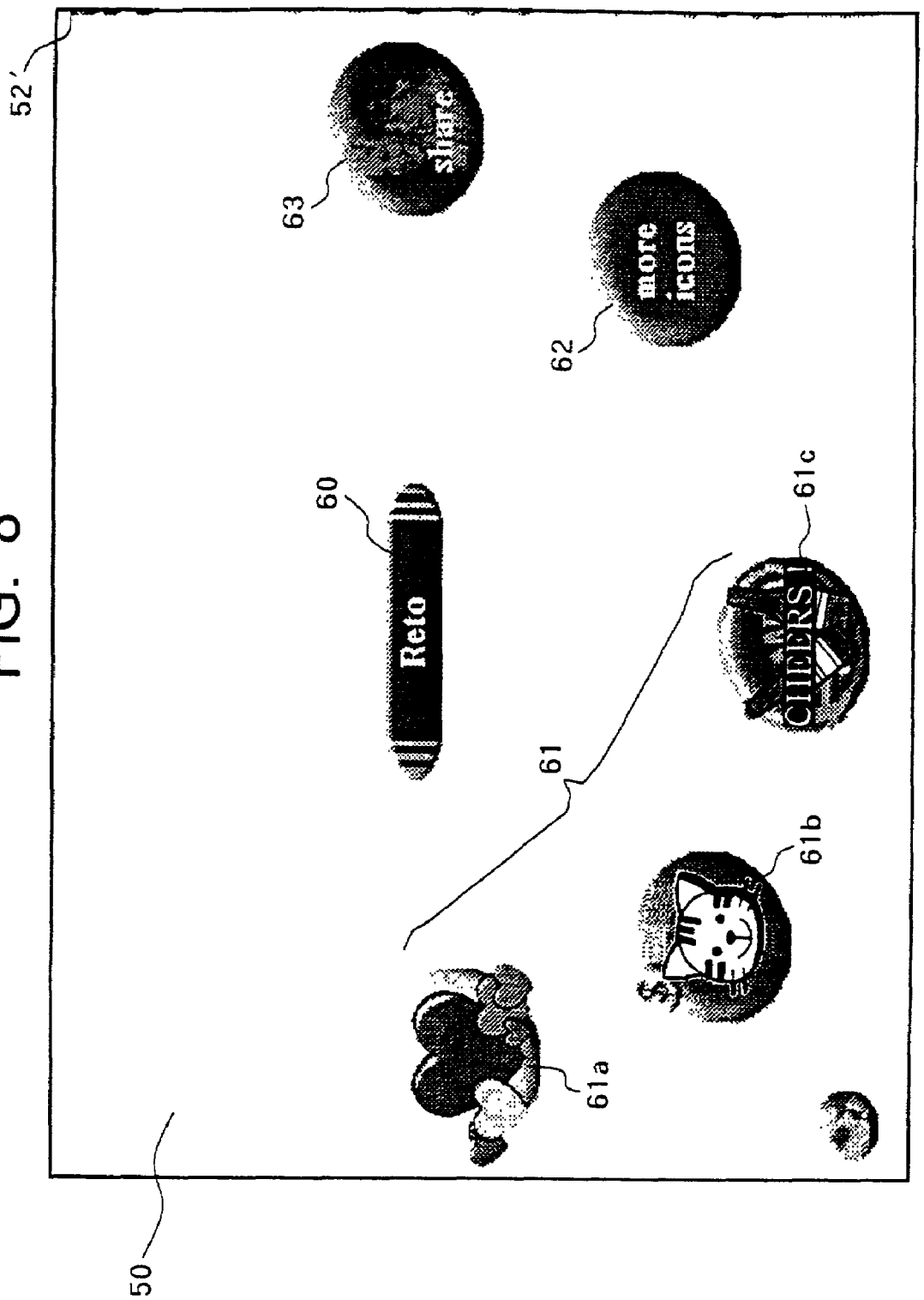
FIG. 8 is a schematic view showing the display of a choose icon interface.

Selecting one of the buddy plates leads to a choose icon interface shown in FIG. 8.

Although not shown, the tool plate is located at the end of the buddy list. The tool plate leads to a tools interface shown in FIG. 31. The tools interface is for adding plates to the buddy list, changing settings of the application, and performing other functions to be described later.

Figure 7:
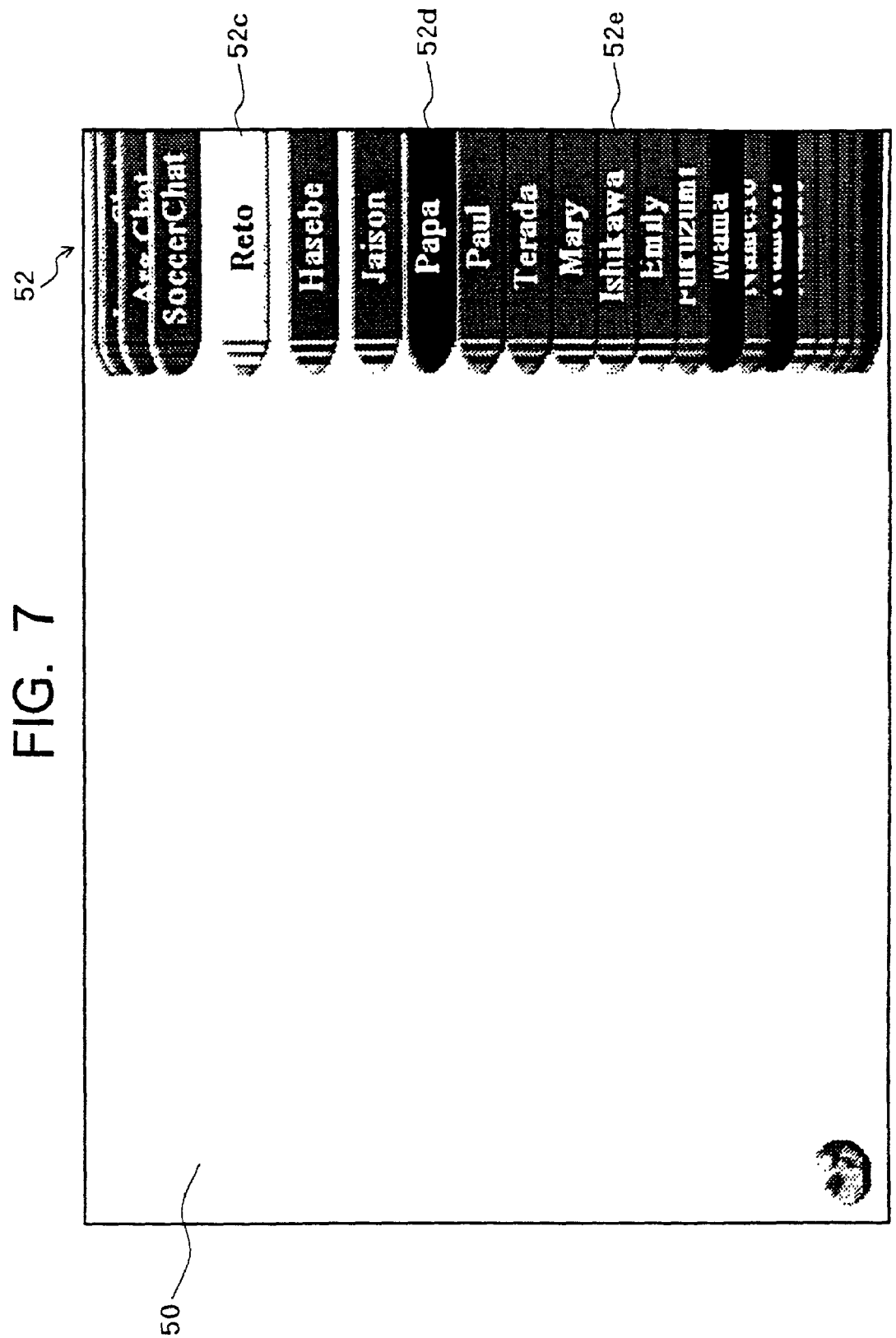
FIG. 7 is a schematic view showing the display of the buddy list while a "Reto" buddy plate is the target of operations.

When the enter button 34 is pressed while a buddy plate is the target of operations, then the client device that corresponds to the buddy plate is set as the target of all icon communications. This is also referred to as one-to-one communication. Operations are similar when the "my group" plate is selected, except that all members of "my group" are set as the target of icon communication. This is also referred to as one-to-many communication. In the present example, the "Reto" plate 52a is the target plate as shown in FIG. 7 when the selection is confirmed. As a result, the display 11 is controlled to change the buddy list screen to the icon choose interface shown in FIG. 8. That is, the "Reto" plate 52c pulls out from the buddy list 52 and moves to the center of the screen, and is displayed there as a target buddy button 60. The buddy list 52 itself draws back to be displayed as the visual clue 52'. Also, displayed buttons 61 to 63 are moved onto the screen. The displayed buttons 61 to 63 include three suggested icon buttons 61, a more icons button 62, and a share button 63.

The suggested icon buttons 61 represent icons suggested by the icon suggestion engine of the server 5, and each is displayed superimposed with an image representing the corresponding icon. The icon suggestion engine suggests icons based on different parameters. For example, the engine could merely determine which icons the client device 1 sends most often, and suggest these icons. The icon suggestion engine could analyze the record of icon exchange between the client device 1 and the target client device 2 to determine the relationship between the two users, and suggest icons accordingly. The engine can suggest icons based on the television content being presently viewed at the client device 1, for example, icons related to the television content, with comments suitable for the content, or that relate to products of advertisers of the television content. The engine could recommend icons that require a fee to transmit, such as the suggested icon button 61b, which includes a "$" sign to indicate that the user must pay to send this icon.

The user can send an icon indicated on one of the suggested icon buttons 61 directly to the target client device (client device 2 in this example) by using the "1", "2", and "3" buttons 24, 25, and 26 of the remote control unit 17. That is, the three suggested icon buttons 61a, 61b, and 61c are displayed with the outer rim of the button in yellow, red, and green, respectively, to indicate correspondence with the "1" button 24, the "2" button 25, and the "3" button 26, respectively.

Figure 9:
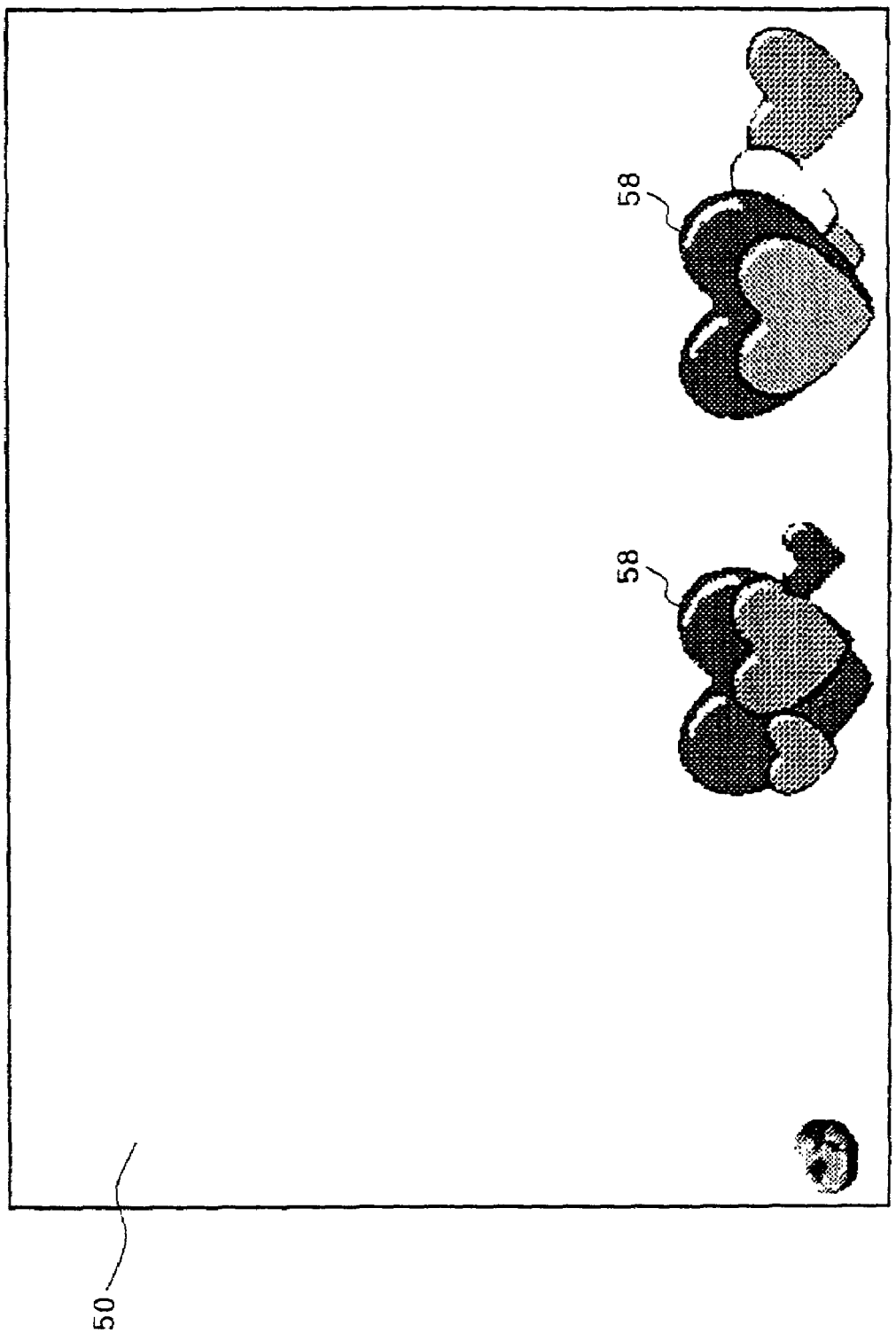
FIG. 9 is a schematic view showing the execution of a one-way icon.

Here, operations performed when an icon is sent to the target client device will be described. In this example, the user of the client device 1 presses the "1" button 24 to send the "hearts" icon to client device 2. As a result, the client device 1 sends a request to the server 5. The request includes a command to send an icon, the client device identification number of the target client device, the client device identification number of the sender client device, information identifying the present user, and icon identification data that identifies the target icon. When the target icon is a customizable icon, then the request also includes information describing the customized aspect of the icon. The "hearts" icon is not customizable so no customized information is attached in this example. When the server 5 receives the request, the server 5 looks up the address of the target client device based on the client device identification number of the target client device 2, and sends a command to the target client device 2 to execute the target icon. The command includes the icon identification data, the client device identification number of the sender client device 1, the individual identification number of the present user, and any customized information. The server 5 also sends the same command to the sending client device 1, and makes entries in the log file indicating who sent which icon to who, for data mining purposes. When the sender and target client devices receive the commands, then both search the data in the hard disk 14c for icon display and audio data that correspond to the icon identification data in the command from the server 5. Both the sender and target client devices execute the target icon based on the corresponding icon display and audio data. As a result, an animated image is displayed as shown in FIG. 9, wherein hearts 58 fall down from the top of the screen to the bottom of the screen.

Figure 10:
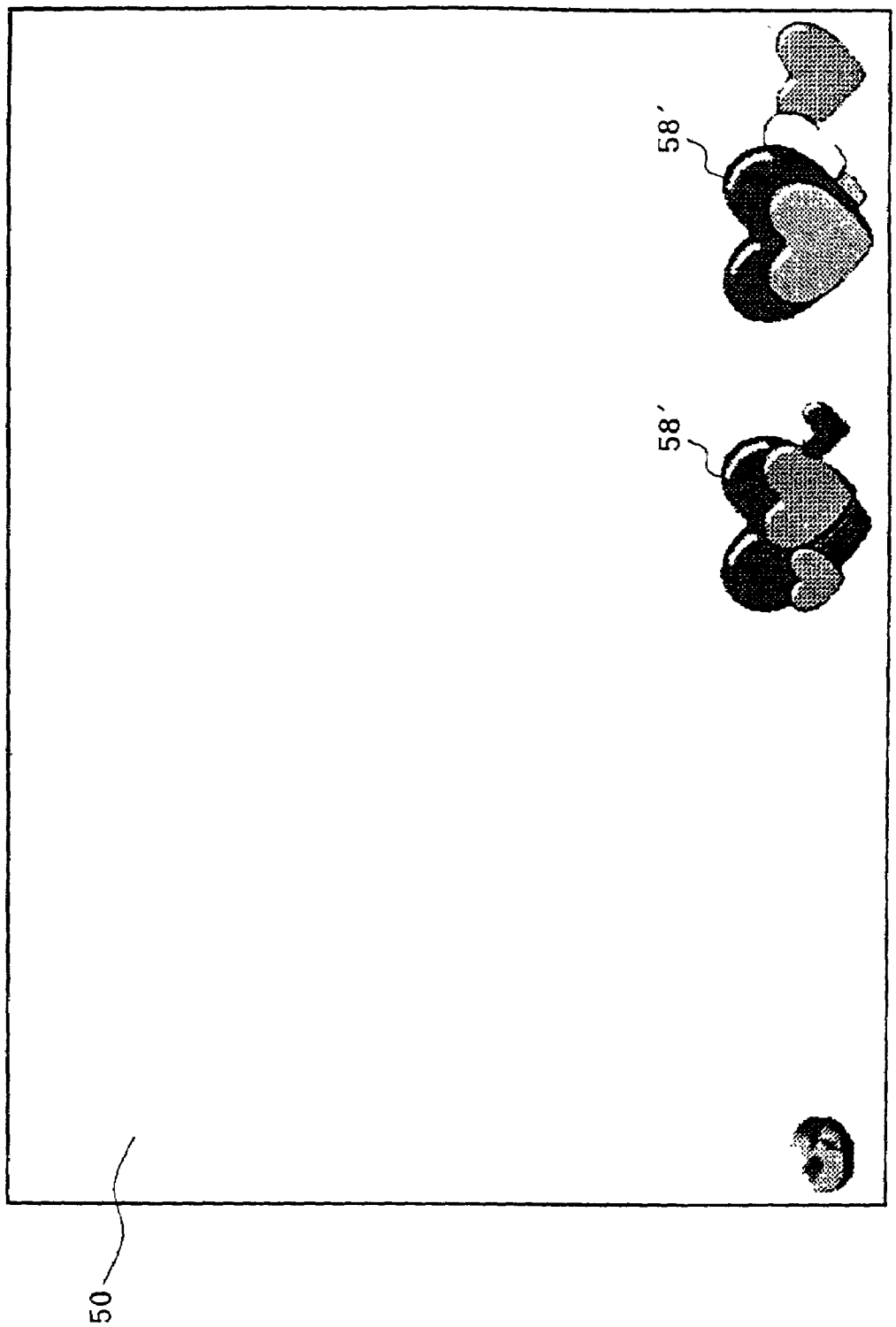
FIG. 10 is a schematic view showing the icon of FIG. 9 in a reduced size.

Because the icon images are displayed on the display unit 11 overlaid over the television content, a user may feel they interfere with viewing television. In this case, the user can select settings using the tools interface so that executed icons are displayed in a small version such as shown in FIG. 10, which is 25% of the size shown in FIG. 9. Although not shown, there is a selection that displays icons in a semi-transparent manner.

After the client device 1 sends the request to the server 5, the "visual clue" screen is displayed. Also, the plate of the client device where the icon was just sent is designated as the target buddy. To indicate this designation, the nose of the target buddy's name plate is displayed blinking between blue and the color that indicates the buddy's on-line status. At this point, the user can perform two actions, press the X-pression button 29 or press the TV sharing button 28.

Figure 11:
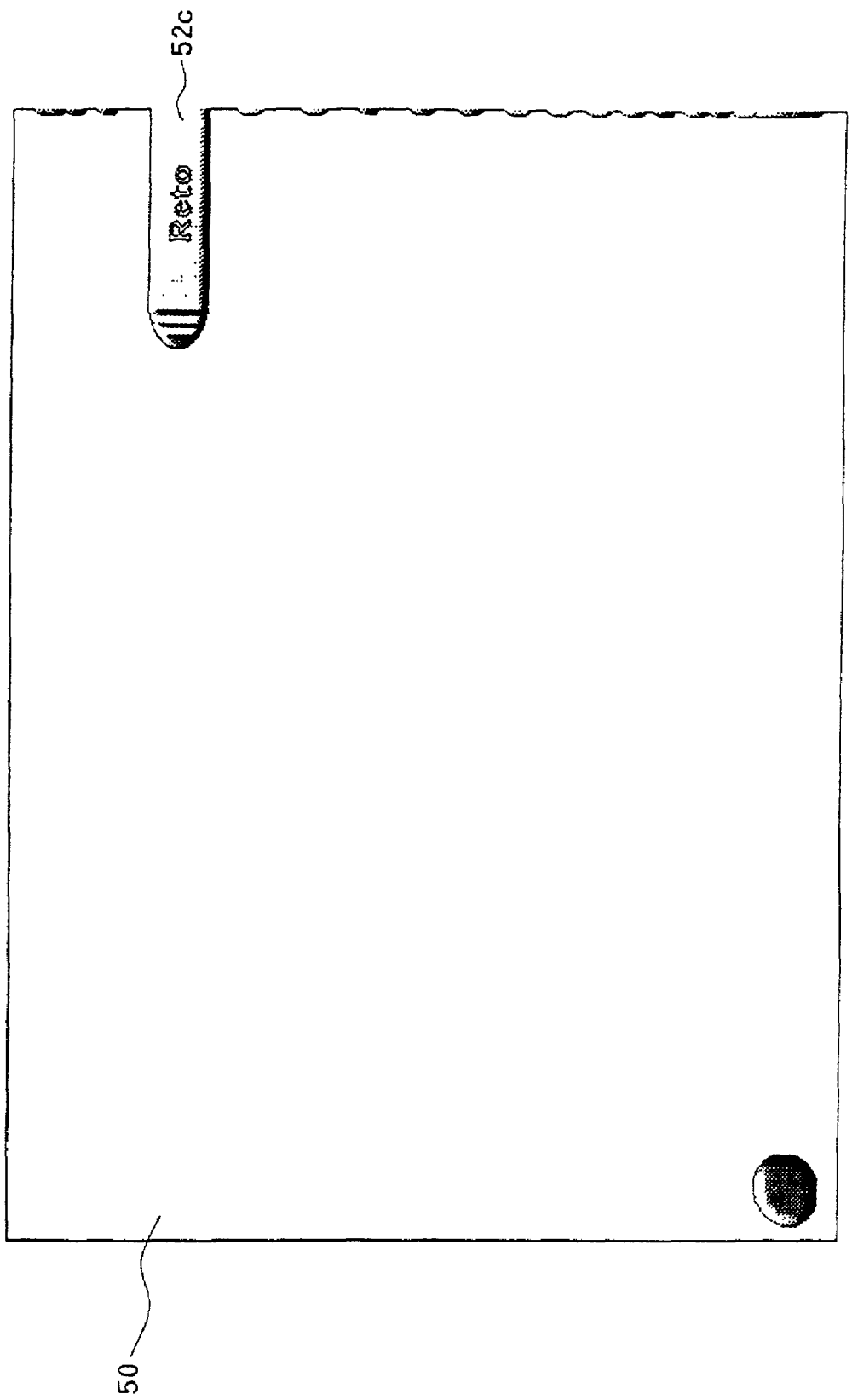
FIG. 11 is a schematic view showing an action performed when an expression button of the remote control unit is pressed.

When the user presses the X-pression button 29, then a request is sent to the server 5. The request includes the client device identification number for the target client device, the client device identification number of the sender client device, information identifying the present user, and icon identification data indicating icon display and audio data for a predefined expression. Then the server 5 sends a command to both the sender client device and the target client device. The command includes icon identification data indicating icon display and audio data for the predefined expression, the client device identification number of the sender client device, and information identifying the present user. When the client devices receive the command, they execute the icon. "Laughter" is the default expression in this example. Therefore, the icon identification data indicates a laughter audio file stored in the hard disk of the client devices. The sender and receiver client devices retrieve the laughter audio file from the hard disk, and execute the file to generate laughter. When the sender client device executes the icon, the display is controlled so that the name plate of the target buddy slides out as shown in FIG. 11 and back in to indicate to the user that the expression was properly sent to the target buddy. At the target client device, the laughter is reproduced. Also, the buddy plate of the client device that sent the expression slides out and in based on the information identifying the present user, to show who sent the expression.

When the user presses the TV sharing button 28, if there is an active user, then the slide out animation is started and the buddy list 52 is displayed. If the user presses the TV sharing button 28 a second time before a predetermined duration of time, for example, the time required for the top plate of the buddy list 52 to fully slide out, then the target buddy plate slides out directly into the icon choose interface, with the target buddy plate as the target plate 60. If the user presses the TV sharing button 28 after the predetermined time elapses, then the TV sharing application stops, that is, the buddy list disappears and only the visual clue is displayed. In this case, the nose of the target buddy continues to blink between blue and the color indicating its status, to indicate that this is still the target buddy.

Here, operations performed when a client device receives an icon, that is, a command including icon identification data from the server 5, will be described in more detail. Operations performed for reception of an icon differ slightly depending on the icon class. This example will be provided assuming the receiving client device receives the "hearts" icon, which is a one-way icon. It should be noted that the user of the receiving client device can stop icon execution operations at any time by pressing the TV sharing button 28.

Figure 12:
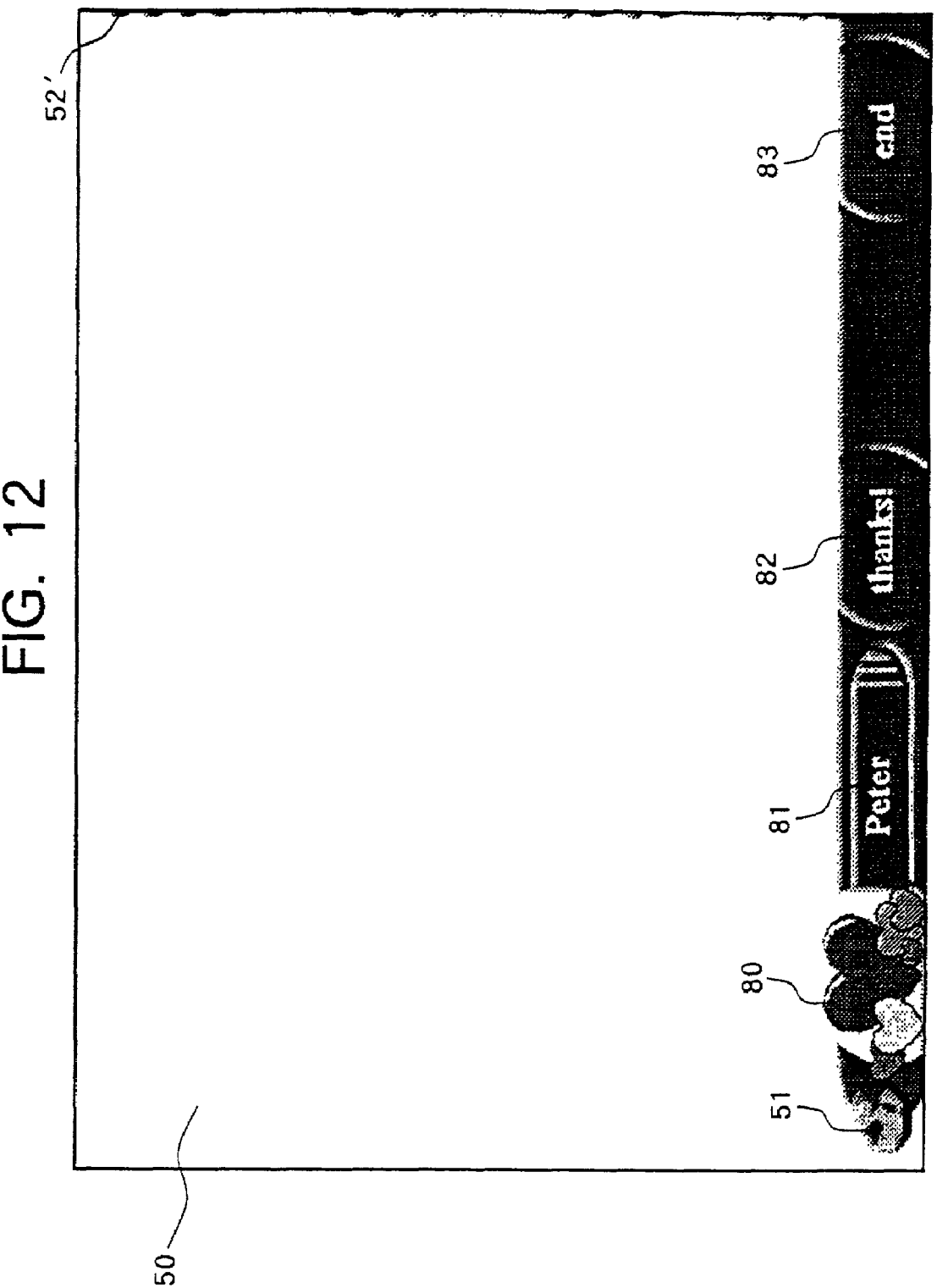
FIG. 12 is a schematic view showing the display of a sender's information interface after an icon is executed.

First, the icon is executed as shown in FIG. 9. After the received icon is executed, then a sender's information interface is displayed as shown in FIG. 12. The sender's information interface includes a review icon button 80, a sender's name button 81, a default message button 82, and an end button 83. These buttons can be selected using the left and right buttons 32, 33 on the remote control 17. When the user confirms selection of one of the buttons by pressing the entry button 34, then an operation is performed depending on the selected button.

The review icon button 80 is displayed superimposed with a small image representing the received icon. When the review icon button 80 is selected, then the icon is executed again. The default message button 82 allows the recipient to send a simple message back to the sender, without having to go through any preparation or confirmation interface. When the default message button 82 is selected, then a request is sent to the server 5 to send the simple message appropriate for the received icon back to the sender of the icon. In this example, the request would indicate that the simple message "Thanks!" be sent to client device 1. When the end button 83 is selected, then display of the sender's information interface is stopped and this routine is ended.

Figure 13:
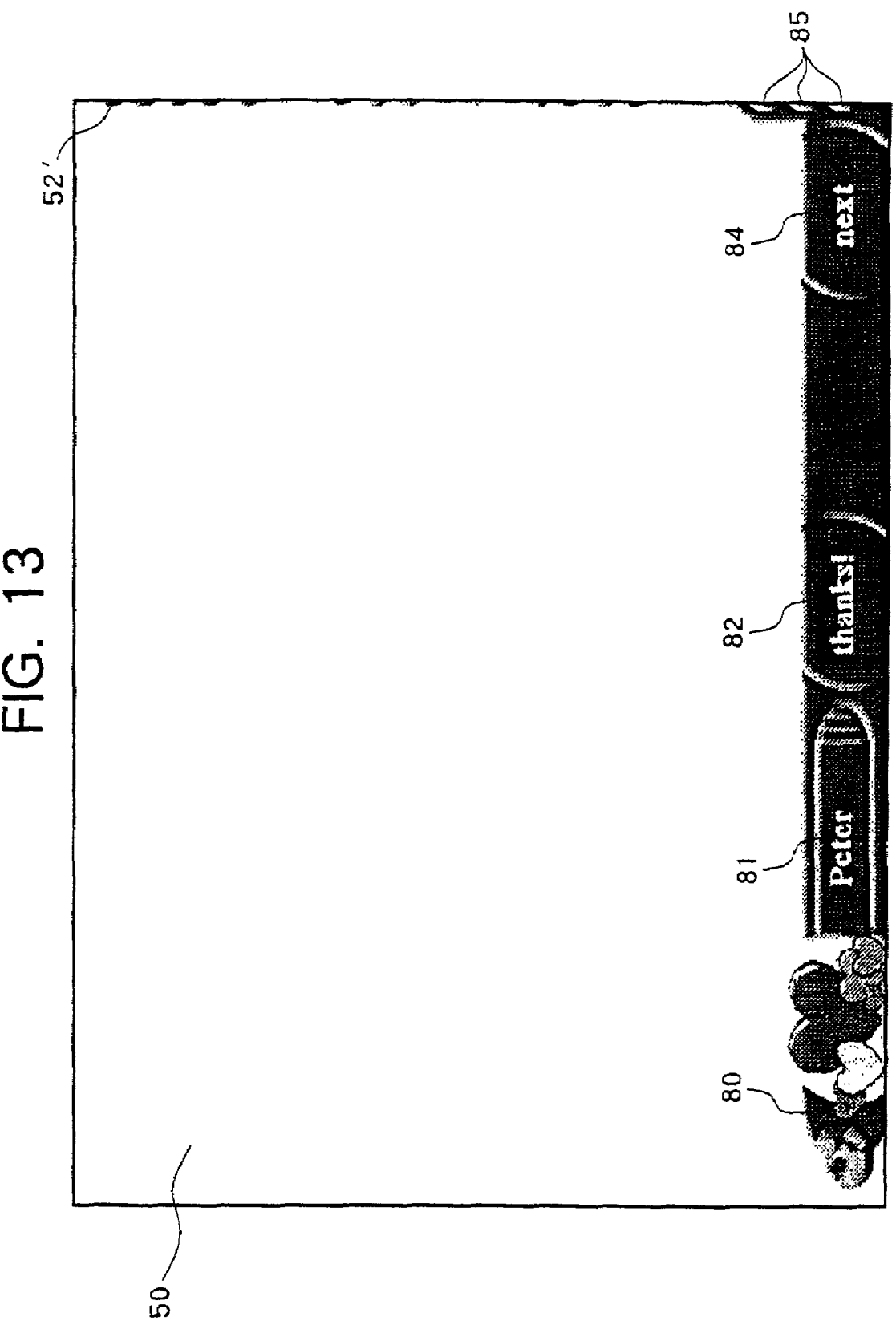
FIG. 13 is a schematic view showing the display of a next icon interface while icons are "on hold"

While the sender's information interface is being displayed, no newly received icons will be displayed, but will instead be put "on hold." That is, if another icon is received, then a next icon interface is displayed as shown in FIG. 13. The next icon interface is similar to the sender's information interface, but includes a next button 84 instead of the end button 83. Also, on-hold icon indicators 85 show how many icons (three in this example) were received and are waiting for execution. When the next button 84 is selected, then the next icon interface for that present icon is stopped, and the next icon interface (or sender's information interface) for the next icon is displayed.

Although not shown in FIGS. 12 and 13, when the received icon includes a customized text message, then the sender's information interface and the next icon interface are displayed with a text reply button between the thanks button 82 and the end/next button 83/84. When the text reply button is selected, the icon preparation interface for the same type of icon is displayed, so the receiver can edit his own, personal reply to the received icon.

Figure 14:
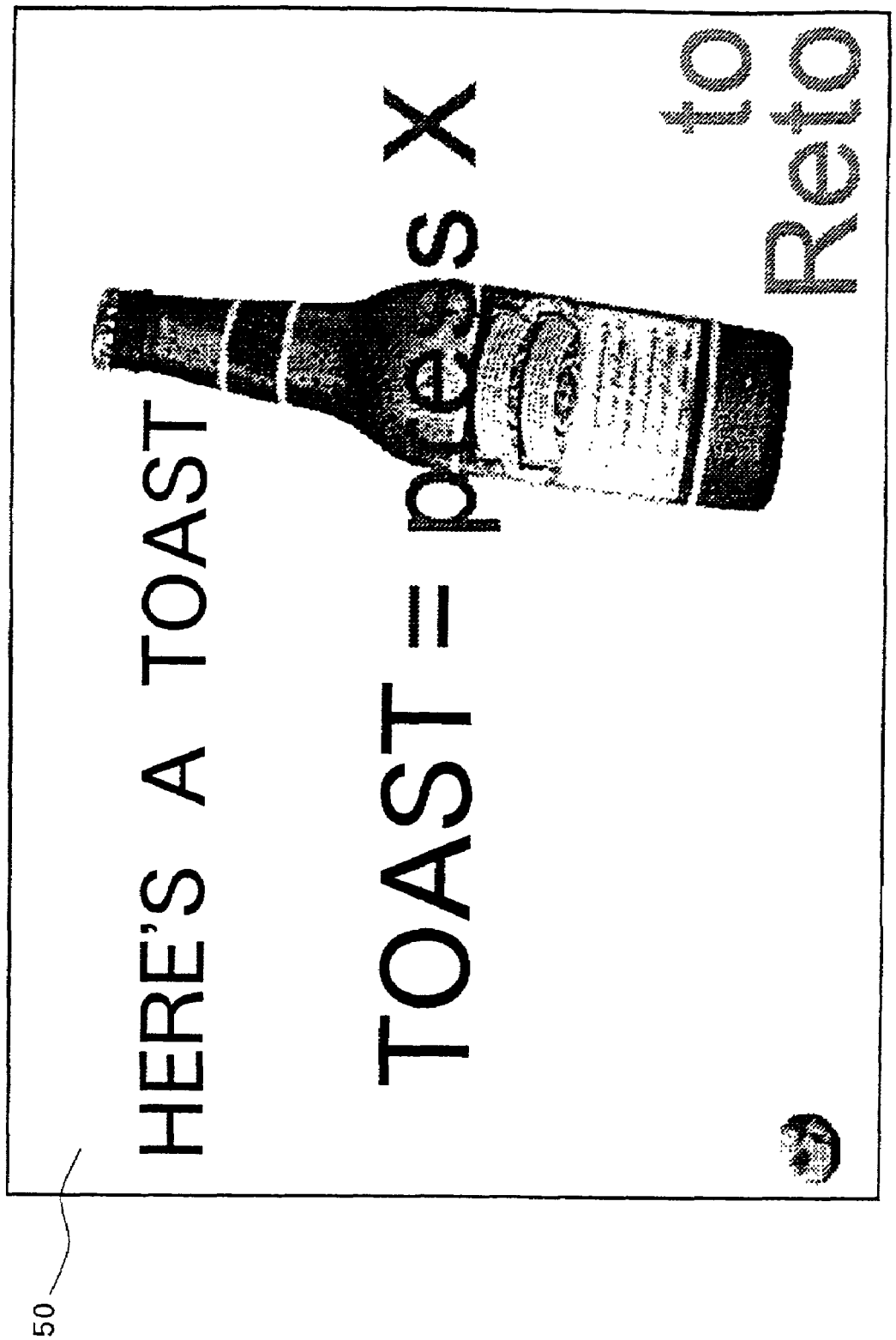
FIG. 14 is a schematic view showing the execution of a limited interactive icon.
Figure 15:
FIG. 15 is a schematic view showing the execution of a further portion of the icon shown in FIG. 14.

Next, an example of a limited interactive icon will be provided with reference to FIGS. 14 and 15. In this example, the user of client device 1 sends a "toast" icon to the client device 2 by pressing the suggested icon button 61c of the icon choose interface shown in FIG. 8. When the "toast" icon is executed at the client device 2, then as shown in FIG. 14, a beer bottle is displayed on the display of client device 2, with text offering a toast to Reto, the user of client device 2. The receiver can respond by pressing the X-pression button 29, doing nothing, or pressing the TV sharing button 28. If the user of the client device 2 presses the X-pression button 29, then a predetermined interaction is performed. The interaction is fixed for each icon. In this example, the predetermined interaction is a toast as shown in FIG. 15. The same interaction is displayed at both client devices 1 and 2 through communication via the server 5. If the receiving user does not press any button within a predetermined time, for example 30 seconds, then display of the icon is stopped, and an appropriate message is sent to the sender client device via the server 5. In this example, the message says that the receiver does not want to toast with the sender. The same operation is performed if the TV sharing button 28 is pressed.

Small group interaction icons are normally performed during the "my group" mode, so an example of a small group interaction icon will be explained later, after explanation of the "my group" mode.

Figure 16:
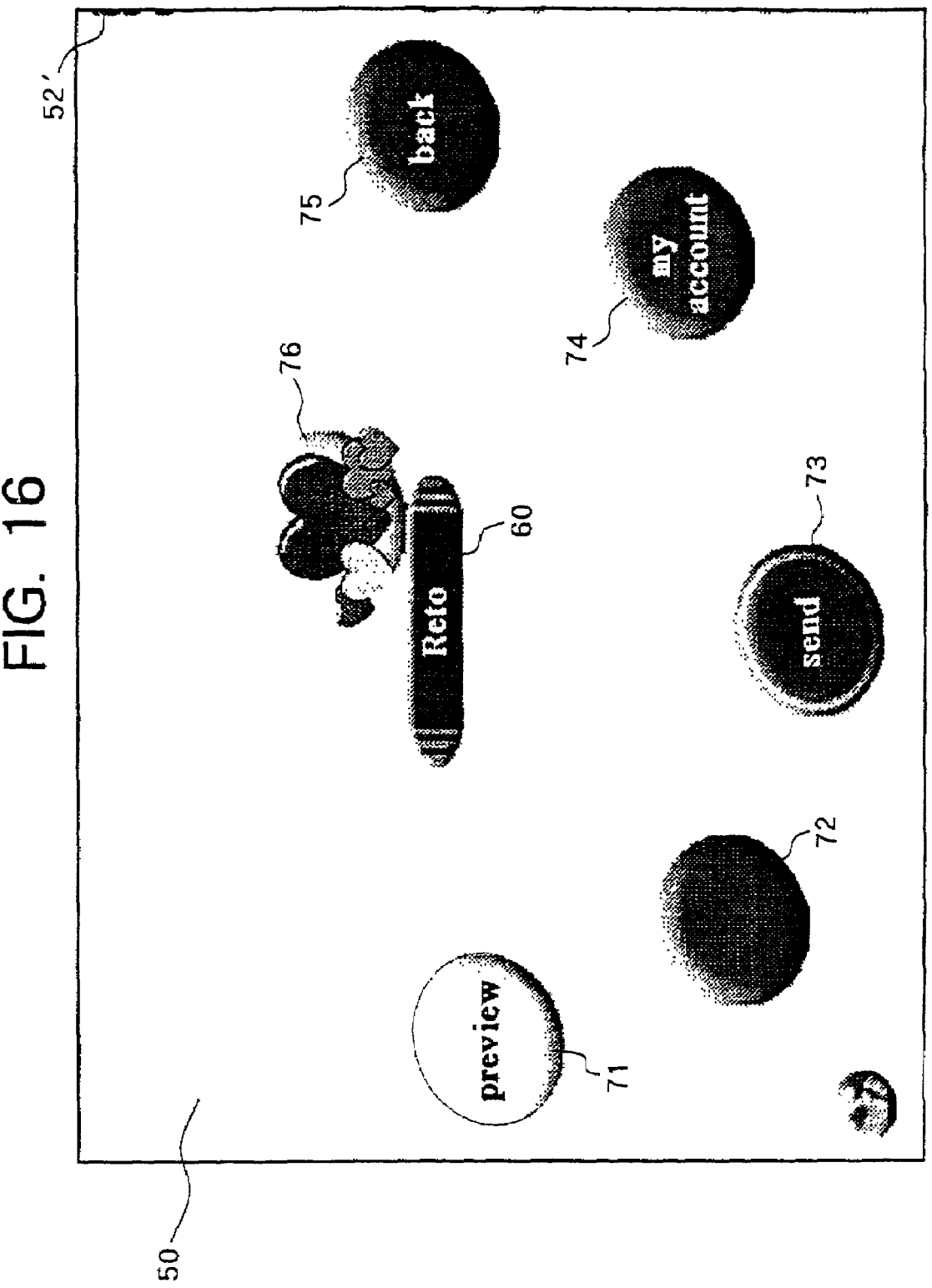
FIG. 16 is a schematic view showing the display of an icon preparation interface.

When the user uses the left and right buttons 32, 33 of remote control 17 to select one of the displayed buttons 61 to 63 of the icon choose interface of FIG. 8, and confirms the selection using the entry button 34, then an icon preparation interface is displayed as shown in FIG. 16. Actually, each of the suggested icon buttons 61 leads to a different icon preparation interface that corresponds to the icon image decorating the displayed icon button. However, basic operations are the same for all of the icon preparation interfaces. In the example of FIG. 16, the "hearts" icon button 61a was the target button when the enter button 34 was pressed.

The icon preparation interface includes a preview button 71, a change button 72, a send button 73, a my-account button 74, a back button 75, the target icon 76, and the target buddy button 60. As with the icon choose interface, the user can select any of the buttons by pressing the left or right buttons 32, 33 and the enter button 34. The target icon 76 is not a button in itself, but is displayed to remind the user about which icon will be sent if the send button 73 is pressed.

When the preview button 71 is selected, then the target icon is executed at the local client device, so the user can understand what the recipient will see when the target client device receives the icon.

Figure 17:
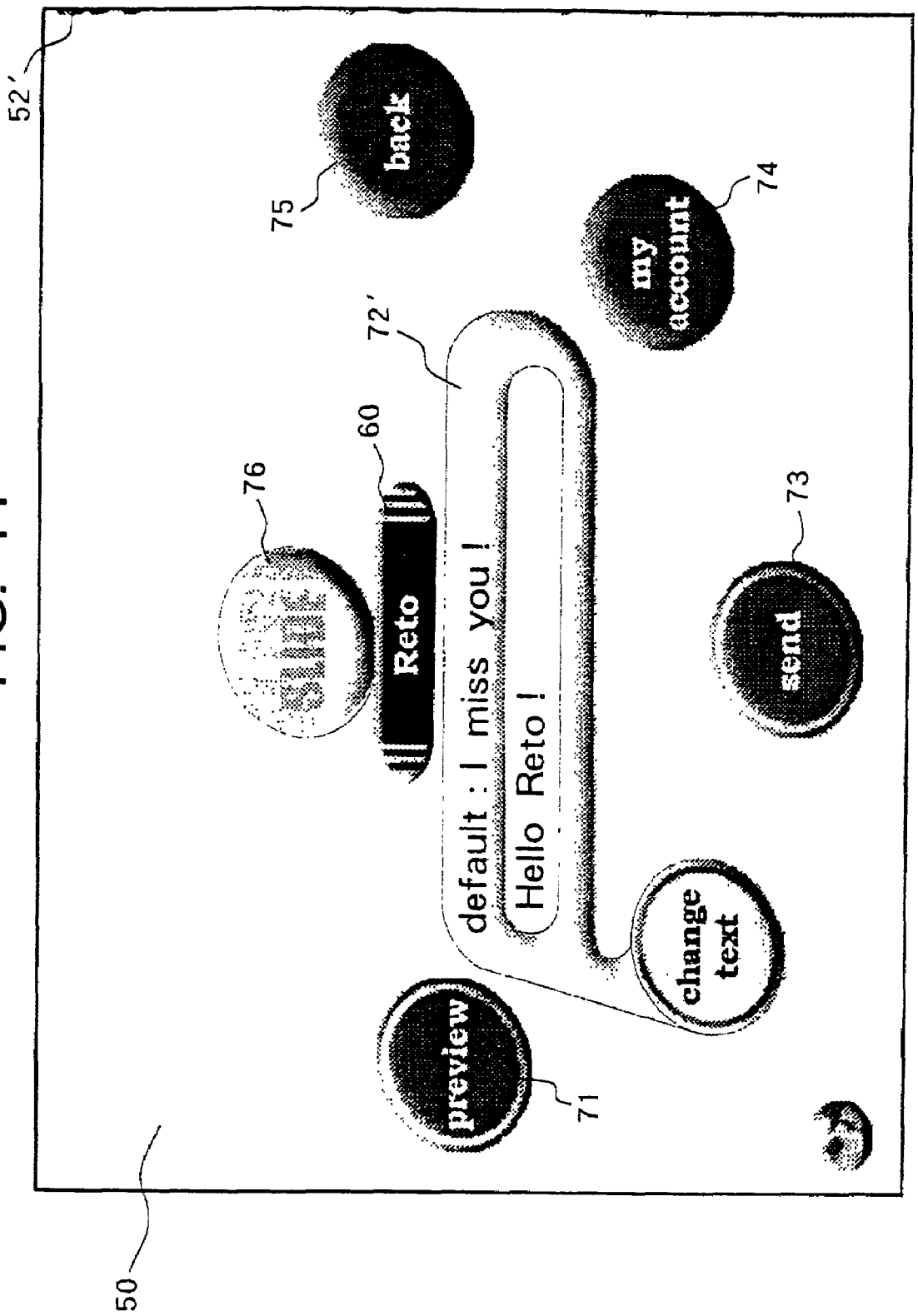
FIG. 17 is a schematic view showing the display of an icon customizing interface.

The change button 72 is displayed active only when the target icon is a customizable one-way icon. Since the "hearts" icon has no customizable parts, the change button 72 is displayed in a manner to indicate it is inactive. When the change button 72 is selected while a customizable one-way icon is the target icon, then an icon customizing interface is displayed on the display 11, as shown in FIG. 17, to enable the user to change a text portion of the icon using the alphanumeric key pad 23. In the example shown in FIG. 17, the user has input the text "Hello Reto!" in order to replace the default text "I miss you!" of a "SLIDE" icon 76. The executed icon 76 is shown in FIG. 18. The clear button 22 on remote control 17 is used as a backspace when inputting characters with the alphanumeric key pad 23.

When the send button 73 is selected, then the target icon is sent to the target buddy in the manner described above. When the my account button 74 is selected, then an interface (not shown) is displayed with micro-billing and account information. When the back button 75 is selected, then the icon choose interface of FIG. 8 is displayed.

Figure 19:
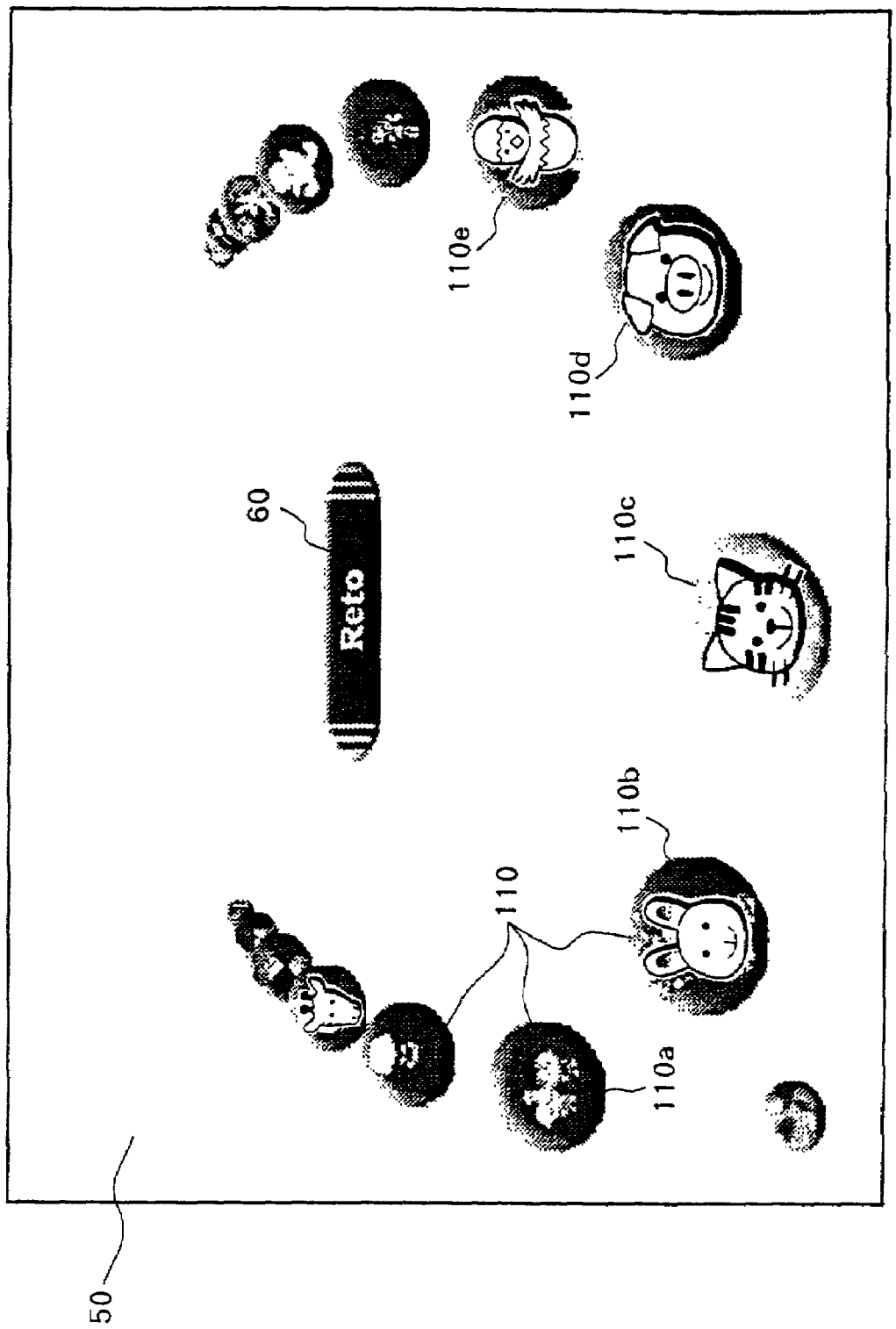
FIG. 19 is a schematic view showing the display of a more icons interface.
Figure 20:
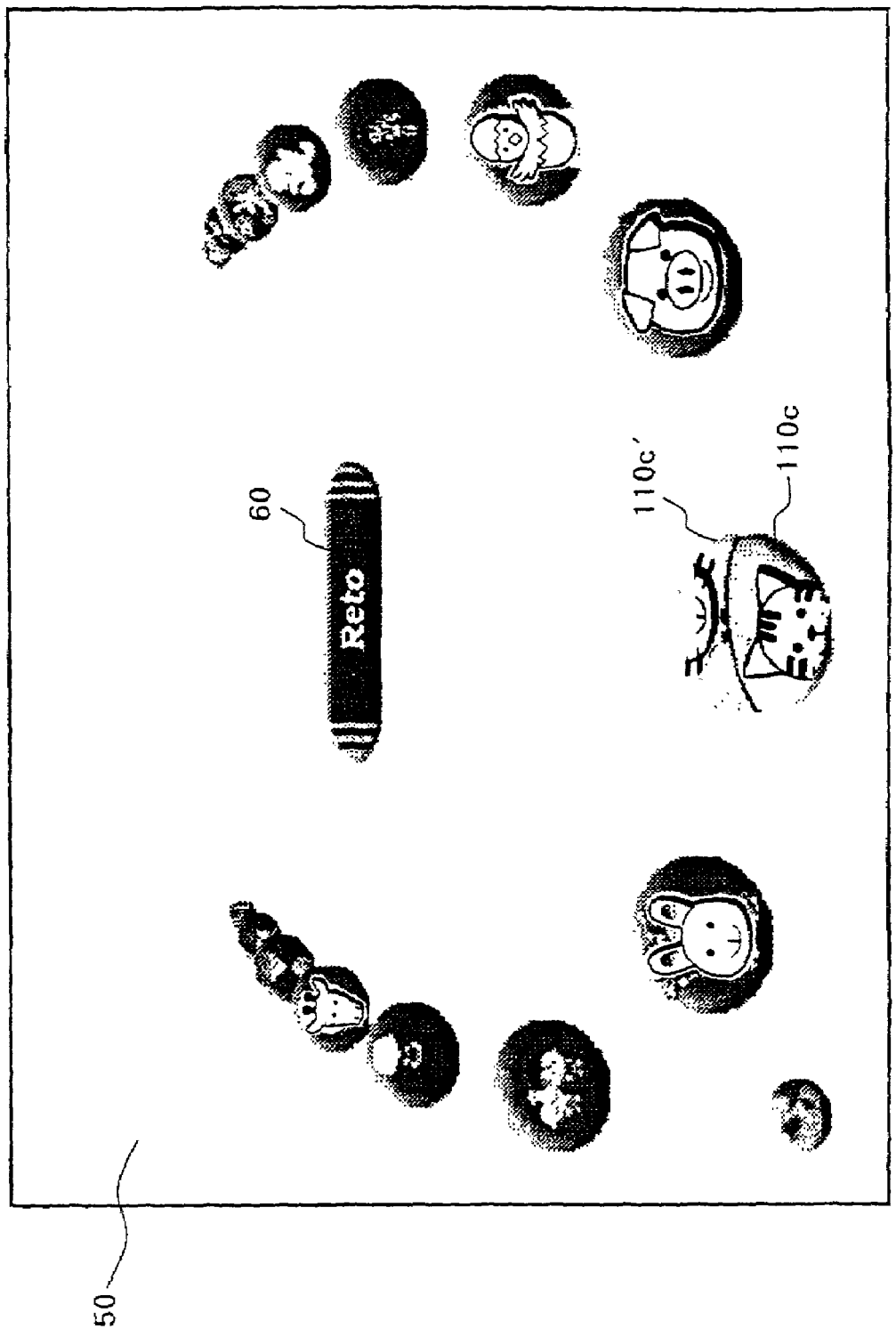
FIG. 20 is a schematic view showing the selection of similar icons in an icon button of the more icons interface of FIG. 19.
Figure 21:
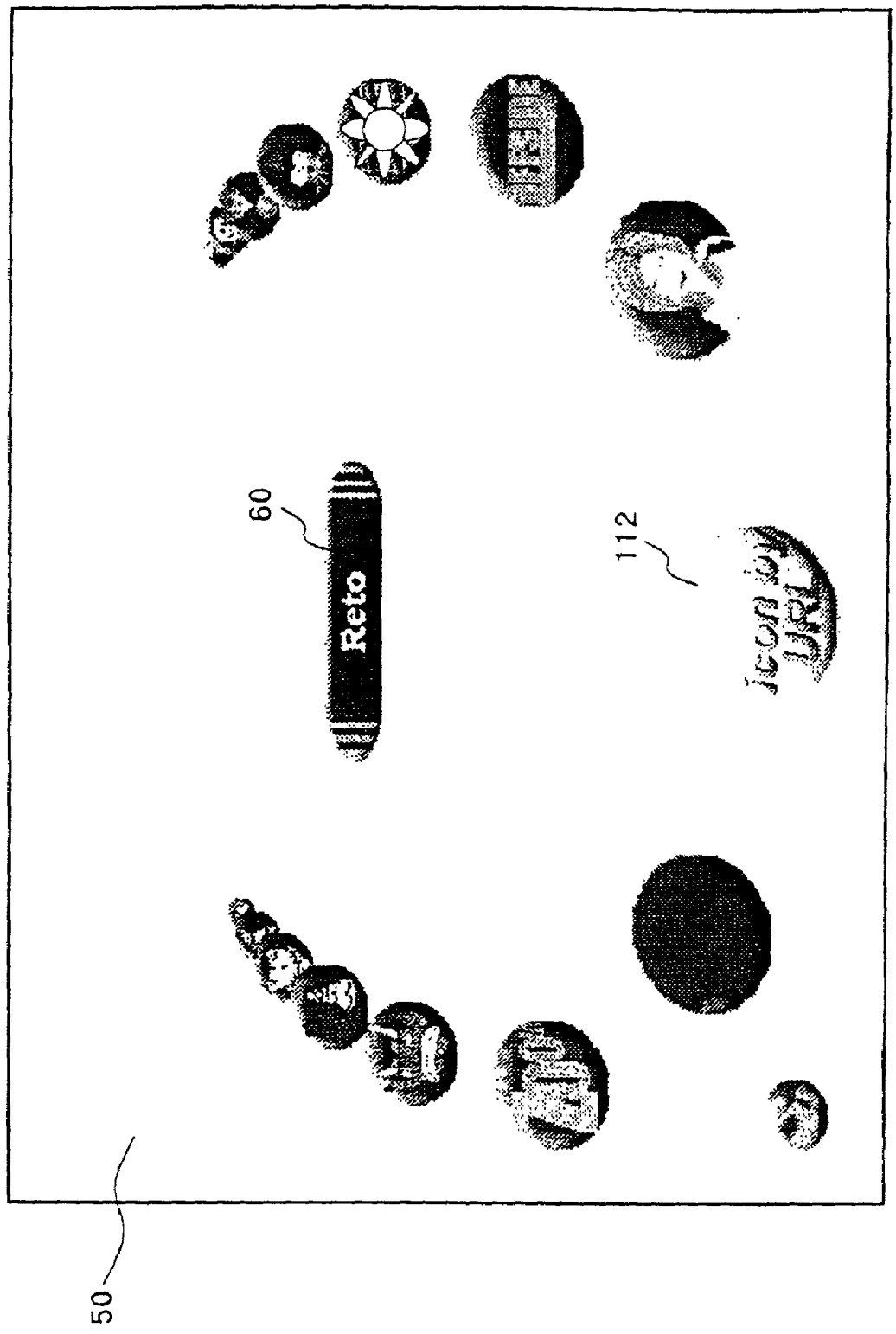
FIG. 21 is a schematic view showing an Internet connection button of the more icons interface of FIG. 19.

When the more icons button 62 of the icon choose interface of FIG. 8 is selected, then a more icon interface is displayed as shown in FIG. 19. The more icons interface includes a plurality of icon buttons 110 in a continuous ring configuration. Only a subset containing a fixed number of icons is displayed at one time. The five front center buttons 110a to 110e are icons suggested by the icon suggestion engine of the server 5. The following icon buttons 110 are always in the same order. The front center icon 110c is the target of operations to be selected by pressing the enter button 34. The user can browse through the icon buttons 110 by pressing the left and right buttons 32, 33, whereupon the ring moves left or right accordingly to change the target of operations. When the user presses the up and down buttons 30, 31, the icon displayed on the target button 110c switches, as shown in FIG. 20, to a similar icon. With this configuration, the user need not enter folders to access icons of a similar nature. When one of the icon buttons 110 is selected, then the icon preparation interface of FIG. 16 is displayed for the icon displayed on the selected icon button 110. An Icon URL button 112 is also provided as shown in FIG. 21. Users of the client devices produce their own TV sharing icons and store them in files (.stv files) on the server. By selecting the icon URL button 112, a command with a URL is sent to the server to access the files with such TV sharing icons so that the user can select icons stored on the server. For example, a file with the "hearts" icon could be called heart.stv. The icon URL button 112 is always displayed at the unseen far end of the ring when the more icons interface is first displayed. Alternately, a browser application is started, and the client device is connected to a web page of the Internet with a further selection of icons. Although not shown in the drawings, a button for starting an authoring tool application can be provided to enable the user to create his or her own icons. The authoring tool could be located at the server, the client device, or in a separate personal computer.

Figure 22:
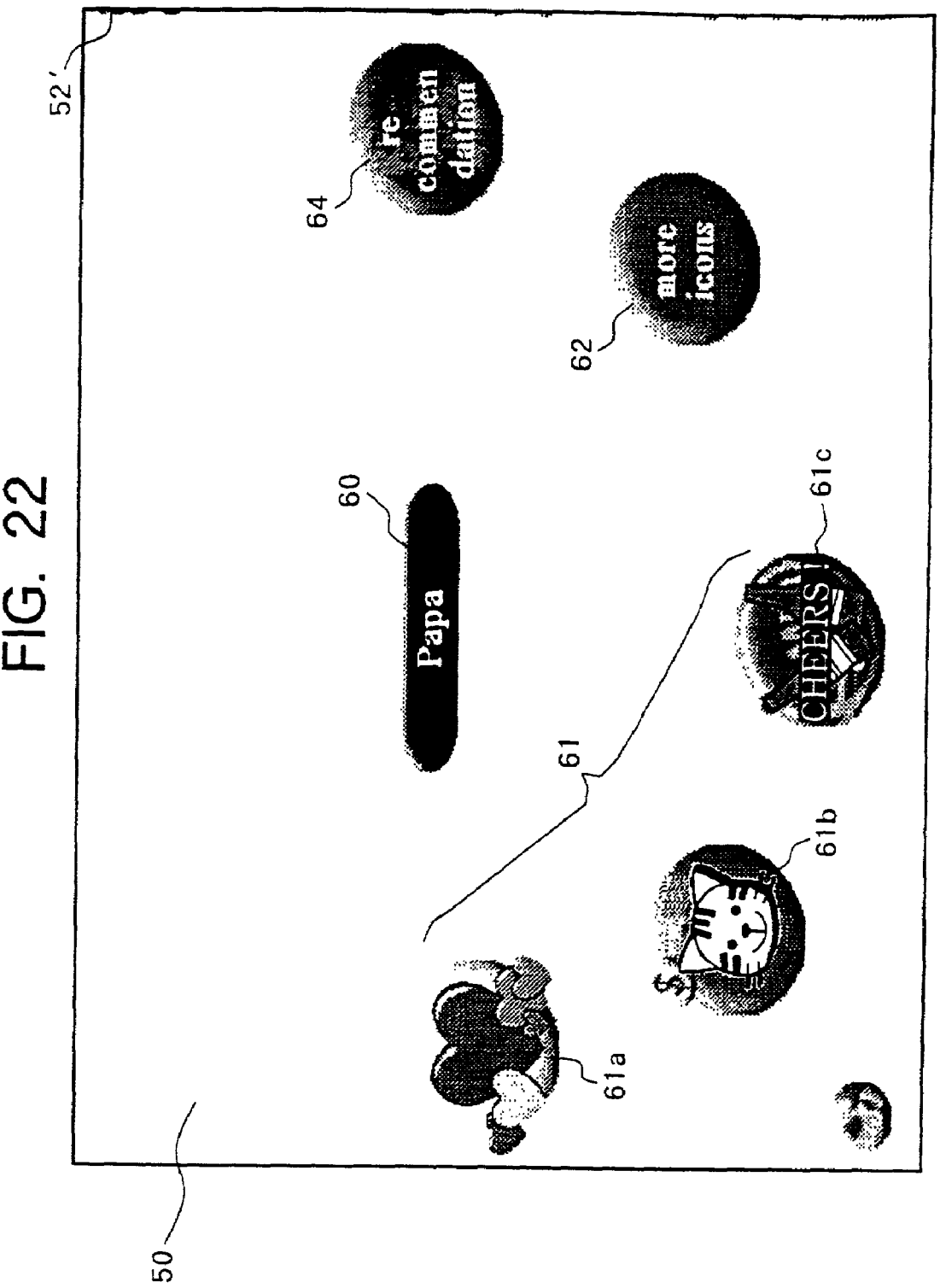
FIG. 22 is a schematic view showing the display of the choose icon interface when the target plate is one of somebody not watching television or not showing his online-status.

When the target buddy plate 60 is one of somebody not watching television or not showing his online-status, then the icon choose interface is displayed as shown in FIG. 22. An inactive buddy plate is one where the corresponding client device is not on line, or is not showing its on-line status to the server 5. In this case, the icon choose interface is displayed with a recommendation button 64, instead of the share button 63. By selecting the recommendation button 64, the client device sends a command to the target client device, via the server 5, to start recording the recommended television program on the hard disk of the target client device.

Figure 23:
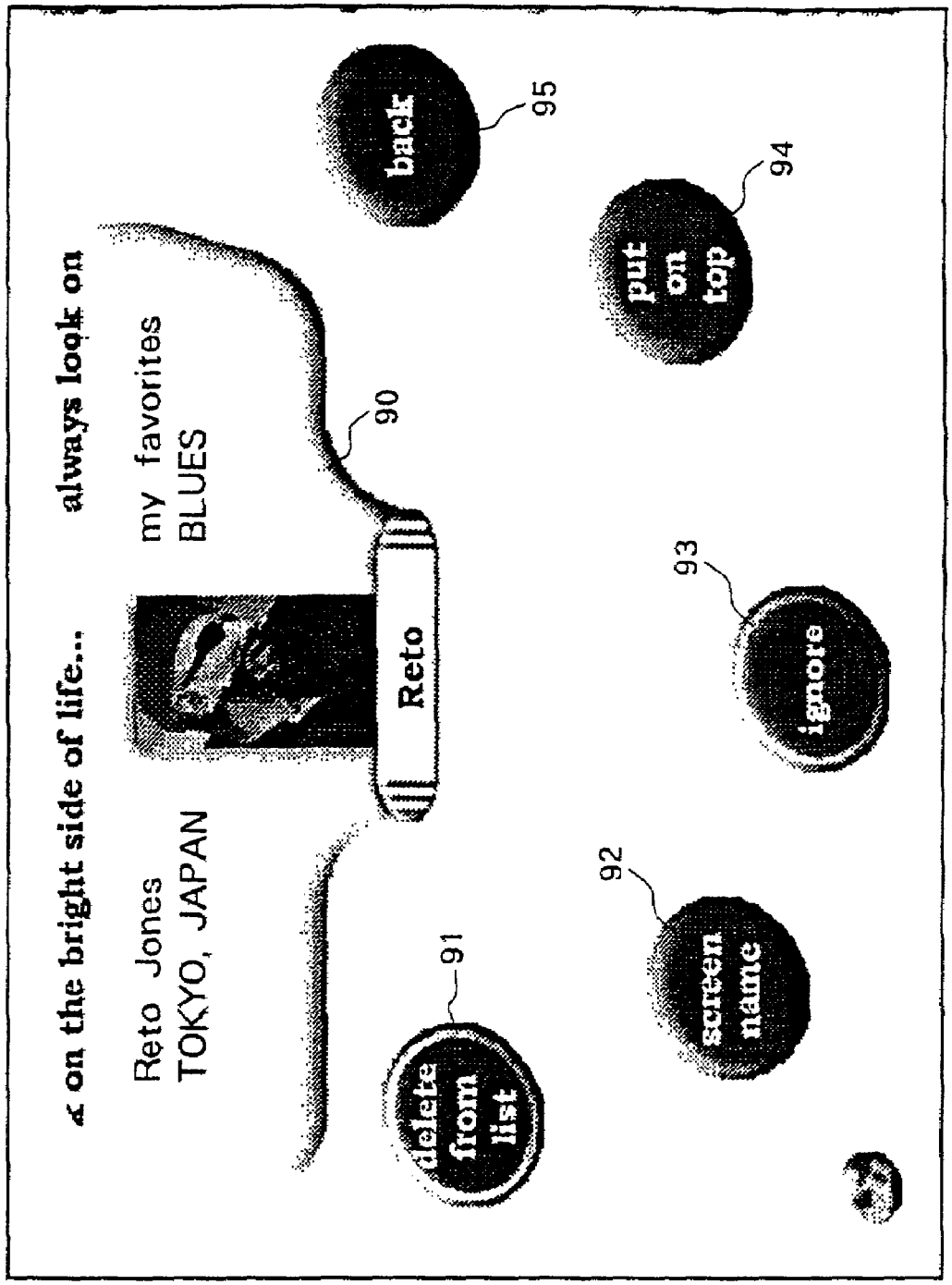
FIG. 23 is a schematic view showing the display of a buddy profile.
Figure 24:
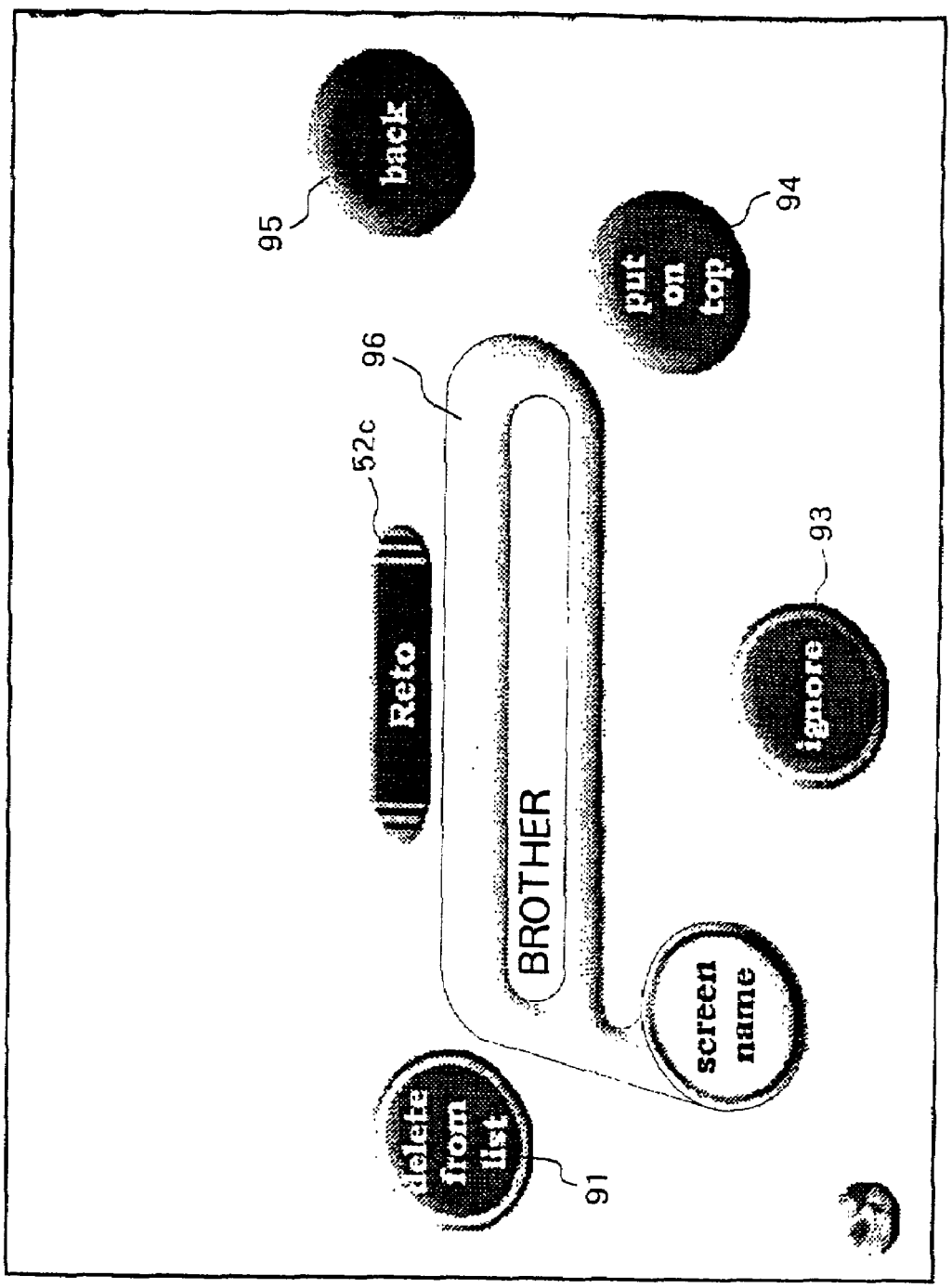
FIG. 24 is a schematic view showing the display of a name change interface.

When the user selects the target buddy button 60, then a buddy profile interface shown in FIG. 23 is displayed. The buddy profile screen includes a profile 90, a delete button 91, a screen name button 92, an ignore button 93, a put on top button 94, and a back button 95. The profile 90 shows information provided by the person that corresponds to the target buddy plate. When the delete button 91 is selected, then a request is sent to the server 5, asking to remove the corresponding client device 2 from the buddy list. When the screen name button 92 is selected, then the name change interface 96 shown in FIG. 24 is displayed to allow the user to change the name displayed on the buddy plate using the alphanumeric key pad 23. The clear button 22 is used as a backspace when inputting characters with the alphanumeric key pad 23. Display of the name change interface is stopped when the enter button 34 or the right arrow button is pressed. The buddy profile interface is also accessed when the target plate 60 is selected in other displayed interfaces, or when the sender's name button 81 is selected in the sender's information interface.

When the ignore button 93 is selected, then the client device sends a request to the server 5, asking to block icons, expressions, and other messages from the target client device for the current session, that is, until the client device is turned off. When the put on top button 94 is selected, then operations are performed so that whenever the buddy list is displayed, the target buddy plate will be displayed at the top of the list.

When the back button 95 is pressed, then display of the buddy profile interface is stopped, and the previously displayed interface is displayed.

Figure 25:
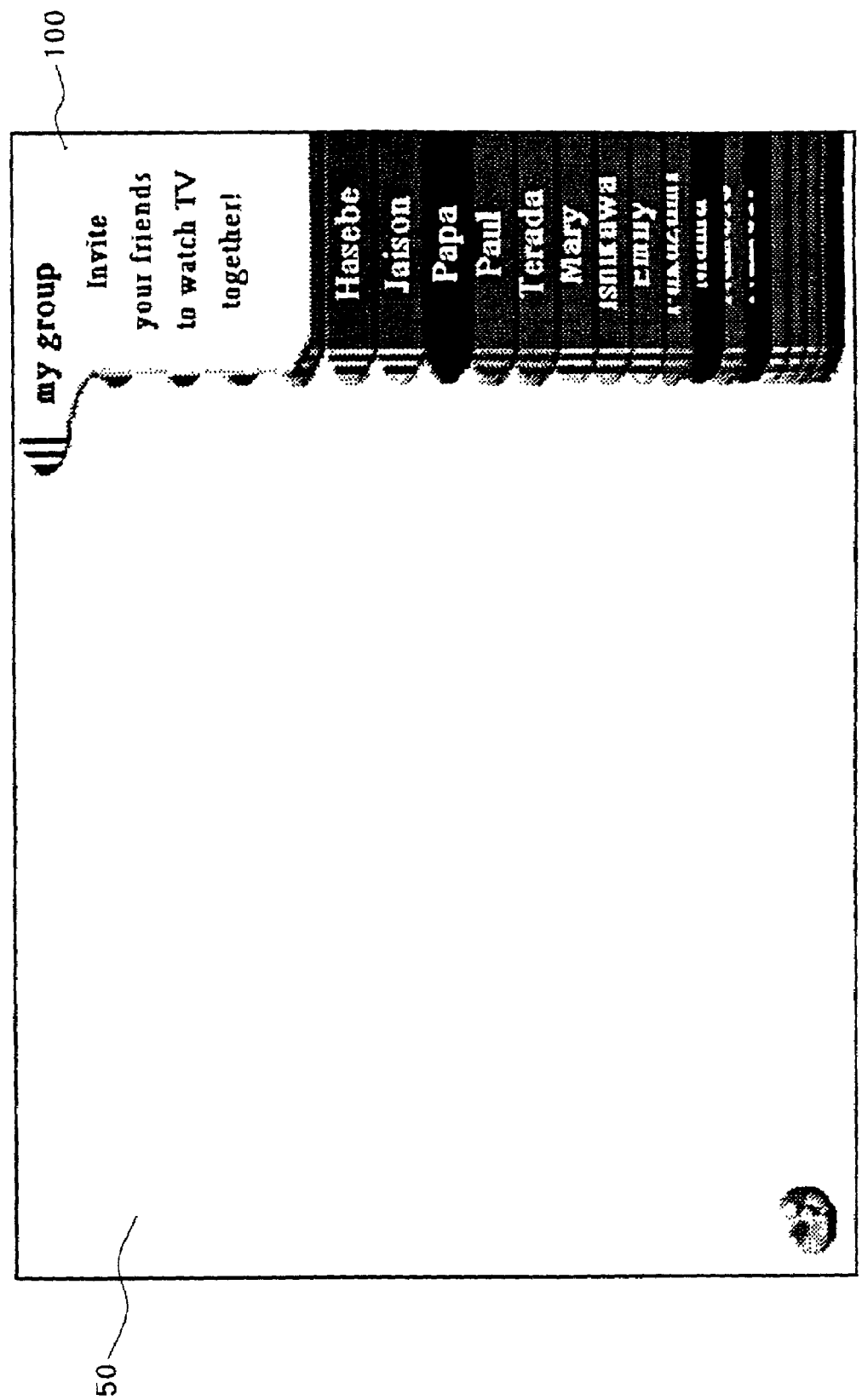
FIG. 25 is a schematic view showing the display of the buddy list when a "my group" plate is selected while no members are in "my group"

Next, an explanation will be provided for operations performed when the "my group" plate 52*a* is selected from the buddy list. First, it is determined whether "my group" includes any members. If there are no members yet, as in the example shown in FIG. 5, then a message 100 is displayed as shown in FIG. 25, urging the user to invite members of the buddy list to watch television together.

Figure 26:
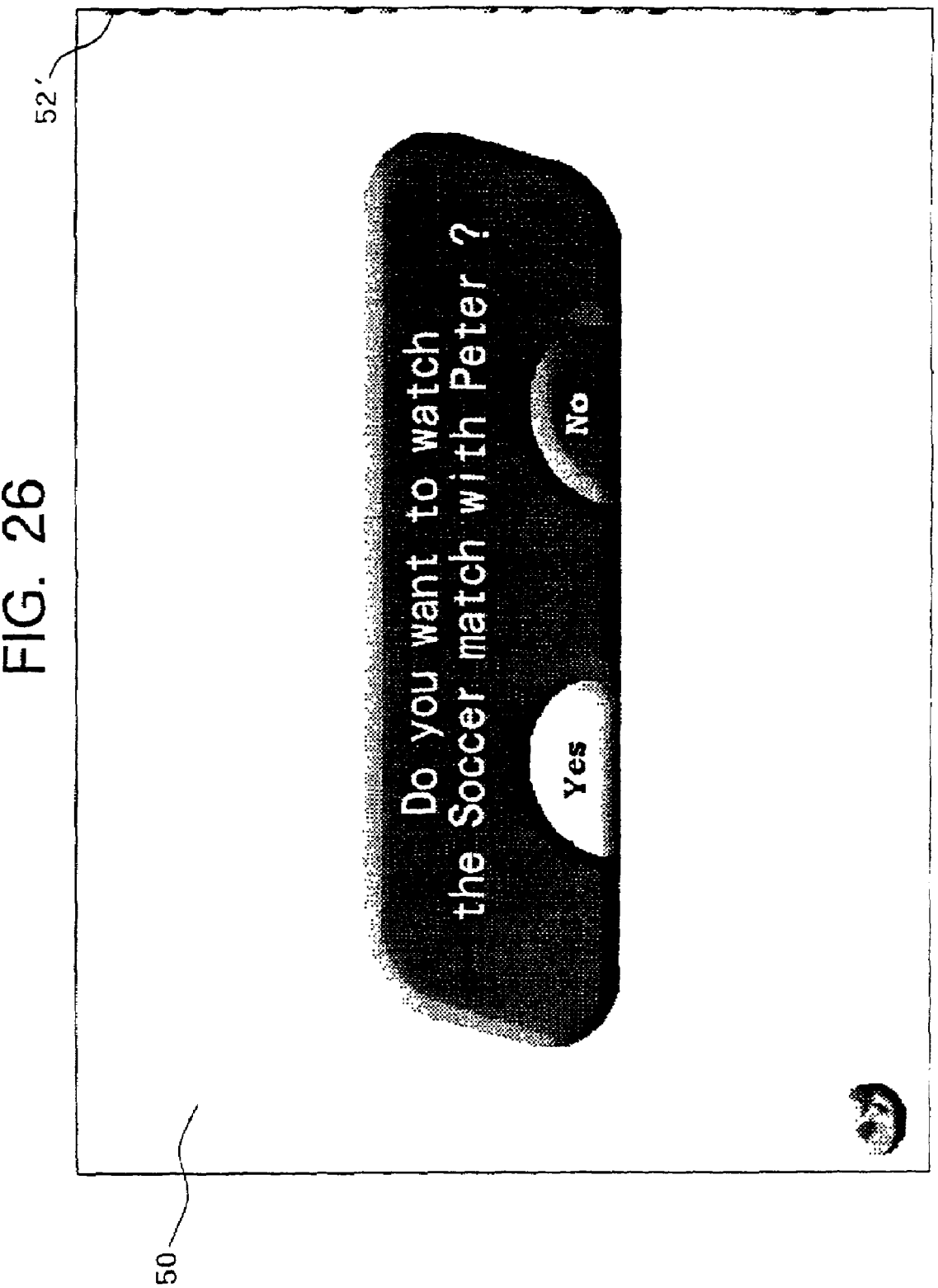
FIG. 26 is a schematic view showing the execution of an invitation icon.

Members are added to "my group" by invitation through the share button 63 of the icon choose interface. When the share button 63 is selected, then the client device sends a request to the server 5. The request includes the client device identification number of the client device that corresponds to the target plate 60, the client device identification number of the sender client device, the information identifying the present user, icon identification data, and present content data. The icon identification data designates an invitation icon, and the present content data includes the television channel and the frame number of the television program presently being viewed at the sender client device. The server 5 will receive the present content data at other times too in order to prepare the buddy lists to show the correct on-line status of the buddies. The server 5 then sends a command including the icon identification data, the present content data, the client device identification number of the sender client device, and the information identifying the present user to the target client device. When the target client device receives the command, it executes the invitation icon as shown in FIG. 26 based on the icon identification data and the present content data. The invitation icon includes a message asking the user of the target client device to watch the present television content, that is, a soccer match, with the sender of the invitation, in the TV sharing environment. More elaborate and richer invitation icons could be provided, by the broadcaster or the television content owner for example, to attract more viewers. The receiver of the invitation can select "Yes" or "No" using the remote control 17.

Figure 27:
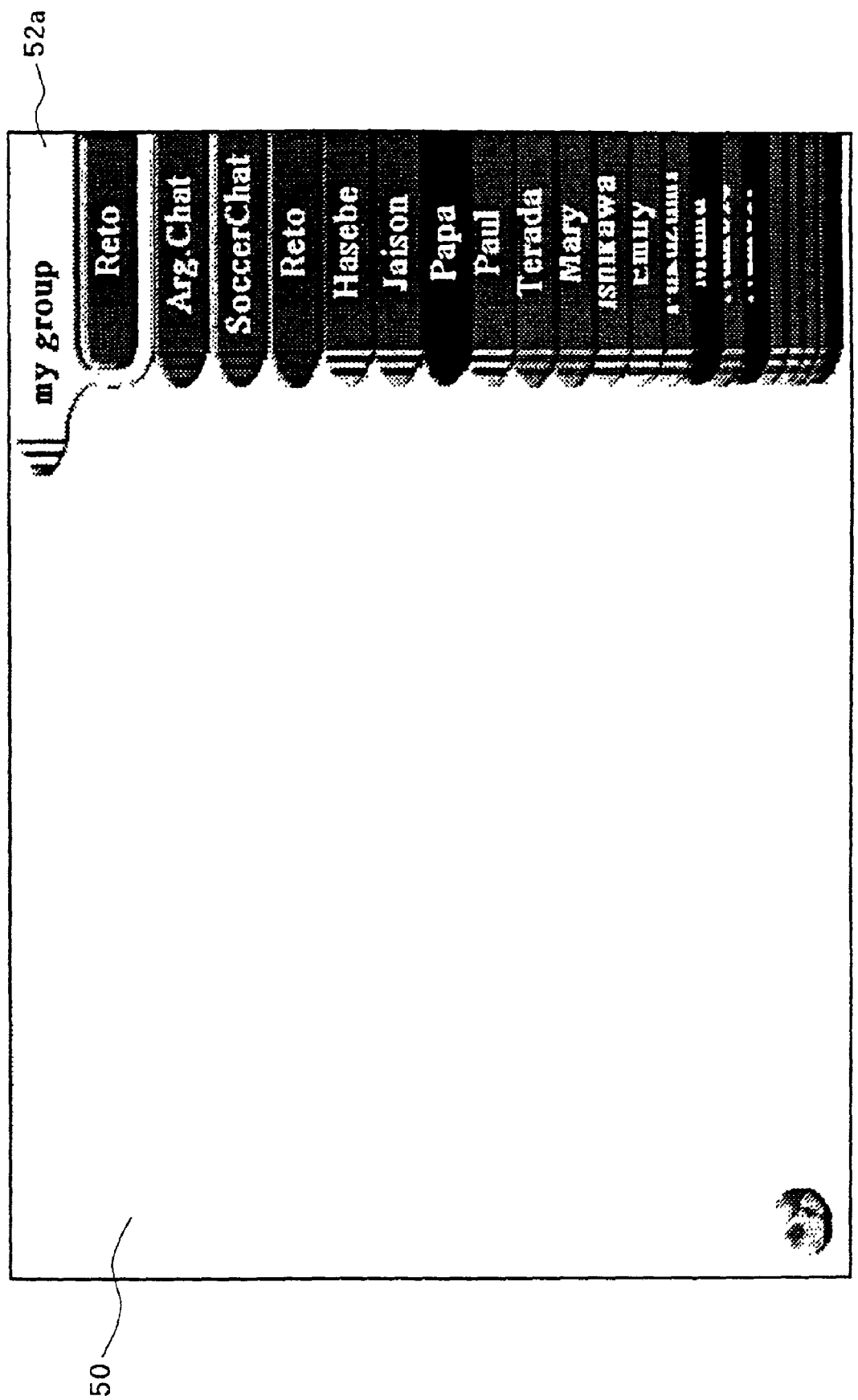
FIG. 27 is a schematic view showing the display of the buddy list while there are members in "my group"

When the receiver accepts the invitation, the target client device sends a message, via the server 5, to all other members of "my group", advising of the new member of "my group." The buddy list 52 of each client device in "my group" will be displayed with the buddy plate of the new member incorporated in the "my group" plate 52*a*. In the example shown in FIG. 27, Reto has been added as a member of Peter's "my group." Any member of "my group" can extend the shared group by inviting more people to join the group using the share button.

Also, the target client device switches display to the same television content as that of the sender client device. In the "my group" mode, operations are performed to synchronize the television content displayed on displays of all members in the group. That is, the functions of all the trick play buttons 35 are shared by all the client devices in "my group" by commands exchanged through the server 5. For example, if the user of client device 1 presses the pause button, then the television content will also pause on the display of the client device 2. At this time, the buddy plate of the client device that used one of the trick play buttons will slide in an out in the manner shown in FIG. 11, to let other members of "my group" know who caused the trick play. A client device is controlled to display the same television content as other members of "my group" as long as the client device is a member of "my group."

Figure 28:
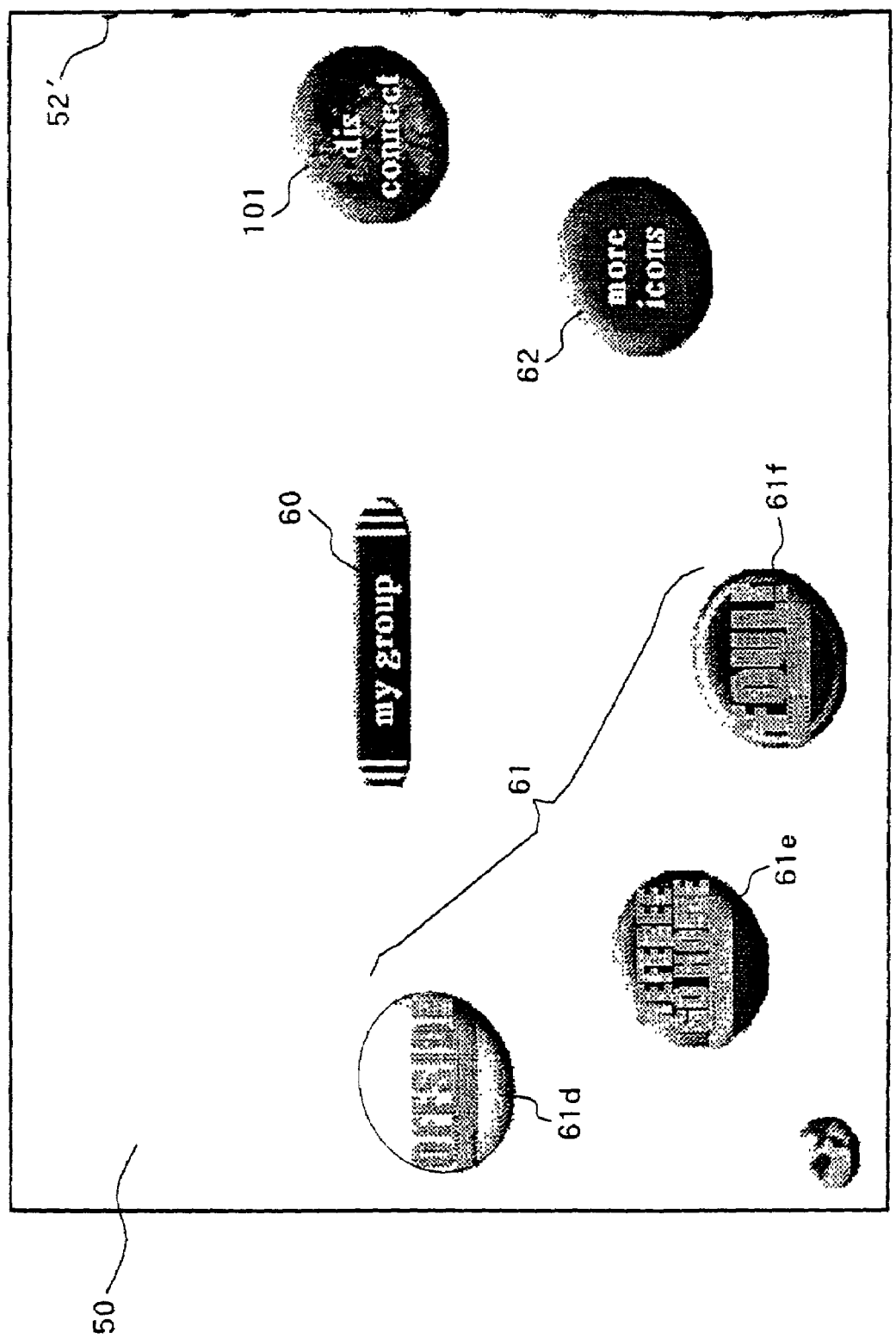
FIG. 28 is a schematic view showing the display of the choose icon interface with "my group" as target.

When the "my group" plate 52*a* is selected while "my group" includes members, then the choose icon interface with "my group" as the target buddy button 60 is displayed as shown in FIG. 28. This indicates that all members of "my group" are set as the target of TV sharing operations. That is, icons, expressions, and the like are sent directly to all members of "my group." In this case, the icon choose interface includes suggested icon buttons 61, the more icons button 62, and also a disconnect button 101. The suggested icon buttons 61 are related to soccer play because the television content is a soccer game in this example.

When the disconnect button 101 is selected, then the user disconnects himself from "my group", and the visual clue screen is displayed. In this way, a member can not kick other members out of the group. Although not shown in the drawings, a member also disconnects himself from the group by switching channels, in which case a confirmation interface is displayed. The confirmation interface tells the user that he is in the process of disconnecting himself from "my group," and asks the user it he is sure he wants to do this. The user responds to the confirmation interface by entering "yes" or "no."

Figure 29:
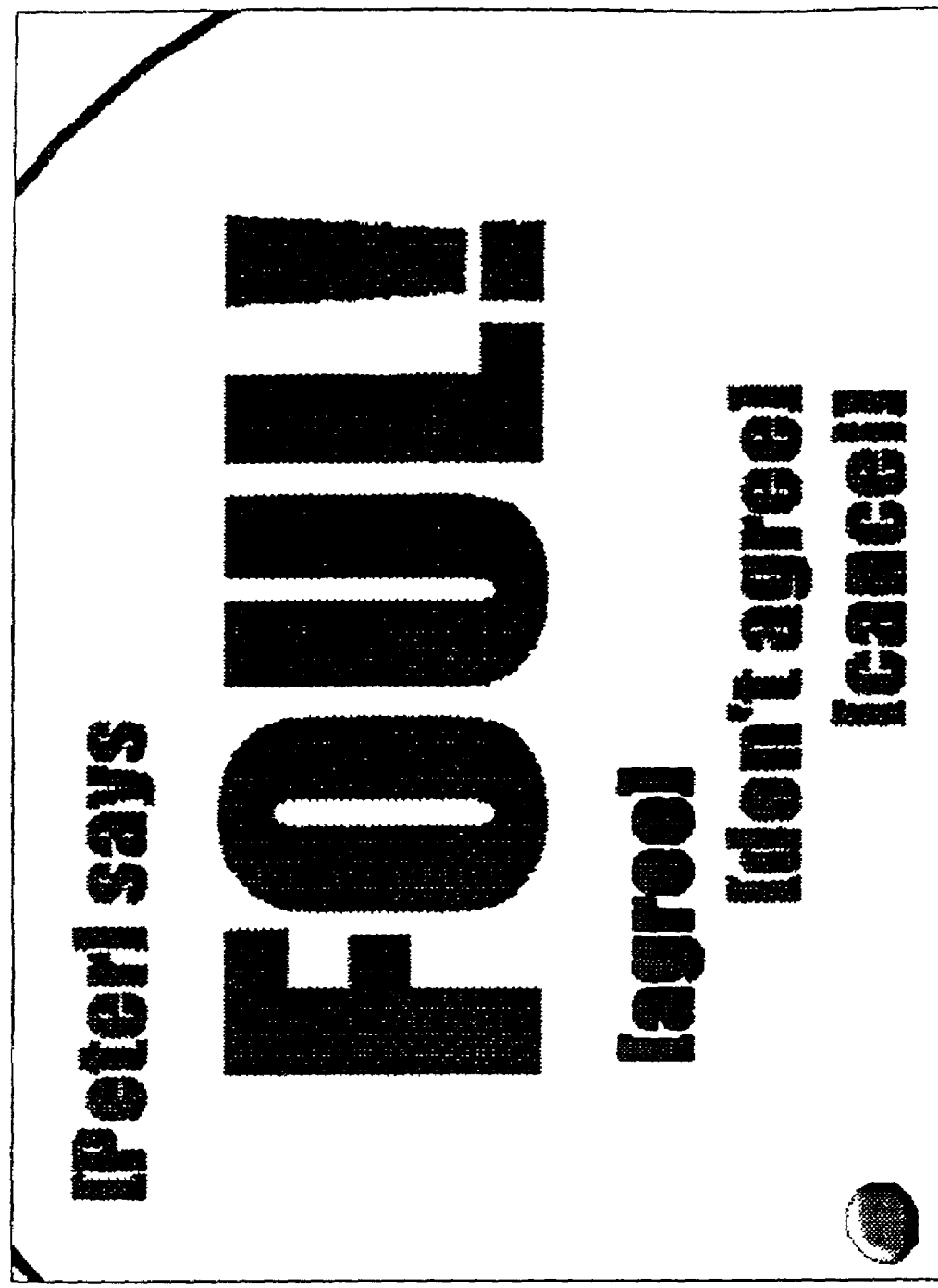
FIG. 29 is a schematic view showing the execution of a small group interaction icon.
Figure 30:
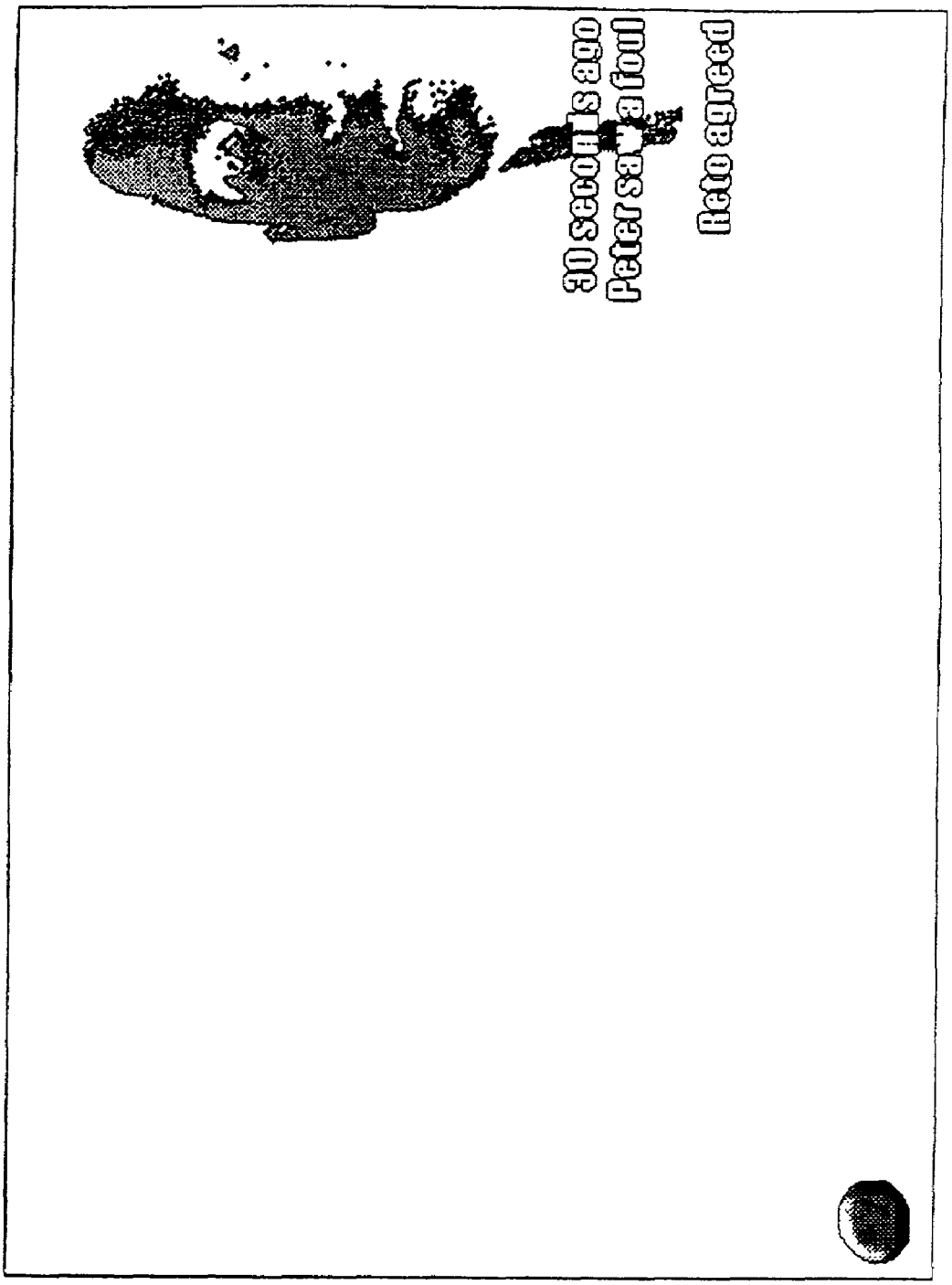
FIG. 30 is a schematic view showing the further execution of the small group interaction icon.

Here, an example of a small group interaction icon will be explained while referring to FIGS. 29 and 30. In this example, Peter is watching a soccer match at the client device 1 with the icon choose interface displayed as shown in FIG. 28. Peter believed he saw a player make a foul, and so pressed the "Foul!" button 61*f*. The server 5 receives the corresponding request from the client device 1, and sends a command to all the other client devices in "my group", that is, the client device 2. The server 5 also takes note that the request was for a small group interaction icon and sets a timer of, for example, 30 seconds, to await for responses from the client devices in "my group." In this case, the command from the server 5 includes icon identification data designating to display the screen of FIG. 29 and also information on the name of the user of the sender client device so that the screen is personalized with the Peter's name. The screen includes a message asking the users of the other client devices in "my group" whether they agree that there was a foul. The three choices of agree, disagree, and cancel are color coded to match the colors of buttons 24, 25, and 26, respectively, on the remote control unit 17. The user could also select using the up and down buttons 30, 31, and the enter button 34. When the user of the recipient client device makes a response, then a response is sent to the server 5. The server 5 collects responses from the recipient client device or devices for the 30 second waiting period, and then sends another command to all the client devices in "my group" with information on the results of the poll. The client devices in "my group" all display the results in a screen as shown in FIG. 30. If the user of the recipient client device presses no button during the waiting time, then display of the screen of FIG. 29 is stopped and the display of FIG. 30 is shown, but with a message indicating that this particular user had no opinion or comment.

With the small group interaction icons, the users in "my group" can compare their results/opinions with those of other members in "my group." In a poll, for example, each user can see who agreed with him and who did not. A teacher can see which students gave the right answer and who did not. These kinds of small group interaction icons can either be provided by the members of a shared group themselves or by a third party, like a provider of an interactive television game.

Next, the tools interface will be described with reference to FIGS. 31 and 32. The tools interface is accessed by pressing a tool plate (not shown) of the buddy list. When the tools interface is displayed, the target buddy plate 60 is displayed with the client device identification number of the user's own client device. The tools interface includes a my profile button 115, a new buddy button 111, a find buddy button 116, an account button 113, and a more settings button 114.

Figure 31:
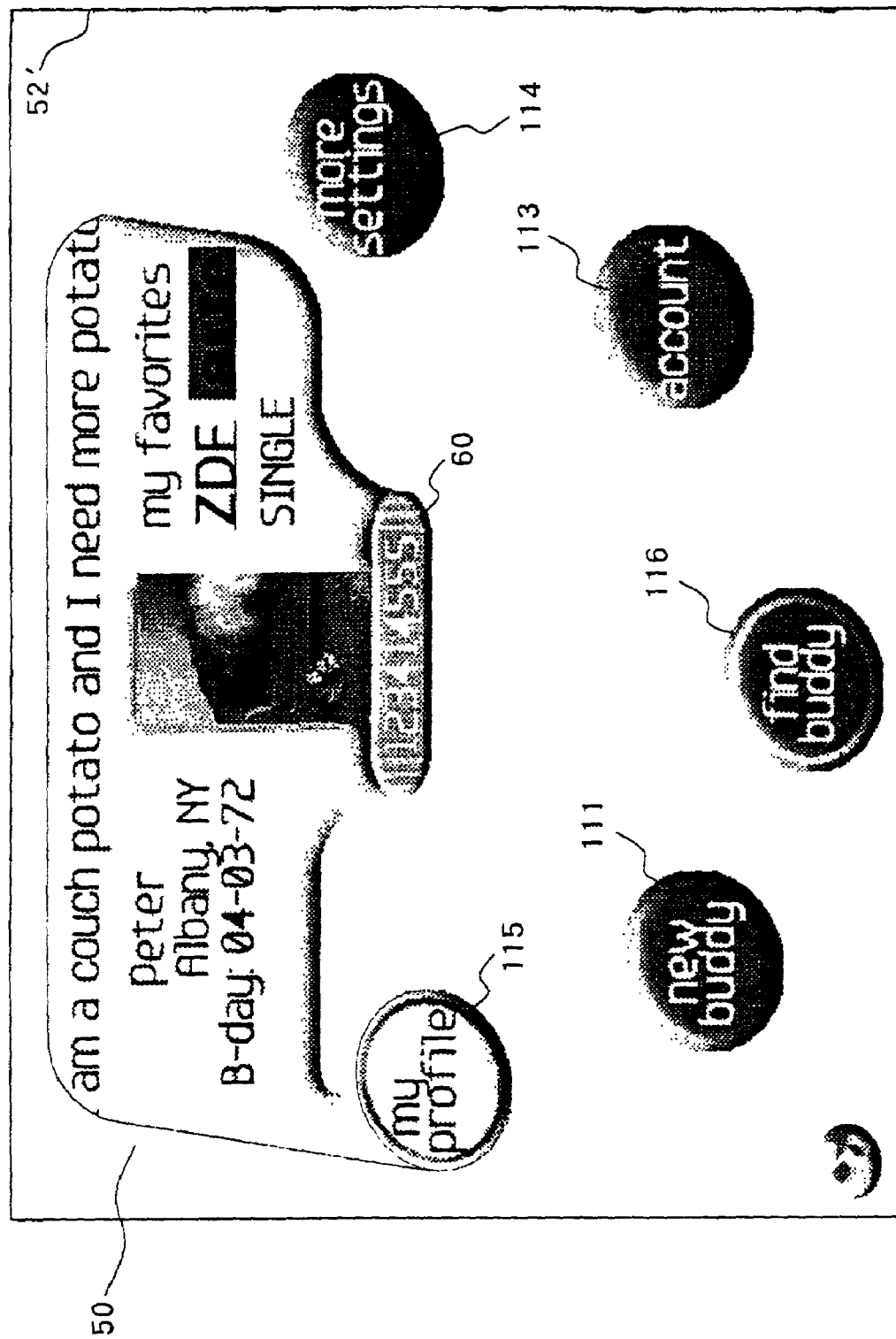
FIG. 31 is a schematic view showing the display of a tools interface.

When the my profile button 115 is the target of operations, then the user's profile appears as shown in FIG. 31. When the user selects the my profile button 115 by pressing the enter button 34, then an interface (not shown) will appear that the user can use to edit his profile.

Figure 32:
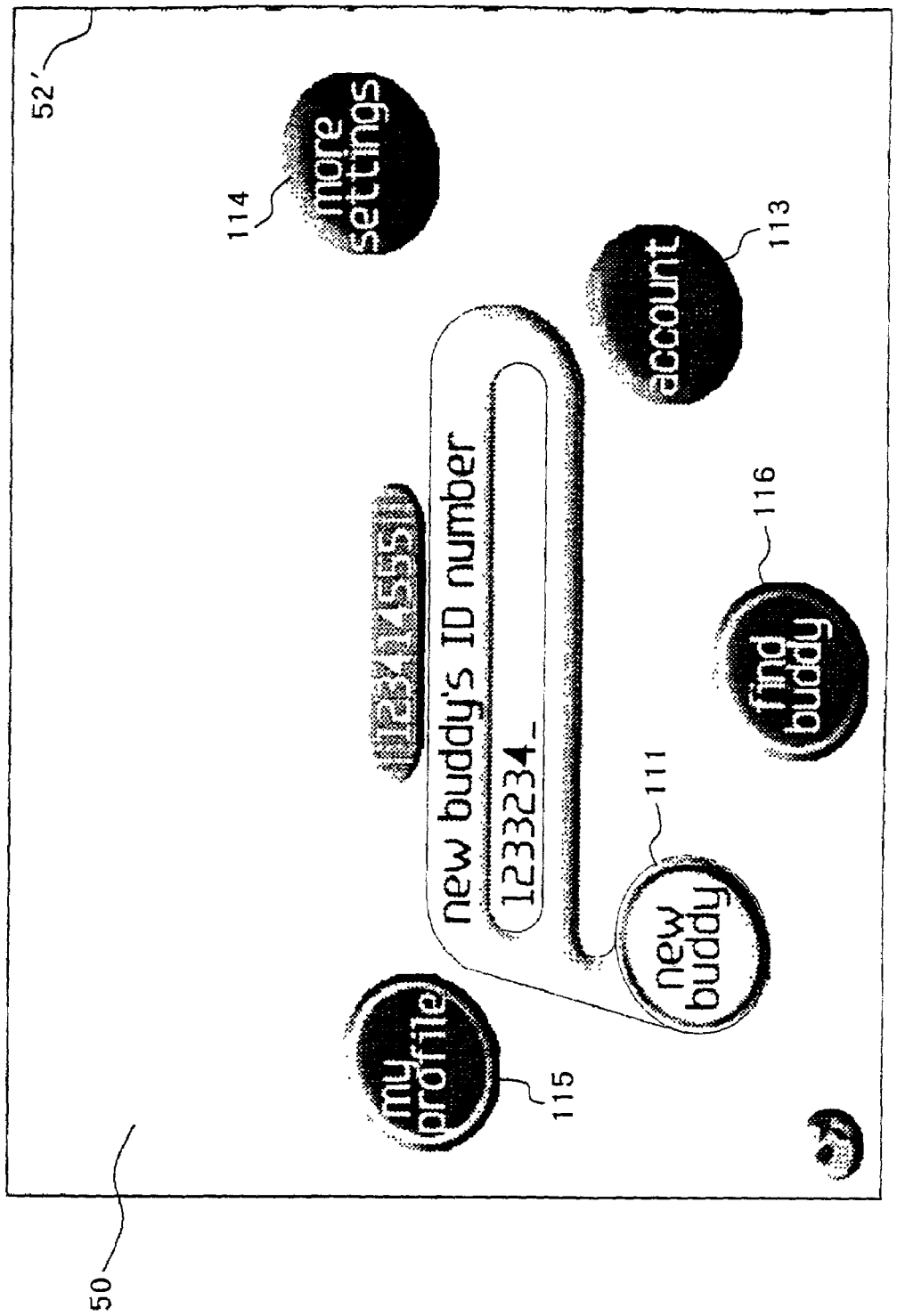
FIG. 32 is a schematic view showing the display of an interface for inputting the client device identification number of another client device to add the client device to the buddy list.

When the new buddy button 111 is pressed, then the interface shown in FIG. 32 is displayed. The user inputs the client device identification number of another client device that the user wants to add to his or her buddy list 52. When the enter button 34 is pressed, the client device 1 sends an invitation to the target client device, through the server 5. The invitation asks the user of the client device for permission to add the target client device to his or her buddy list, and includes the client device identification number of the target client device, the client device identification of the sender client device, and the information identifying the present user of the sender client device. The server 5 uses the client device identification number to find the target client, and forwards the invitation to the target client device. The target device displays the invitation with buttons for accepting or refusing the invitation. The target device sends a message to the sender client device based on the client device identification of the sender client device and the information identifying the present user of the sender client device. That is, when the refuse button is selected, then the target client device sends, via the server, a short message of refusal to the sender client device. When the accept button is selected, then the server adds the sender client device to the target client device's buddy list, and the target client device to the sender client device's buddy list. The server informs both the sender and target client devices about these changes to the buddy lists. Both the sender and target client devices update their buddy lists accordingly. The sender client device can then send a confirmation icon to the target client device, whereupon the target client device will display a confirmation message.

The server 5 monitors on-line status of the client devices on the buddy list, and sends any changes in on-line status of the client devices in the buddy list to the client device 1. The client device 1 displays the buddy list 52 based on the information from the server 5. In this way, each client device can have a different buddy list.

When the find buddy button 116 is selected, then a search interface is displayed. The user can input various parameters into the search interface, such as name, location, age, marital status, interest, and keywords, and search the entire user database of the server 5 for people that match the parameters.

When the account button 113 is selected, then an interface for account information and settings is displayed. When the more settings button 114 is selected, then an interface is displayed that allows the user to change different general settings, such as the expression of the icon sent when the X-pression button 29 is pressed. There are also settings used by parents to filter out undesired television content, and the like, to protect their children.

Although not shown in the drawings, a pointer function is also provided in the "my group" mode. When one member of "my group" initiates the pointer function, then a circle is displayed superimposed over the television content of screens of all members in "my group." When one member in "my group" presses the up, down, left, or right buttons, the circle moves across the screen of all member's client devices accordingly. In this way, any member of "my group" can easily indicate some aspect of the displayed television content to other members. The diameter of the circle can be altered by pressing predetermined keys on the remote control unit 17.

The pointer function is particularly useful when used with the pause function, so that one member can point out an aspect of active television content, like a sports game, that other members might have missed. The pointer can be stopped by any member of "my group," by pressing the TV sharing button 28 of their remote control unit 17.

Next, modifications of the embodiment will be described. In the following modifications, the icon display and audio data is not stored locally in the hard disk of the client devices to reduce storage needs at the client devices.

In the first modification, the icon display and audio data is stored in the server 5. In this case, when the server 5 receives a request to send an icon from one client device to another, the server 5 refers to the icon identification data included with the request, and sends the corresponding display and audio data to the sender client device and to the addressee client device or devices. With this configuration, local storage requirements at the client devices are reduced by the data amount of the display and audio data. The client devices could be set-top boxes with no storage device such as a hard disk or a CD-ROM. Also, the server 5 can constantly update and provide different icon types, which makes the system more flexible.

In the second modification, the icon display and audio data is stored with a third party accessible by the Internet. In this case, the icon identification data in the request from a client device includes a URL for data at the third party. The server 5 sends the icon identification data with the URL to the addressee client device and target client device or devices. The client devices then connect with the URL to download and execute the icon display and audio data.

Alternatively, when the server receives a request with such a URL, the server 5 connects with and downloads the requested icon display and audio data from the third party, and sends the data to the client devices, which execute the icon locally.

In the third modification, the invitation function of the TV sharing function is used to invite people to purchase pay content. The recommendation of a friend is a strong motivation to purchase pay content. Because the TV sharing function is used among friends, the invitation function of the TV sharing function is a very strong way to encourage people to purchase pay content, especially because the purchase can be made simply with a single click of the remote control unit 17. Next, examples will be described for how the invitation function of the TV sharing function can be used to invite people to purchase pay content.

Figure 34:
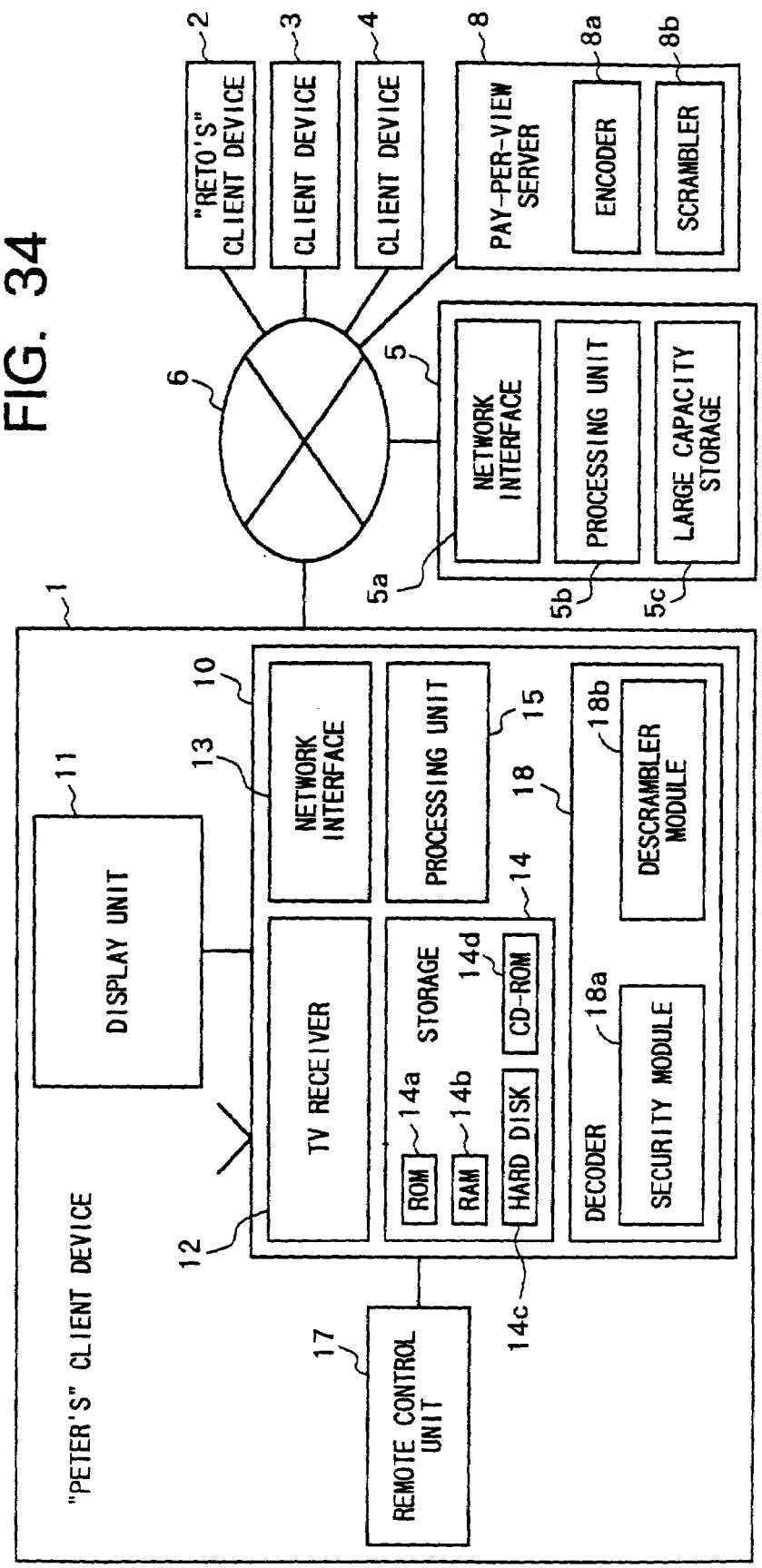
FIG. 34 is a block diagram showing a pay-per-view system according to the present invention.

FIG. 34 shows a pay-per-view system according to the present invention. Components with the same configuration as in the system of FIG. 1 are provided with the same numbering, and their explanation will be omitted to avoid redundancy of explanation. The client devices 1 to 4 in the system of FIG. 34 further include a decoder 18 having a security module 18a and a descrambler module 18b. The security module 18a includes a memory card. Also, a pay-per-view server 8 that provides pay content is connected to the network 6. The pay-per-view server 8 includes an encoder 8a and a scrambler 8b.

An example will be provided for operations performed when the user of client device 1 invites the user of client device 2 to watch pay content together. That is, while the client device 1 is displaying a pay program, the user of the client device 1 presses the share button 63 while the client device 2 is the target of selection operations as shown in FIG. 8. When the user presses the share button 63, then the client device 1 will recognize that the presently displayed content is pay content and so will display an interface (not shown) with three buttons indicating just invite, invite and pay, or cancel.

If the user of client device 1 selects the cancel button, then the screen returns to the choose icon interface of FIG. 8.

If the user selects the just-invite button, then in the same manner as described above, the client device 1 sends a request to the server 5, the server 5 sends a command to the target client device 2, and the target client device 2 executes the invitation icon. It should be noted that the invitation icon in this case can be a rich multimedia invitation icon provided by the owner of the content. When the user of the target client device 2 accepts the invitation by selecting the YES button of the invitation icon, then the processing unit 15 of the target client device 2 controls the display unit 11 to display a confirmation icon (not shown) that informs the user that the content is pay content and so requires payment of a charge. The confirmation icon also has "YES" and "N0" buttons that the user can select with a single operation of the "1" button 24 or the "2" button 25, respectively, or by pressing the left and right buttons 32, 33 and the enter button 34.

If the user of the target device 2 agrees to buy the pay content by selecting the "YES" button of the confirmation icon, then the target device 2 sends a request to view pay content and agreement-to-pay information to the server 5. The server 5 informs the pay-per-view server 8 that the target client device 2 wants to watch the pay content. The pay-per-view server 8 sends a first decryption key to the target client device 2 through the server 5. The target client device 2 stores the first decryption key in its security module 18a. The pay-per-view server 8 encodes a second key at the encoder 8a based on the first key, scrambles the pay content at the scrambler 8b based on the second key, and sends the encoded second key and the scrambled content to the target client device 2 through the server 5.

Upon receiving the encoded second key and the scrambled pay content, the target client device 2 retrieves the first key from the security module 18a, uses it to decode the second key, and then stores the decoded second key in the descrambler module 18b. The descrambler module 18b then uses the second key to descramble the pay content. In an alternate configuration, the first key could be prestored in the security module 18a. In this case, the pay-per-view server 8 only needs to send the second key and the pay content to the client device. The target client device uses the prestored first key to decode the encoded second key.

After the pay content is descrambled, it is displayed on the display unit 11 of both the client devices 1 and 2 so that both users can view the pay content together in the "my group" environment. The server 5 provides a discount for pay content to each member of "my group" depending on the number of members watching the pay content in my group. This gives members of "my group" incentive to invite others to pay for content. For example, if the server 5 charges one person $4.00 for a pay-per-view content, then the server 5 could charge $3.50 each when that person succeeds in inviting another to "my group" and $3.00 each when either of those people succeed in inviting a third person to "my group." Alternatively, each client device could be provided with a point card memory that records "points" each time the user is successful in inviting others to watch pay content in "my group." Once a certain number of points are recorded, then the user is allowed to watch some pay content without charge or other incentives.

If the user of the target client device 2 does not agree to pay for the pay content, and so presses the "NO" button of the confirmation icon, then the target client device 2 sends a message icon to the sender client device 1, via the server 5, saying that the user of the target client device 2 does not wish to watch television with the user of the sender client device 1. In this case, the client device 1 displays a sender's information interface similar to that shown in FIG. 12, but with the default message button 82 set for sending message icons to further urge the user of the client device 2 to agree to pay for the pay content. Examples of such message icons include "Come on, don't be so stingy," or "Should I pay for you?" These icons will apply slight social pressure to the user of client device 2 so he or she might agree to buy the recommended pay content.

If the user of client device 1 selects the invite-and-pay button, then the same operations are performed as when the just-invite button is pressed, except that the confirmation icon is not displayed by the client device 2 and the server 5 charges fees for this pay content for both client devices 1 and 2 to the client device 1.

It should be noted that the pay-per-view server 8 need not transmit pay content to the client devices through the same network 6 as the server 5. For example, the network 6 could be a cable network and the pay-per-view server 8 could transmit pay content to the client devices via a satellite network.

Figure 35:
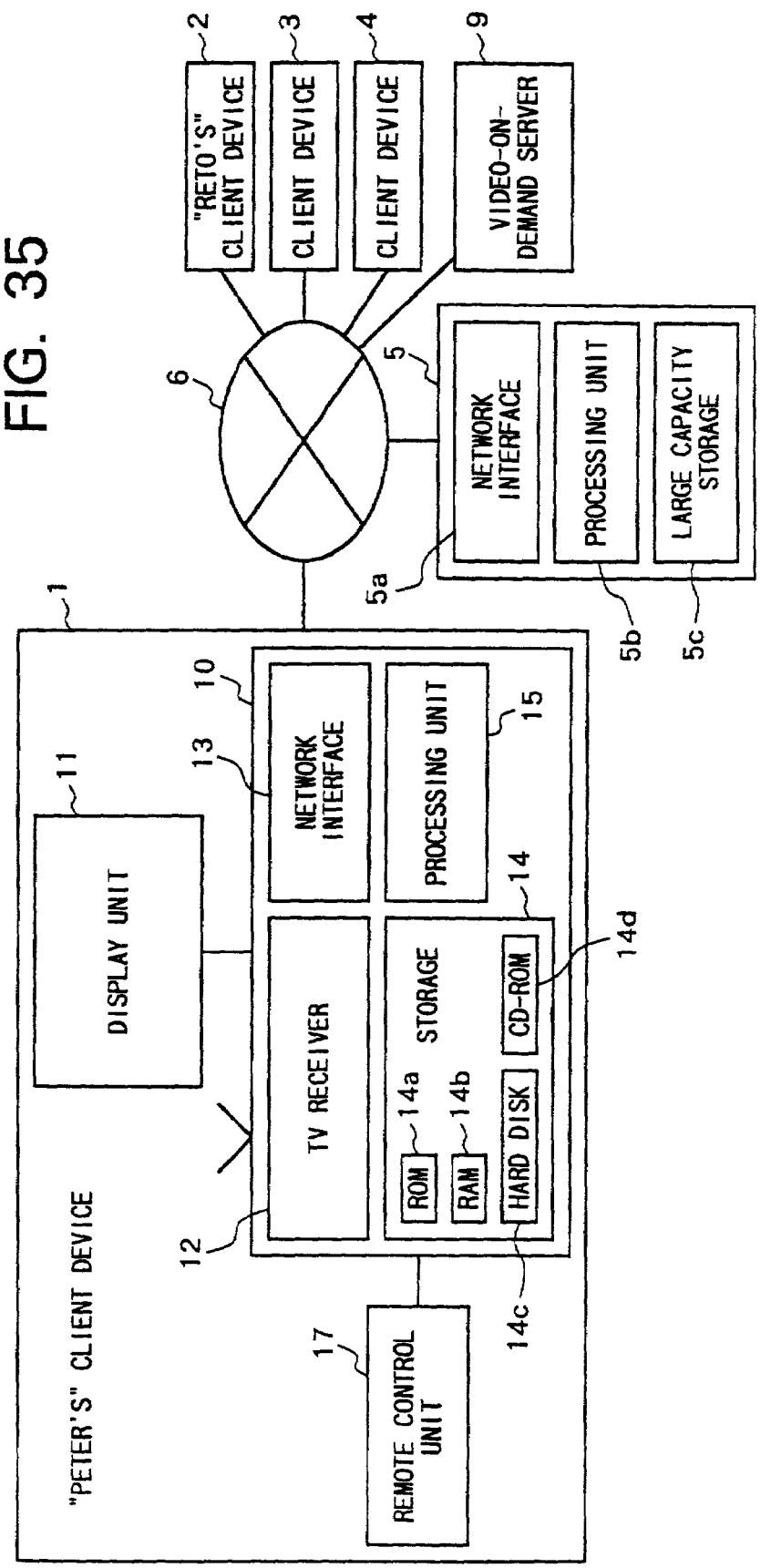
FIG. 35 is a block diagram showing a video-on-demand system according to the present invention.

FIG. 35 shows a video-on-demand system according to the present invention. This system includes a video-on-demand server 9 connected to the network 6. When the user of the client device 1 presses the share button 63 while watching pay content streamed from the video-on-demand server 9, then the client device 1 and the target client device 2 perform similar operations as described above for pay-per-view. However, when the user accepts the invitation and agrees to pay via the invitation icon and the confirmation icons, and the target device 2 sends a request to view pay content and agreement-to-pay information to the server 5, the server 5 informs the video-on-demand server 9 that the target client device 2 wants to watch the pay content. In response, the video-on-demand server 9 begins to stream the pay content to the target client device 2 via the server 5.

Figure 36:
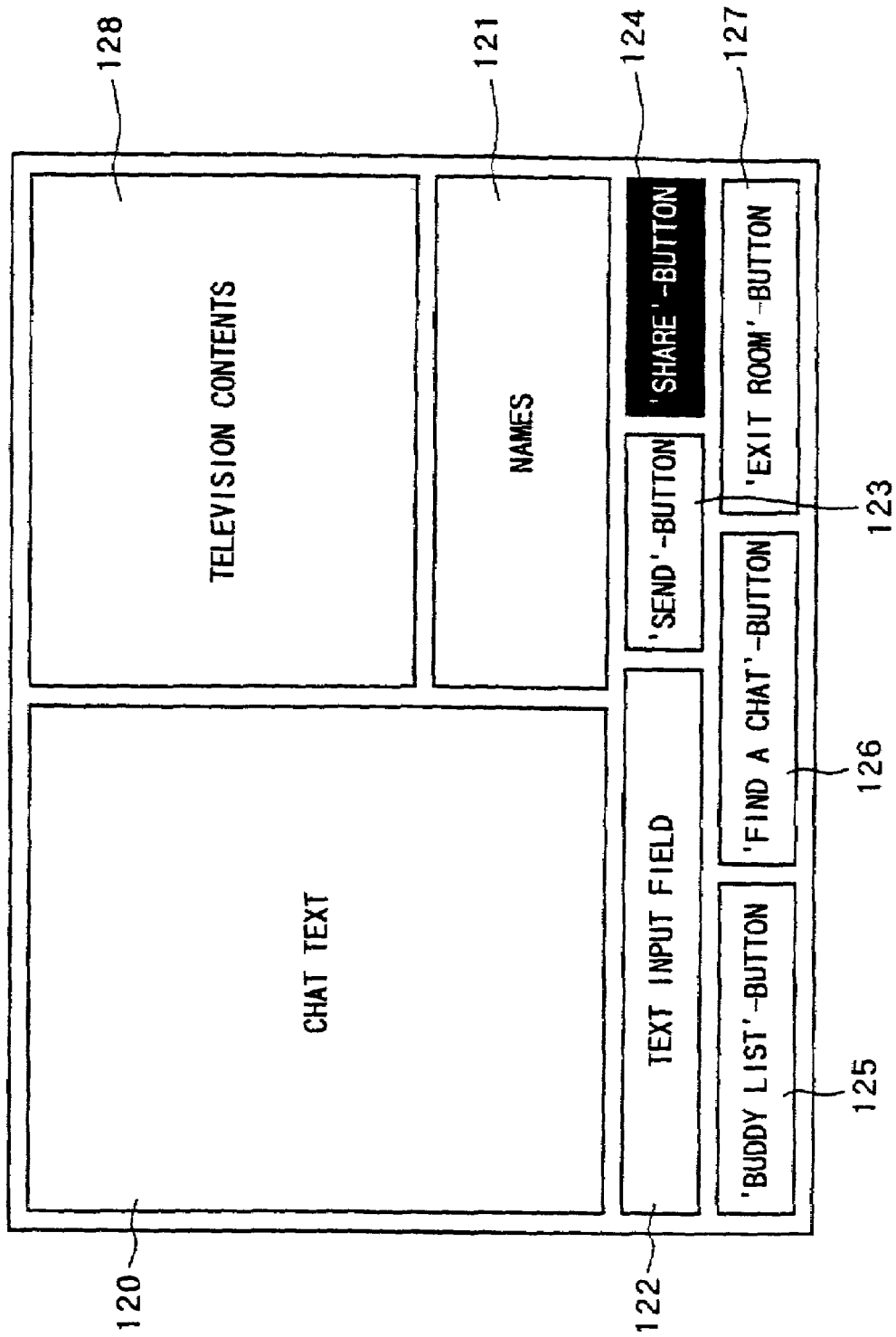
FIG. 36 is a schematic view showing a chat screen displayed on a client device according to the present invention.
Figure 37:
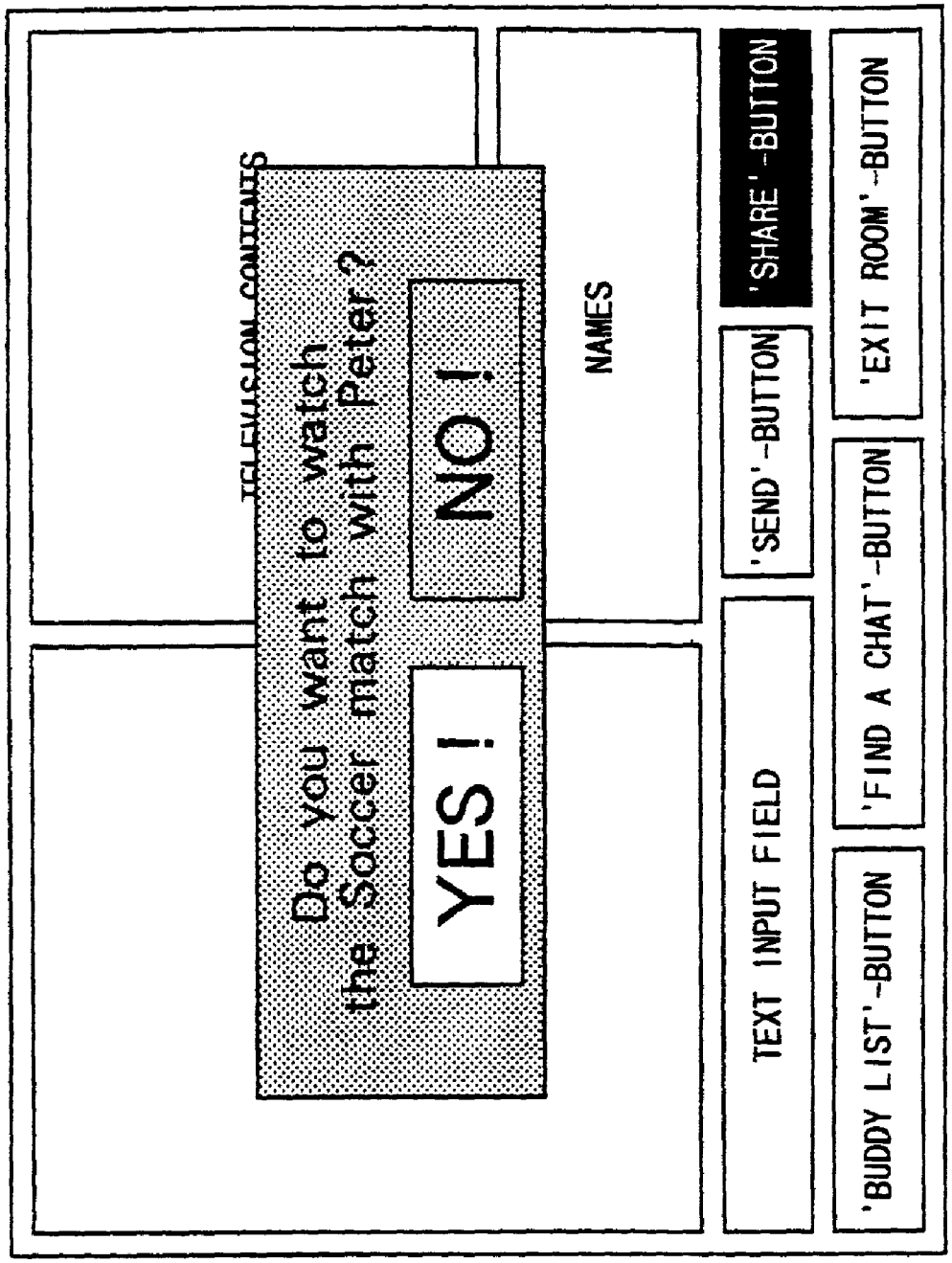
FIG. 37 is a schematic view showing the chat screen of FIG. 36 superimposed with an invitation icon.

In the fourth modification, the share function is used when the TV sharing chat application is operating. FIG. 36 shows a chat screen displayed on the display 11 when the TV sharing chat application is being executed. The chat screen includes a chat text field 120, a names field 121, a text input field 122, a send button 123, a share button 124, a buddy list button 125, a find a chat button 126, and an exit room button 127. Also, a television program 128 is displayed in one-quarter size in the upper right hand corner of the screen. The share button 124 is used to invite people in the present chat room who are not viewing the same television content to watch the same television content together. When the share button 124 is selected, the sender client device sends a request to the server 5. The request includes chat room data that indicates the present chat room, the client device identification number of the sender client device, the information identifying the present user, icon identification data, and present content data. The icon identification data designates an invitation icon, and the present content data includes the television channel and the frame number of the television program presently being viewed at the sender client device. The server 5 uses the chat room data to find the present chat room and which client devices are connected to the chat room. Then the server 5 investigates which of connected client devices are watching a different television content from the sender client device and sets these as target client devices. The server 5 then sends a command to all the target client devices. The command includes the icon identification data, the present content data, the client device identification number of the sender client device, and the information identifying the present user. All the target client devices execute the invitation icon so that the invitation icon is superimposed on the chat screen as shown in FIG. 37. Users of the target client devices use the invitation icon to accept the invitation (YES) or not (NO). When a user accepts the invitation, then execution of the invitation icon is stopped, the target client device automatically retunes to the recommended program based on the present content data, and the target client device informs the server 5 of the acceptance. If the user rejects the invitation, then execution of the invitation icon is stopped, no retuning is performed, and the target client device informs the server 5 of the rejection. Once the server 5 receives responses from all the target client devices, then the server 5 advises about the changes to the client devices connected to the chat room. Of course, if the invitation is to watch pay content, then the confirmation icon is executed at all client devices in the manner described above.

In the fifth modification, the share function is used to invite people who are currently not watching television, but who are online by some other device, such as by a personal computer connected to the Internet or a mobile telephone. In this case, the server 5 searches for an online device of a user, when the user's client device is not online, that is, is turned off, not receiving icons, and the like. The server 5 then sends a text message to the user's online device. The text message explains the invitation, for example, "Peter just invited you to watch the soccer match with him. Go and switch on your TV!" At the same time the server 5 sends a command to the user's client device to execute the invitation icon. When the user turns on his client device (i.e., interactive television set with the TV sharing function) within a certain amount of time, he or she will be greeted by the invitation icon.

For example, personal computers connected to the network 6 can communicate with client devices that are executing the chat application in the TV sharing environment by executing a similar chat application. When one of the client devices sends the invitation icon to a chat room while a personal computer is connected to the chat room, the server 5 converts the invitation icon into text for the personal computer. If the user of the personal computer turns on his/her client device within a certain amount of time, then the invitation icon will still be active, so that the user is greeted with the invitation icon. If the user accepts the invitation by selecting the YES button of the invitation icon, then the client device will automatically tune to the same television content as the sender client device in the manner described above.

The buddy plate noses can be displayed in another color to indicate client devices that are currently not turned on, but who's users can be contacted through another online device, such as by a personal computer connected to the Internet or a mobile telephone.

While the invention has been described in detail with reference to a specific embodiment and modifications thereof, it will be apparent to those skilled in the art that various changes and further modifications may be made therein without departing from the spirit of the invention, the scope of which is defined by the attached claims.

For example, the television set itself need not be provided with the TV sharing function, but instead a set-top box could be provided with the TV sharing function, and connected to the television.

The client device need not be provided with a hard disk or a CD-ROM.

The embodiment describes providing a separate clear button 22. However, the clear function could be provided as a temporary function of any other button of the remote control unit 17, the temporary function only being activated during appropriate modes of the TV sharing application, such as the icon customizing interface.

The embodiment describes that a password interface is displayed, and a proper password must be entered before the TV sharing function can be used. However, the password interface and the password requirement can be optional, or not provided at all. Also, a family plate can be provided in the individual identification interface of FIG. 33. If the user selects none of the individual plates within a predetermined time, for example, 30 seconds, then the family plate is automatically selected.

The embodiment describes that the five front center buttons 110a to 110e of the icon interface are suggested by the icon suggestion engine of the server 5. However, the icon suggestion engine need not suggest icons for all five positions. Also, the icon suggestion engine could suggest icons for other positions as well.

A plurality of servers could be provided, for example, separately for different regions.

The icon display and audio data and corresponding icon identification data stored in the hard disk 14c could be modified or replaced using data downloaded from the Internet, for example, at night when telephone rates are less expensive. A downloading engine could be provided to accomplish this.

The embodiment describes the "1" key, the "2" key, and the "3" key of the numeric pad as being color coordinated with the displayed icon buttons. However, any other key or keys of the remote control unit could be color coordinated in this manner. For example, many remote control units for interactive TV have four colored buttons with many different meanings in many different contexts. These could be used instead or as well.

In the embodiment, the TV receiver 12 receives the broadcast from the broadcaster 7, and the display unit 11 displays the television program accordingly. However, the broadcaster 7 could be connected directly to the server 5 by cable, for example, as indicated by a dotted line in FIG. 1. In this case, the server 5 transmits the television program to the client device 1 over the network 6.

Means other than the "chat" plates 52b can be provided for starting execution of the chat application.

Figure 38:
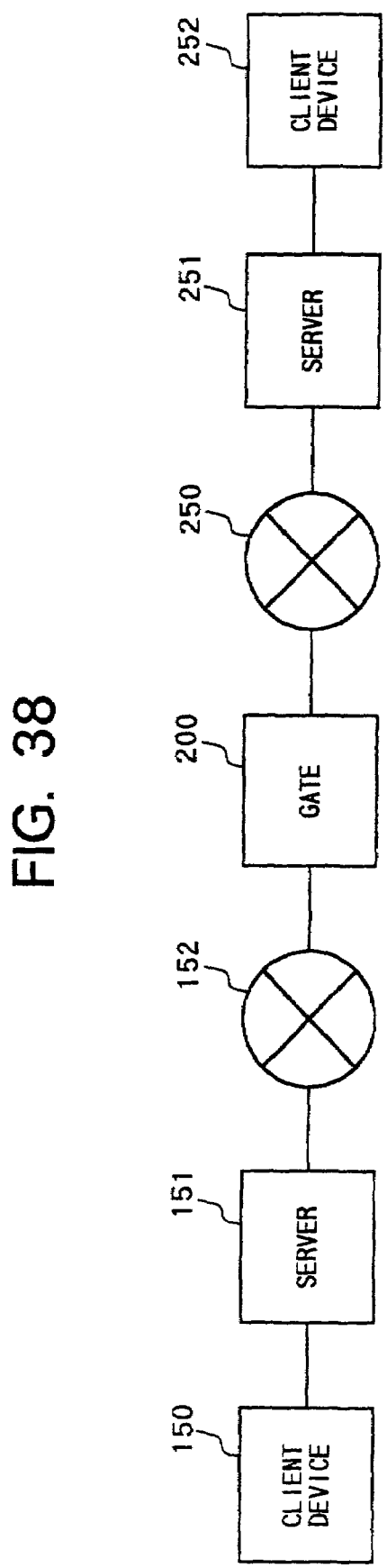
FIG. 38 is a block diagram showing two client devices connected by two servers and a gate.

The embodiment and the modifications describe all the client devices as being connected to the same server. However, the client devices could be connected to different servers that communicate with each other through a gate. In the example shown in FIG. 38, servers 151 and 251 are connected through networks 152 and 250 and a gate 200. When a client device 150 connected to the server 151 sends an icon to a client device 252 connected to the server 251, the servers 151 and 251 exchange information to this effect through the networks 152 and 250 and the gate 200. If the icon is an invitation icon to watch pay content available at the server 151, but not available at the server 251, then the servers 151 and 251 could make an arrangement, such as the server 151 could sell the pay content to the server 251, which could then sell the pay content to the client device 252. It should be noted that the servers could be connected to the same network and the gate could be located in one of the servers.

The invention claimed is:
1. A client device, comprising:
 a connection interface operable to connect to a server over a network;
 a receiver operable to receive content data;
 a data storage unit operable to store a plurality of icon identification data sets associated with a plurality of icons such that a given one of the plurality of icon identification data sets is associated with a specific one of the plurality of icons, and to store a plurality of passwords associated with a plurality of users of said client device such that a given one of the plurality of users is associated with a particular one of the plurality of passwords;

a display unit operable to display selected content, to display a user list identifying the plurality of users of said client device, to receive a user-entered password in response to the given one of the plurality of users being selected, and in response to said client device verifying that the user-entered password corresponds to the particular one of the plurality of passwords that is associated with the given one of the plurality of users, to display content based on the received content data and display a plurality of plates, a portion of the plurality of plates being associated with a plurality of members of a buddy list of the given one of the plurality of users such that a given one of the portion of the plurality of plates is associated with a specific one of the plurality of members of the buddy list and includes a region providing an associated one of a plurality of visual clues which indicates an online status of another client device associated with that member of the buddy list, said display unit being further operable to display only the region providing the associated one of the plurality of visual clues in place of the given one of the plurality of plates, the plurality of plates including a group plate associated with a group that includes any of the members of the buddy list whose associated client device is displaying the selected content and which includes the plates associated with such members of the buddy list, the group plate including a message urging the given one of the plurality of users to invite the members of the buddy list to watch the selected content upon none of the members of the buddy list being included in the group;

a selection unit operable to receive from the given one of the plurality of users a selection of a desired one of the plurality of plates, the display unit being operable to display a plurality of icon buttons in response to the desired one of the plurality of plates being selected, the plurality of icon buttons being respectively associated with the plurality of icons such that the invitation icon button is associated with an invitation icon, the invitation icon including a message asking the particular member of the buddy list to watch the selected content, and the selection unit being further operable to receive from the given one of the plurality of users a selection of a desired one of the plurality of icon buttons; and a transmitter operable to transmit a request to the server in response to the particular one of the plurality of members of the buddy list and the invitation icon button being selected, the request including an identification number of said client device, an identification number of the another client device associated with the particular member of the buddy list, identification data associated with the given one of the plurality of users, the icon identification data set associated with the invitation icon, and data associated with the selected content, the request causing the server to transmit a command to the another client device associated with the particular member of the buddy list, the command including the identification number of said client device, the identification data associated with the given one of the plurality of users, the icon identification data set associated with the invitation icon, and the data associated with the selected content and causing the further client device to execute the invitation icon and display an invitation to watch the selected content.

2. A client device as claimed in claim 1, wherein the data storage unit stores icon display and audio data for executing the plurality of icons.

3. A client device as claimed in claim 1, further comprising a data receiver operable to receive icon display and audio data from the server, the icon display and audio data for executing the plurality of icons.

4. A client device as claimed in claim 1, further comprising a data receiver operable to connect to the Internet and to receive, over the Internet, icon display and audio data for executing the plurality of icons.

5. A client device as claimed in claim 1, wherein the request indicates a group of other client devices to which the server is to transmit the command.

6. A client device as claimed in claim 5, wherein the respective one of the plurality of icon identification data sets corresponds to the icon that represents a comment on the content and that offers users of the group of other client devices possible responses to the comment.

7. A client device as claimed in claim 6, further comprising a response receiver operable to receive the responses to the comment from the group of other client devices, the display unit displaying a result of the responses.

8. A client device as claimed in claim 5, wherein the respective one of the plurality of icon identification data sets corresponds to an icon representing a question and possible answers.

9. A client device as claimed in claim 8, further comprising an answer receiver operable to receive the answers to the question from the group of other client devices, the display unit displaying a result of the answers.

10. A client device as claimed in claim 1, wherein the respective one of plurality of icon identification data sets corresponds to an icon that represents a comment on the content and that offers a user of the another client device possible responses to the comment.

11. A client device as claimed in claim 1, wherein the respective one of the plurality of icon identification data sets corresponds to an icon representing a social interaction having only a single possible positive response.

12. A client device as claimed in claim 1, wherein the selected content is broadcast content.

13. A client device as claimed in claim 1, wherein the selected content is pay content.

14. A client device as claimed in claim 13, wherein when the given one of the plurality of users selects the desired one of the plurality of icon buttons using the selection unit, the display unit displays an interface that provides that user with an option of paying fees for the pay content for the user of the another client device.

15. A client device as claimed in claim 13, wherein the pay content is pay per view.

16. A client device as claimed in claim 13, wherein the pay content is video on demand.

17. A client device as claimed in claim 1, wherein the request transmitted by the transmitter also causes the server to transmit a command to devices other than the another client device.

18. A client device as claimed in claim 1, further comprising a chat unit operable to communicate with a plurality of other client devices in a chat group and to control the display unit to display the content and chat text based on data received from the plurality of other client devices in the chat group, the command transmitted by the transmitter commanding the server to transmit the respective one of the plurality of icon identification data sets to the plurality of other client devices in the chat group.

19. A client device as claimed in claim 1, wherein the display unit displays the icon buttons superimposed on the content.

20. A client device as claimed in claim 1, further comprising:
a response receiver operable to receive, from the another client device through the server, an acceptance of the invitation by the particular member of the buddy list, wherein the display unit is operable to display the group plate including the plate associated with particular member of the buddy list in response to the acceptance being received.

21. A method of interactive television communication between a plurality of client devices each of which is connected to a server over a network, said method comprising:
receiving, at the server over the network from each one of the plurality of client devices, information on a television viewing status of that client device;
storing, at the server, a buddy list associated with a given one of a plurality of users of a given one of the plurality of client devices, the buddy list having a plurality of members respectively associated with other ones of the plurality of client devices, the buddy list including the information on the television viewing status of each one of the associated client devices;
sending, from the server, selected content and the information on the television viewing status of the associated client devices over the network to the given one of the plurality of client devices so that in response to the given one of the plurality of users providing a user-entered password to the given one of the plurality of client devices and the given one of the plurality of client devices verifying that the user-entered password corresponds to one stored in the given one of the plurality of client devices in association with the given one of the plurality of users, a display unit of the given one of the plurality of client devices displays the selected content and displays a plurality of plates, a portion of the plurality of plates being associated with the plurality of members of the buddy list such that a given one of the portion of the plurality of plates is associated with a specific one of the plurality of members of the buddy list and includes a region providing an associated one of a plurality of visual clues which indicates the on-line status of the client device associated with that member of the buddy list, the region providing the associated one of the plurality of visual clues being displayable in place of the given one of the plurality of plates, the plurality of plates including a group plate associated with a group that includes any of the members of the buddy list whose associated client device is displaying the selected content and which includes the plates associated with such members of the buddy list, the group plate including a message urging the given one of the plurality of users to invite the members of the buddy list to watch the selected content upon none of the members of the buddy list being included in the group;
receiving, at the server over the network from the given one of the plurality of client devices, a request including an identification number of the given one of the plurality of client devices, an identification number of the client device associated with a particular member of the buddy list, identification data associated with the given one of the plurality of users, data associated with the selected content, and icon identification data associated with an invitation icon selected by the given one of the plurality of users from a plurality of icon buttons displayed by the given one of the plurality of client devices and including a message asking the particular member of the buddy list to watch the selected content; and
transmitting, from the server over the network to the client device associated with the particular member of the buddy list in response to the server receiving the request, a command including an identification number of the given one of the plurality of client devices, the identification data associated with the given one of the plurality of users, the data associated with the selected content, and the icon identification data associated with the invitation icon, thereby causing the client device associated with the particular member of the buddy list to execute the invitation icon and display an invitation to watch the selected content.

22. A method as claimed in claim 21, further comprising:
receiving an agreement to watch the selected content from the client device associated with the particular member of the buddy list; and
communicating with the client device associated with the particular member of the buddy list to synchronize display of the selected content at the given one of the plurality of client devices and at the client device associated with the particular member of the buddy list.

23. A method as claimed in claim 21, wherein the selected content is broadcast content.

24. A method as claimed in claim 21, wherein the selected content is pay content.

25. A method as claimed in claim 24, further comprising charging fees for the pay content for the client device associated with the particular member of the buddy list to the given one of the plurality of client devices when the request indicates that the user of the given one of the plurality of client devices has agreed to pay the fees for the pay content for the client device associated with the particular member of the buddy list.

26. A method as claimed in claim 24, wherein the pay content is pay per view.

27. A method as claimed in claim 24, wherein the pay content is video on demand.

28. A method as claimed in claim 24, further comprising discounting fees charged to the given one of the plurality of client devices for the pay content when the user of the client device associated with the particular member of the buddy list has agreed to pay for the pay content for that client device.

29. A method as claimed in claim 24, further comprising providing incentive points to the given one of the plurality of client devices when the user of the client device associated with the particular member of the buddy list has agreed to pay for the pay content for that client device.

30. A method as claimed in claim 24, further comprising receiving agreement-to-pay information from the client device associated with the particular member of the buddy list when the user of the client device associated with the particular member of the buddy list has agreed to pay for the pay content for that client device.

31. A method as claimed in claim 24, further comprising sending further icon identification data to the client device associated with the particular member of the buddy list when the user of the client device associated with the particular member of the buddy list has not agreed to pay for the pay content, the further icon identification data identifying an icon for urging the user of the client device associated with the particular member of the buddy list to pay for the pay content.

32. A method as claimed in claim 21, further comprising:
searching, by the server, for an online device having the same user as that of the client device associated with the particular member of the buddy list when the client device associated with the particular member of the buddy list is not online; and sending, from the server to the online device, an invitation to watch the selected content.

33. A method as claimed in claim 21, further comprising exchanging chat text between members of the plurality of client devices in a chat group, wherein the icon identification data is transmitted from the given one of the plurality of client devices to other client devices in the chat group.

34. A method as claimed in claim 21, wherein the information on the television viewing status includes information indicates which ones of the plurality of client devices that are associated with the plurality of members of the buddy list are displaying the same television programs.

35. A method as claimed in claim 21, further comprising receiving from the client device associated with the particular one of the plurality of members in the buddy list a response indicating execution of the desired icon.

36. A method as claimed in claim 35, wherein the icon identification data represents an icon having a comment about television content, and the response represents agreement or disagreement with the comment.

37. A method as claimed in claim 35, wherein the icon identification data represents an icon having a question and possible answers, and the response represents one of the possible answers.

38. A method as claimed in claim 21, wherein the icon identification data represents an expression.

39. A method as claimed in claim 21, wherein the icon identification data represents information about a television program.

40. A method as claimed in claim 21, wherein the icon identification data represents advertisement information.

41. A method as claimed in claim 21, further comprising sending a command with the icon identification data, the command instructing the particular client device associated with the given one of the plurality of members in the buddy list to execute the icon corresponding to the icon identification data using icon display and audio data stored locally in that client device.

42. A method as claimed in claim 21, wherein the icon identification data includes icon display and audio data for executing the desired icon in the particular client device associated with the given one of the plurality of members in the buddy list.

43. A method as claimed in claim 21, wherein the request received from the given one of the plurality of client devices includes a command that the server transmit the selected one of the plurality of icons to a portion of the plurality of client devices that are displaying the same television content.

44. A method as claimed in claim 43, wherein the portion of the plurality of client devices includes client devices not associated with the plurality of members of the buddy list.

45. A method as claimed in claim 21, further comprising suggesting icons to the client devices associated with the members of the buddy list.

46. A method as claimed in claim 21, further comprising:
receiving, at the server from the client device associated with the particular member of the buddy list, an acceptance of the invitation by the particular member of the buddy list; and
transmitting the acceptance from the server to the given one of the plurality of client devices such that the display unit of the given one of the plurality of client devices displays the group plate including the plate associated with particular member of the buddy list.

47. A method of interactive television communication between a plurality of client devices connected to a server over a network, said method comprising:
receiving content data at a given one of the plurality of client devices;
displaying, at the given one of the plurality of client devices, a user list identifying a plurality of users of that client device;
receiving, at the given one of the plurality of client devices, a user-entered password in response to a given one of the plurality of users being selected;
verifying, at the given one of the plurality of client devices, that the user-entered password corresponds to one stored in the given one of the plurality of client devices in association with the given one of the plurality of users; and
in response to the user-entered password being verified as corresponding to the one stored in association with the given one of the plurality of users,
displaying content based on the received content data at the given one of the plurality of client devices,
displaying, at the given one of the plurality of client devices, a plurality of icon buttons associated with a plurality of icons whereby a given one of the plurality of icon buttons represents a particular one of a plurality of icons,
displaying, at the given one of the plurality of client devices, a plurality of plates associated with a plurality of members of a buddy list of the given one of the plurality of users such that a given one of the portion of the plurality of plates is associated with a specific one of the plurality of members of the buddy list and includes a region providing an associated one of a plurality of visual clues which indicates an on-line status of another client device associated with that member of the buddy list, the region providing the particular one of the plurality of visual clues being displayable in place of the associated one of the plurality of plates, the plurality of plates including a group plate associated with a group that includes any of the members of the buddy list whose associated client device is displaying the selected content and which includes the plates associated with such members of the buddy list, the group plate including a message urging the given one of the plurality of users to invite the members of the buddy list to watch the selected content upon none of the members of the buddy list being included in the group,
receiving a selection of a desired one of the plurality of plates at the given one of the plurality of client devices from the given one of the plurality of users,
displaying, at the given one of the plurality of client devices, a plurality of icon buttons in response to the desired one of the plurality of plates being selected, the plurality of icon buttons being respectively associated with the plurality of icons such that the invitation icon button is associated with an invitation icon, the invitation icon including a message asking the particular member of the buddy list to watch the selected content,
receiving, at the given one of the plurality of client devices from the given one of the plurality of users, a desired one of the plurality of icon buttons, and
sending a request from the given one of the plurality of client devices over the network to the server in response to the particular one of the plurality of members of the buddy list and the invitation icon button being selected, the request an identification number of said client device, an identification number of the another client device associated with the particular member of the buddy list, identification data associated with the given one of the plurality of users, the icon identification data associated with the invitation icon, and data associated with the selected content, the request causing the server to transmit a command the further client device associated with the particular member of the buddy list, the command including the identification number of said client device, the identification data associated with the given one of the plurality of users, the icon identification data associated with the invitation icon, and the data associated with the icon associated with the selected content and causing the further client device to execute the invitation icon and display an invitation to watch the selected content.

48. A method as claimed in claim 47, further comprising storing, in each one of the plurality of the client devices, icon display and audio data for executing the plurality of icons, the sent icon identification data indicating a portion of the stored icon display and audio data that is for executing the selected one of the plurality of icon.

49. A method as claimed in claim 47, wherein the step of sending icon identification data includes sending icon display and audio data for executing the selected one of the plurality of icons at the another one of the client devices.

50. A method as claimed in claim 47, further comprising connecting the server to the Internet and receiving, over the Internet, icon display and audio data for executing the plurality of icons, the server sending selected icon display and audio data for executing the selected one of the plurality of icons with the icon identification data.

51. A method as claimed in claim 47, further comprising connecting the further one of the plurality of client devices to the Internet and receiving, over the Internet, icon display and audio data for executing the selected one of the plurality of icons.

52. A method as claimed in claim 47, wherein the selected content is broadcast content.

53. A method as claimed in claim 47, wherein the selected content is pay content.

54. A method as claimed in claim 53, further comprising executing, at the another one of the client devices, a confirmation icon that informs the user that the selected content is pay content which requires payment of a charge.

55. A method as claimed in claim 54, wherein the confirmation icon enables the user of the another one of the client devices to agree to pay for the pay content with a single operation.

56. A method as claimed in claim 55, further comprising discounting, at the server, fees charged to the given one of the plurality of client devices for the pay content when the user of the another one of the client devices has agreed to pay for the pay content.

57. A method as claimed in claim 55, further comprising providing, at the server, incentive points to the given one of the plurality of client devices when the user of the another one of the client devices has agreed to pay for the pay content.

58. A method as claimed in claim 55, further comprising sending agreement-to-pay information from the another one of the client devices to the server when the user of the another one of the client devices has agreed to pay for the pay content.

59. A method as claimed in claim 54, further comprising sending further icon identification data from the server to the another one of the client devices when the user of the another one of the client devices has not agreed to pay for the pay content, the further icon identification data identifying an icon at the another one of the client devices for urging the user of the another one of the client devices to pay for the pay content.

60. A method as claimed in claim 53, further comprising charging, at the server, fees for the pay content for the another one of the client devices to the given one of the plurality of client devices when the request indicates that a user of the given one of the plurality of client devices has agreed to pay the fees for the pay content for the another one of the client devices.

61. A method as claimed in claim 53, wherein the pay content is pay per view.

62. A method as claimed in claim 53, wherein the pay content is video on demand.

63. A method as claimed in claim 47, further comprising:
searching, by the server, for an online device having the same user as that of the another one of the client devices when the another one of the client devices is not online; and
sending from the server to the online device an invitation to watch the selected content.

64. A method as claimed in claim 47, further comprising exchanging chat text between client devices in a chat group, wherein the icon identification data is transmitted from the given one of the plurality of client devices to other client devices in the chat group.

65. A method as claimed in claim 47, wherein the step of displaying the icon buttons includes displaying the icon buttons superimposed on the content.

66. A method as claimed in claim 47, further comprising:
in response to the user-entered password being verified as corresponding to the one stored in association with the given one of the plurality of users,
receiving, from the another client device through the server, an acceptance of the invitation by the particular member of the buddy list, and displaying, at the given one of the plurality of client devices, the group plate including the plate associated with particular member of the buddy list in response to the acceptance being received.

* * * * *